United States Patent
Inaguma et al.

(10) Patent No.: US 9,267,194 B2
(45) Date of Patent: Feb. 23, 2016

(54) FE-BASED METAL SHEET AND MANUFACTURING METHOD THEREOF

(75) Inventors: Tooru Inaguma, Tokyo (JP); Miho Tomita, Tokyo (JP); Hiroaki Sakamoto, Tokyo (JP); Youji Mizuhara, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/114,131

(22) PCT Filed: Apr. 27, 2012

(86) PCT No.: PCT/JP2012/061385
§ 371 (c)(1),
(2), (4) Date: Oct. 25, 2013

(87) PCT Pub. No.: WO2012/147922
PCT Pub. Date: Nov. 1, 2012

(65) Prior Publication Data
US 2014/0069555 A1  Mar. 13, 2014

(30) Foreign Application Priority Data

Apr. 27, 2011 (JP) ................... 2011-100014
Apr. 28, 2011 (JP) ................... 2011-101893
Mar. 26, 2012 (JP) ................... 2012-070166

(51) Int. Cl.
*C21D 8/02* (2006.01)
*C22C 38/00* (2006.01)
(Continued)

(52) U.S. Cl.
CPC ................. *C22C 38/18* (2013.01); *B32B 15/01* (2013.01); *B32B 15/011* (2013.01); *C21D 3/04* (2013.01);
(Continued)

(58) Field of Classification Search
CPC .... C21D 8/0257; C22C 38/00; C22C 38/008; C22C 38/06
USPC ........................... 148/208, 320, 653; 428/606
See application file for complete search history.

(56) References Cited

U.S. PATENT DOCUMENTS 5,512,110 A * 4/1996 Yoshitomi et al. ............ 148/113
5,807,441 A   9/1998 Tomida et al.
(Continued)

FOREIGN PATENT DOCUMENTS

EP   2 495 345 A1   9/2012
JP   1-252727 A    10/1989
(Continued)

OTHER PUBLICATIONS

Japanese Office Action dated Nov. 20, 2012 issued in Japanese Patent Application No. 2012-542308.
(Continued)

*Primary Examiner* — Jessee Roe
(74) *Attorney, Agent, or Firm* — Birch, Stewart, Kolasch & Birch, LLP

(57) ABSTRACT

A cast slab containing C: less than 0.02 mass % and made of an Fe-based metal of an α-γ transforming component is subjected to hot rolling at a temperature of an A3 point or higher and is subjected to α-region rolling at a temperature of 300° C. or higher and lower than the A3 point, and thereby a base metal sheet having a {100} texture in a surface layer portion is fabricated. Then, by performing a heat treatment under predetermined conditions, an Fe-based metal sheet is obtained in which a Z value is not less than 2.0 nor more than 200 when intensity ratios of respective {001}<470>, {116}<6 12 1>, and {223}<692> directions in a sheet plane by X-ray diffraction are set to A, B, and C respectively and Z =(A+0.97B)/0.98C is satisfied.

5 Claims, 4 Drawing Sheets

(51) Int. Cl.

| | | |
|---|---|---|
| C22C 38/18 | (2006.01) | |
| C21D 3/04 | (2006.01) | |
| C21D 8/12 | (2006.01) | |
| H01F 1/16 | (2006.01) | |
| H02K 1/02 | (2006.01) | |
| B32B 15/01 | (2006.01) | |
| C22C 38/02 | (2006.01) | |
| C22C 38/04 | (2006.01) | |
| C22C 38/06 | (2006.01) | |

(52) U.S. Cl.
CPC .............. *C21D 8/0257* (2013.01); *C21D 8/12* (2013.01); *C21D 8/1222* (2013.01); *C22C 38/00* (2013.01); *C22C 38/001* (2013.01); *C22C 38/004* (2013.01); *C22C 38/02* (2013.01); *C22C 38/04* (2013.01); *C22C 38/06* (2013.01); *H01F 1/16* (2013.01); *H02K 1/02* (2013.01); *C21D 2201/05* (2013.01); *C21D 2211/005* (2013.01); *Y10T 428/12* (2015.01); *Y10T 428/12431* (2015.01); *Y10T 428/12799* (2015.01)

(56) References Cited

U.S. PATENT DOCUMENTS

| 6,067,695 | A | 5/2000 | Momoitio | |
|---|---|---|---|---|
| 6,527,876 | B2 | 3/2003 | Namikawa et al. | |
| 2002/0134466 | A1 | 9/2002 | Namikawa et al. | |
| 2004/0244877 | A1* | 12/2004 | Yokoi et al. | 148/320 |
| 2006/0166029 | A1* | 7/2006 | Inaguma et al. | 428/653 |
| 2009/0022636 | A1 | 1/2009 | Inaguma et al. | |
| 2012/0013430 | A1 | 1/2012 | Morishige et al. | |

FOREIGN PATENT DOCUMENTS

| JP | 3-229824 | A | 10/1991 |
|---|---|---|---|
| JP | 5-65536 | A | 3/1993 |
| JP | 5-65537 | A | 3/1993 |
| JP | 7-173542 | A | 7/1995 |
| JP | 10-168542 | A | 6/1998 |
| JP | 10-180522 | A | 7/1998 |
| JP | 11-293424 | A | 10/1999 |
| JP | 2001-254165 | A | 9/2001 |
| JP | 2005-199311 | A | 7/2005 |
| JP | 2006-45613 | A | 2/2006 |
| JP | 2006-144116 | A | 6/2006 |
| JP | 2009-256758 | A | 11/2009 |
| JP | 2012-1769 | A | 1/2012 |
| WO | WO 2008/062901 | A1 | 5/2008 |
| WO | WO 2010/110217 | A1 | 9/2010 |
| WO | WO 2011/052654 | A1 | 5/2011 |

OTHER PUBLICATIONS

International Search Report issued in PCT/JP2012/061385 mailed Aug. 7, 2012.
Written Opinion of the International Searching Authority issued in PCT/JP2012/061385 mailed Aug. 7, 2012.
International Preliminary Report on Patentability mailed Nov. 7, 2013 (Forms PCT/IB/338, PCT/IB/373 and PCT/ISA/237) issued in PCT/JP2012/061385.
Extended European Search Report dated Apr. 30, 2015, issued in corresponding European Patent Application No. 12777689.6.

* cited by examiner

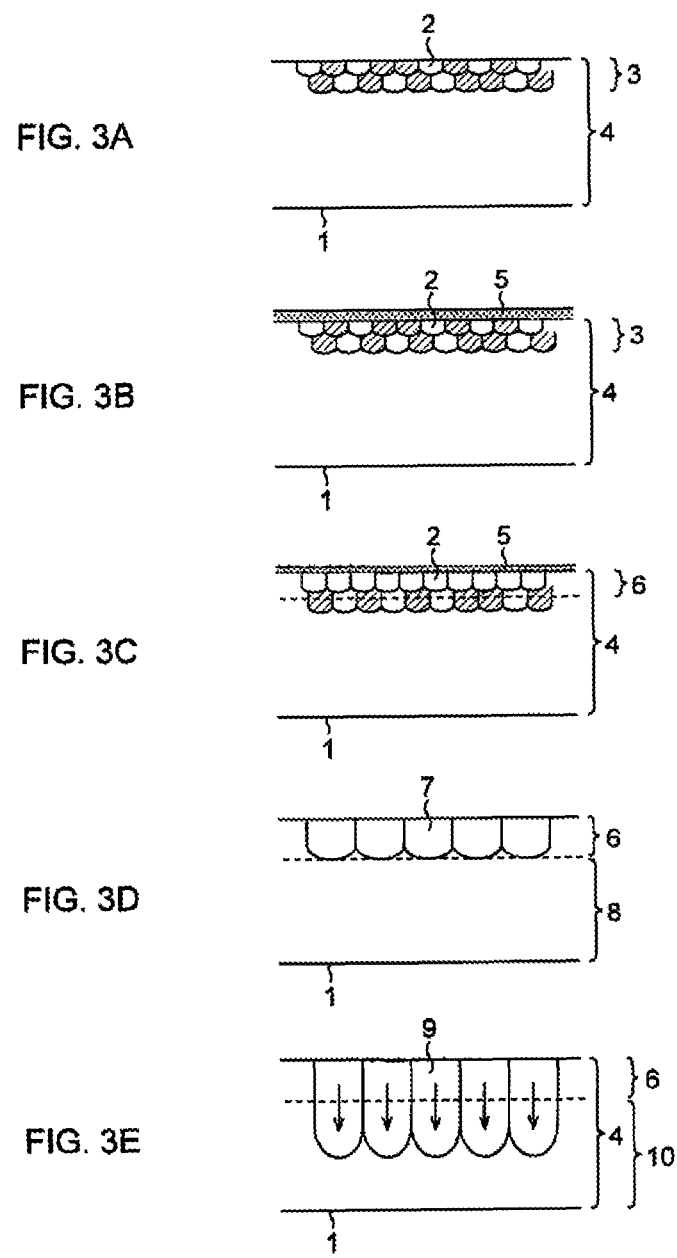

FE-BASED METAL SHEET AND MANUFACTURING METHOD THEREOF

TECHNICAL FIELD

The present invention relates to an Fe-based metal sheet having a high accumulation degree of {200} planes suitably used for magnetic cores and the like of electric motors, power generators, and transformers and capable of contributing to downsizing of these magnetic cores and reduction in energy loss, and a manufacturing method thereof. This application is based upon and claims the benefit of priority of the prior Japanese Patent Application No. 2011-100014, filed on Apr. 27, 2011, the prior Japanese Patent Application No. 2011-101893, filed on Apr. 28, 2011, and the prior Japanese Patent Application No. 2012-070166, filed on Mar. 26, 2012, the entire contents of which are incorporated herein by reference.

BACKGROUND ART

Electrical steel sheets alloyed with silicon or/and the like have been conventionally used for magnetic cores of electric motors, power generators, transformers, and the like. Among electrical steel sheets, non-oriented electrical steel sheets having relatively random crystal orientations can be manufactured at a low cost, to thus be used for motors, transformers, and the like of home electric appliances, and the like in a multipurpose manner. The crystal orientations of this non-oriented electrical steel sheet are random, thus making it impossible to obtain a high magnetic flux density. In contrast to this, grain-oriented electrical steel sheets having aligned crystal orientations can obtain a high magnetic flux density, to thus be applied to high-end use for driving motors and the like of HV vehicles and the like. However, in a manufacturing method of a grain-oriented electrical steel sheet that is industrialized currently, a long-time heat treatment is required, to thus increase the cost.

As above, in the non-oriented electrical steel sheet, a sufficiently high magnetic flux density cannot be obtained, and in the grain-oriented electrical steel sheet, the direction in which a high magnetic flux density can be obtained is limited to one to two direction/directions. On the other hand, in HV vehicles, and the like, achievement of high torque and downsizing are required, and there is a demand for manufacturing a metal sheet capable of obtaining a high magnetic flux density in an in-plane circumferential direction thoroughly as a metal sheet to be used for core materials of driving motors, and the like. Thus, as methods other than the industrialized manufacturing method of the grain-oriented electrical steel sheet, there have been proposed a technique of increasing an accumulation degree of a specific crystal orientation and various techniques of decreasing a core loss. However, in the technique described in Patent Literature 7, for example, it is possible to increase an accumulation degree of {200} planes, but directionality to a specific orientation occurs, to thus have a high magnetic flux density in a specific direction, but a high magnetic flux density cannot be obtained in an in-plane circumferential direction thoroughly, and the like, resulting in that in a conventional technique, satisfactory properties are not necessarily obtained.

CITATION LIST

Patent Literature

Patent Literature 1: Japanese Laid-open Patent Publication No. 10-168542
Patent Literature 2: Japanese Laid-open Patent Publication No. 2006-45613
Patent Literature 3: Japanese Laid-open Patent Publication No. 2006-144116
Patent Literature 4: Japanese Laid-open Patent Publication No. 10-180522
Patent Literature 5: Japanese Laid-open Patent Publication No. 01-252727
Patent Literature 6: Japanese Laid-open Patent Publication No. 07-173542
Patent Literature 7: International Publication Pamphlet No. WO2011/052654

SUMMARY OF INVENTION

Technical Problem

Thus, an object of the present invention is to provide an Fe-based metal sheet that is likely to become magnetized in a sheet plane and further has a texture capable of obtaining a high magnetic flux density thoroughly in an in-plane circumferential direction, and a manufacturing method thereof.

Solution to Problem

The present inventors, as a result of earnest examination, found that an orientation ratio to a specific orientation is controlled with respect to an Fe-based metal of an iron sheet or the like, and thereby a <100> orientation in $\alpha$Fe is more densely and thoroughly distributed in a metal sheet plane to make it possible to obtain a high magnetic flux density thoroughly in an in-plane circumferential direction.

Further, the present inventors conceived that in order to manufacture such an Fe-based metal sheet, a texture in which an accumulation degree of {100} planes is increased is first formed in a surface layer portion, and at the time of $\gamma$-$\alpha$ transformation by the subsequent heat treatment, the texture is transformed while taking over its {100} texture. Then, they earnestly examined a method of forming the {100} texture in the surface layer portion and achievement of high accumulation of {200} planes using the $\gamma$-$\alpha$ transformation.

As a result, it was found that when the Fe-based metal sheet is manufactured from a slab by rolling, a rolling temperature and a reduction ratio are optimized, thereby making it possible to form the {100} texture in at least the surface layer portion. Then, it was found that when the {100} texture in the surface layer portion is taken over by using the $\gamma$-$\alpha$ transformation thereafter, a different metal except Fe is made to diffuse beforehand from the surface and a diffused region is turned into an $\alpha$-Fe phase, and thereby in the region turned into the $\alpha$-Fe phase, the {100} texture is formed, and at the time of the $\gamma$-$\alpha$ transformation, an accumulation degree of {200} planes in the $\alpha$-Fe phase further generated by the transformation increases and the <100> orientation is distributed more densely and thoroughly, thereby making it possible to obtain a high magnetic flux density in the in-plane circumferential direction thoroughly.

Further, the present inventors found that in the case of a large amount of C content being contained, when the C content is decreased by decarburization annealing, the decarburization annealing is performed under predetermined conditions, thereby also making it possible to form the {100} texture in at least the surface layer portion, and in the Fe-based metal sheet obtained finally, the <100> orientation is distributed more densely and thoroughly, thereby making it possible to obtain a high magnetic flux density in the in-plane circumferential direction thoroughly.

The gist of the present invention made as a result of such examinations is as follows.

(1) An Fe-based metal sheet, includes: at least one type of ferrite-forming element except Fe, in which when intensity ratios of respective {001}<470>, {116}<6 12 1>, and {223}<692> directions in a sheet plane by X-ray diffraction are set to A, B and C respectively and Z=(A+0.97B)/0.98C is satisfied, a Z value is not less than 2.0 nor more than 200.

(2) The Fe-based metal sheet according to (1), in which the ferrite-forming element diffuses from a surface to be alloyed with Fe.

(3) The Fe-based metal sheet according to (1) or (2), in which a layer containing the ferrite-forming element is formed on at least one side of surfaces of the Fe-based metal sheet, and the ferrite-forming element that has diffused from part of the layer is alloyed with Fe.

(4) The Fe-based metal sheet according to (3), in which a thickness of the layer containing the ferrite-forming element is not less than 0.01 μm nor more than 500 μm.

(5) The Fe-based metal sheet according to any one of (1) to (4), in which an accumulation degree of {200} planes is not less than 30% nor more than 99%, and an accumulation degree of {222} planes is not less than 0.01% nor more than 30%.

(6) The Fe-based metal sheet according to any one of (1) to (5), in which the ferrite-forming element is one type of element or more selected from a group consisting of Al, Cr, Ga, Ge, Mo, Sb, Si, Sn, Ta, Ti, V, W, and Zn.

(7) The Fe-based metal sheet according to any one of (1) to (6), in which at least a partial region including the surfaces of the Fe-based metal sheet is an α single phase region made of an α single phase based component, and a ratio of the α single phase region to a cross section of the Fe-based metal sheet is 1% or more.

(8) The Fe-based metal sheet according to any one of (1) to (7), in which a thickness of the Fe-based metal sheet is not less than 10 μm nor more than 6 mm.

(9) The Fe-based metal sheet according to any one of (1) to (8), in which the α single phase region is formed on a front surface side and a rear surface side of the Fe-based metal sheet, and a crystal grain straddling the α single phase region on the front surface side and the α single phase region on the rear surface side is formed.

(10) A manufacturing method of an Fe-based metal sheet, includes:

performing hot rolling on a cast slab containing C: less than 0.02 mass % and made of an Fe-based metal of an α-γ transforming component at a temperature of an A3 point of the cast slab or higher to obtain a hot-rolled sheet;

performing α-region rolling on the hot-rolled sheet at a temperature of higher than 300° C. and lower than the A3 point of the cast slab to obtain a rolled sheet;

performing cold rolling on the rolled sheet to obtain a base metal sheet having a thickness of not less than 10 μm nor more than 6 mm;

bonding a ferrite-forming element to one surface or both surfaces of the base metal sheet;

heating the base metal sheet having had the ferrite-forming element bonded thereto up to an A3 point of the base metal sheet; and further heating the heated base metal sheet to a temperature of not lower than the A3 point of the base metal sheet nor higher than 1300° C. and holding the base metal sheet; and cooling the heated and held base metal sheet to a temperature of lower than the A3 point of the base metal sheet.

(11) The manufacturing method of the Fe-based metal sheet according to (10), in which a reduction ratio in the α-region rolling is −1.0 or less in terms of true strain, and the sum of the reduction ratio in the α-region rolling and a reduction ratio in the cold rolling is −2.5 or less in terms of true strain.

(12) The manufacturing method of the Fe-based metal sheet according to (10) or (11), in which a reduction ratio in the hot rolling is −0.5 or less in terms of true strain.

(13) A manufacturing method of an Fe-based metal sheet, includes:

heating a steel sheet containing C: not less than 0.02 mass % nor more than 1.0 mass %, having a thickness of not less than 10 μm nor more than 6 mm, and made of an Fe-based metal of an α-γ transforming component to a temperature of an A1 point or higher and a temperature at which a structure is turned into an α single phase when decarburization is performed until C becomes less than 0.02 mass %, to obtain a base metal sheet that has been subjected to decarburization in a range of not less than 5 μm nor more than 50 μm in a depth direction from its surface until C becomes less than 0.02 mass %;

bonding a ferrite-forming element to one surface or both surfaces of the base metal sheet;

heating the base metal sheet having had the ferrite-forming element bonded thereto up to an A3 point of the base metal sheet; and further heating the heated base metal sheet to a temperature of not lower than the A3 point of the base metal sheet nor higher than 1300° C. and holding the base metal sheet; and cooling the heated and held base metal sheet to a temperature of lower than the A3 point of the base metal sheet.

(14) The manufacturing method of the Fe-based metal sheet according to (13), in which the steel sheet made of the Fe-based metal further contains Mn of 0.2 mass % to 2.0 mass %, and decarburization and demanganization are performed in a combined manner.

(15) The manufacturing method of the Fe-based metal sheet according to (13) or (14), further includes:

performing carburization on a steel sheet containing C: less than 0.02 mass %, having a sheet thickness of not less than 10 μm nor more than 6 mm, and made of an Fe-based metal of an α-γ transforming component to control C to not less than 0.02 mass % nor more than 1.0 mass %.

Advantageous Effects of Invention

According to the present invention, it is possible to manufacture an Fe-based metal sheet capable of obtaining a high magnetic flux density thoroughly in an in-plane circumferential direction.

BRIEF DESCRIPTION OF DRAWINGS

FIG. 3A is a view schematically showing a structure of a cross section of a base metal sheet having a {100} texture formed in a surface layer portion;

FIG. 3B is a view schematically showing the structure of the cross section of the base metal sheet having a different metal layer formed in the surface layer portion;

FIG. 3C is a view schematically showing the structure of the cross section of the base metal sheet in a temperature increasing process;

FIG. 3D is a view schematically showing the structure of the cross section of the base metal sheet in a heating and holding process;

FIG. 3E is a view schematically showing the structure of the cross section of the base metal sheet in a cooling process;

DESCRIPTION OF EMBODIMENTS

Figure 1:
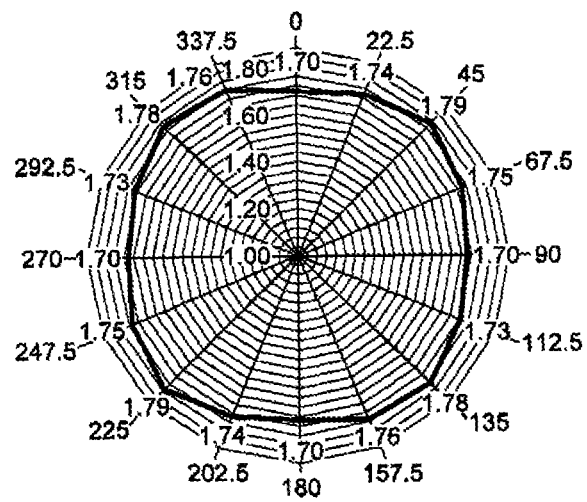
FIG. 1 is a view for explaining a method of calculating an average magnetic flux density B50.

Generally, an orientation of easy magnetization exists in α-Fe crystal, and when in a direction in which direction cosines between <100>, <010>, <001> orientations, (which will be called a [100] orientation generically), and the orientation are large, excitation is performed in a fixed magnetic field and magnetometry is performed, a high magnetic flux density is likely to be obtained. On the other hand, when in a direction in which direction cosines with respect to a <111> orientation being an orientation of hard magnetization are large, excitation is performed and magnetometry is performed, a high magnetic flux density is unlikely to be obtained. The present inventors found that more [100] orientations in the α-Fe crystal exist in a sheet plane and further the α-Fe crystal is controlled to a specific texture that is thoroughly distributed in the sheet plane, and thereby direction cosines with respect to the [100] orientation always become large in an arbitrary direction in the metal sheet plane, and when a magnetic field is applied in an arbitrary direction in the metal sheet plane and magnetometry is performed, a high magnetic flux density can be obtained.

It is characterized in that a specific texture that an Fe-based metal sheet of the present invention has contains at least one type of ferrite-forming element except Fe, in which when intensity ratios in respective {001}<470>, {116}<6 12 1>, and {223}<692> directions in a sheet plane by X-ray diffraction are set to A, B, and C respectively and $Z=(A+0.97B)/0.98C$ is satisfied, a Z value is not less than 2.0 nor more than 200.

Next, the previously described Z value will be explained.

The main orientations on which attention is focused in the present invention are {001}<470>, {116}<6 12 1>, and {223}<692>. When examining the state of a three-dimensional texture calculated by a vector method, the present inventors noticed that X-ray random intensity ratios in the above-described three plane orientations change depending on a magnetic property of a product, and learned that mathematizing this makes it possible to quantify the relationship with a magnetic property of a product and reached the present invention.

The X-ray random intensity ratios of these respective orientations may be obtained from a three-dimensional texture calculated by a vector method based on a pole figure of {110}, or may also be obtained from a three-dimensional texture calculated by a series expansion method using a plurality (preferably three or more) of pole figures out of pole figures of {110}, {100}, {211}, and {310}. For the X-ray random intensity ratios in the above-described respective crystal orientations by the latter method, for example, intensities of (001)[4 −7 0], (116)[1 −12 1], and (223)[6 −9 2] at a φ2=45° cross-section of the three-dimensional texture may be used as they are.

Subsequently, there will be explained a reason for which the expression of $Z=(A+0.97B)/0.98C$ was found.

First, the intensity of the {001}<470> orientation is set to A. This orientation is in the {100} plane, so that direction cosines with respect to the {100} plane are 1.0. In the {100} plane, the [100] orientation being the orientation of easy magnetization exists, and thus orientation of this plane in the metal sheet plane is advantageous for obtaining a high magnetic flux density in the metal sheet plane. Thus, the intensity A is weighted with the direction cosines of 1.0 in terms of the degree of contribution to improving a magnetic flux density to be set to one of parameters in the Z value.

Next, the intensity of the {116}<6 12 1> orientation is set to B. An angular difference between this orientation and the {001} plane is 13.3° and direction cosines are 0.97. In the {001} plane as well, the [100] orientation being the orientation of easy magnetization exists, and thus orientation of this plane in the metal sheet plane is advantageous for obtaining a high magnetic flux density in the metal sheet plane. For this reason, the intensity B is weighted with the direction cosines of 0.97 in terms of the degree of contribution to improving a magnetic flux density to be set to one of parameters in the Z value.

Further, the intensity of the {223}<692> orientation is set to C. An angular difference between the {223}<692> orientation and a {111} plane is 11.4° and direction cosines are 0.98. As described previously, in the {111} plane, the [100] orientation being the orientation of easy magnetization is not contained, and orientation of this plane in the metal sheet plane is disadvantageous for obtaining a high magnetic flux density. Thus, the intensity C is set not to have the degree of contribution to improving a magnetic flux density, is put in the Z value as a parameter that performs division, and is multiplied by 0.98 being the direction cosines with respect to the {111} plane as its weighting.

From the above thought, it was found that when the intensity ratios in the respective {001}<470>, {116}<6 12 1>, and {223}<692> directions in the metal sheet plane by X-ray diffraction are set to A, B, and C respectively, the expression of $Z=(A+0.978)/0.98C$ is created, and as the Z value is increased, a high magnetic flux density can be obtained when excitation is performed in the metal sheet plane to perform magnetometry.

Further, the present inventors were able to find from a large number of experiments that a special condition capable of obtaining a high magnetic flux density in an arbitrary direction in the metal sheet plane is that the Z value is not less than 2.0 nor more than 200. They grasped the fact that the Z value is limited to this range, and thereby the [100] orientation being the orientation of easy magnetization is thoroughly distributed in the metal sheet plane, but have not obtained evidence making theoretical explanation of this phenomenon possible so far.

Figure 2:
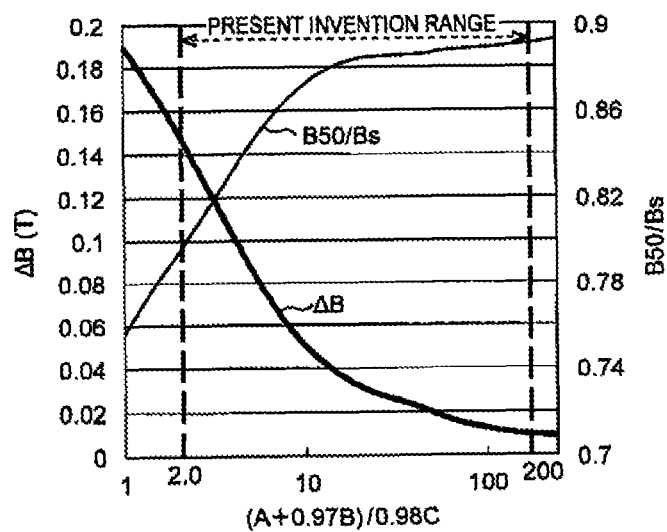
FIG. 2 is a conceptual diagram showing the relationship between a Z value and a ratio B50/Bs of the average magnetic flux density B50 to a saturation magnetic flux density Bs and a magnetic flux density difference ΔB.

The present inventors found that when the Z value is not less than 2.0 nor more than 200, a ratio B50/Bs of an average magnetic flux density B50 to a saturation magnetic flux density Bs becomes a high level of 0.80 or more and a magnetic flux density difference ΔB measured in the metal sheet plane becomes a low level of 0.15 T or less. FIG. 2 schematically shows this relationship.

When the Z value is less than 2.0, crystal orientation of α-Fe shows a tendency to decrease the [100] orientations being the orientation of easy magnetization in the metal sheet plane. Alternately, it shows a tendency that the distribution of the [100] orientations in the metal sheet plane becomes non-uniform. That is, the average magnetic flux density B50 in the metal sheet plane becomes small and the ratio B50/Bs of the average magnetic flux density B50 to the saturation magnetic flux density Bs becomes less than 0.8. Alternately, only the magnetic flux density in a specific direction increases and the magnetic flux density difference ΔB becomes greater than 0.15 T. Thus, the Z value is set to 2.0 or more in the present invention.

On the other hand, when the Z value exceeds 200, the increase in the magnetic flux density is saturated and an increase in uniformity of the magnetic flux density in the metal sheet plane is also saturated. In contrast to this, in order to manufacture a metal sheet such that the Z value exceeds 200, a heat treatment time is prolonged, or the like, which becomes difficult industrially, and thus the condition of the Z value is set to 200 or less.

Here, FIG. 1 is a view for explaining a method of calculating the average magnetic flux density B50. A manufacturing method will be described later, but it is found that α-region rolling is performed at 800° C. and as a different metal, 2.6 mass % of Sn and 0.9 mass % of Al are used, and thereby in an obtainable Fe-based metal sheet having a thickness of 0.2 mm, a high magnetic flux density can be obtained thoroughly in an in-plane circumferential direction.

Here, in a metal sheet having a higher accumulation degree of {200} planes among textures of the Fe-based metal sheet of the present invention in which the Z value is not less than 2.0 nor more than 200, a higher magnetic flux density can be obtained. Specifically, in a texture in which an accumulation degree of {200} planes in an α-Fe phase is not less than 30% nor more than 99% and an accumulation degree of {222} planes in the α-Fe phase is not less than 001% nor more than 30%, a higher magnetic flux density can be obtained.

When the accumulation degree of the {200} planes is less than 30% or the accumulation degree of the {222} planes is greater than 30%, the average magnetic flux density B50 tends to slightly decrease even though the Z value is in the present invention range. Further, in a metal sheet in which the accumulation degree of the {200} planes is greater than 99% or the accumulation degree of the {222} planes is less than 0.01%, the increase in the magnetic flux density B50 is saturated and a heat treatment time is prolonged, and the like, resulting in that manufacturing conditions become disadvantageous industrially.

Next, the manufacturing method of the previously described Fe-based metal sheet will be explained.

(First Embodiment)

As a manufacturing method of an Fe-based metal sheet in this embodiment, a rolling temperature and a reduction ratio are optimized, and thereby a {100} texture is formed in at least a surface layer portion of the metal sheet, a ferrite-forming element is made to diffuse into this partial or whole region from its surface, and at the time of cooling, the whole Fe-based metal sheet is oriented in {100}. This makes it possible to obtain a high magnetic flux density in an arbitrary direction in a metal sheet plane.

This embodiment as above is based on the fact found by the present inventors that {100} crystal grains in the texture formed in the surface layer portion preferentially grow at an A3 point or higher in a heating process to be performed for the diffusion of the ferrite-forming element, and further when the ferrite-forming element is made to diffuse into the inner portion to make the Fe-based metal sheet alloyed therewith and then cooling is performed, an accumulation degree of {200} planes in the sheet plane of the Fe-based metal sheet increases.

[Explanation of the Basic Principle of the First Embodiment of the Present Invention]

First, the basic principle of this embodiment capable of obtaining a high accumulation degree of {200} planes will be explained based on FIG. 3A to FIG. 3E.

(a) Manufacture of a Base Metal Sheet (Seeding of a Texture)

In a process in which a cast slab containing C: less than 0.02 mass % and made of an Fe-based metal of an α-γ transforming component is decreased in thickness by rolling and thereby a metal sheet is obtained, hot rolling is performed at a sheet temperature of the A3 point or higher, α-region rolling is performed at a sheet temperature of lower than the A3 point and 300° C. or higher, and further cold rolling is performed to a predetermined sheet thickness. By this process, as shown in FIG. 3A, a base metal sheet 1 having an inner region 4 made of Fe in an α phase and having a {100} texture 2 in at least a surface layer portion 3 is obtained. Further, a seed of crystal that satisfies the condition of the Z value is formed in a recrystallized texture by a particular deformation slip.

(b) (Formation of a Second Layer)

Next, as shown in FIG. 3B, the ferrite-forming element such as Al, for example, is bonded to one surface or both surfaces of the cold-rolled base metal sheet 1 by using a vapor deposition method or the like to form a second layer 5.

(c) Saving of the Texture

Next, the base metal sheet 1 having had the ferrite-forming element bonded thereto is heated to the A3 point of the base metal sheet 1 to make the ferrite-forming element diffuse into the partial or whole region having the {100} texture 2 in the base metal sheet 1, to make the base metal sheet 1 alloyed therewith. As shown in FIG. 3C, an alloyed region 6 is transformed to the α phase from a γ phase to have an α single phase component. At this time, the alloyed region 6 is transformed while taking over orientation of the {100} texture 2 formed in the surface layer portion 3, so that a structure oriented in {100} is formed also in the alloyed region 6.

(d) Achievement of High Accumulation of the Texture

Next, the partially alloyed base metal sheet 1 is further heated to a temperature of not lower than the A3 point nor higher than 1300° C. and the temperature is held. The region of the α single phase component is an α-Fe phase not undergoing γ transformation, and thus the {100} crystal grains are maintained as they are, the {100} crystal grains preferentially grow in the region, and the accumulation degree of the {200} planes increases. Further, as shown in FIG. 3D, a region 8 not having the α single phase component is transformed to the γ phase from the α phase.

Further, when a holding time of the temperature after the heating is prolonged, the {100} crystal grains are united to preferentially grow to large {100} crystal grains 7. As a result, the accumulation degree of the {200} planes further increases. Further, with the diffusion of the ferrite-forming element, the region 6 alloyed with the ferrite-forming element is transformed to the α phase from the γ phase. At this time, in the region adjacent to the region to be transformed, crystal grains in the α phase oriented in {100} are already formed, and at the time of the transformation to the α phase from the γ phase, the region 6 is transformed while taking over a crystal orientation of the adjacent crystal grains in the α phase. Thereby, the holding time is prolonged and the accumulation degree of the {200} planes increases.

(e) Growth of the Texture

The base metal sheet is cooled to a temperature of lower than the A3 point. At this time, as shown in FIG. 3E, a γ-Fe phase in an unalloyed inner region 10 is transformed to the α-Fe phase. This inner region 10 is adjacent to the region in which the crystal grains in the α phase oriented in {100} are already formed in a temperature region of the A3 point or higher, and at the time of the transformation to the α phase from the γ phase, the inner region 10 is transformed while taking over the crystal orientation of the adjacent crystal grains in the α phase and larger crystal grains 9 in the α phase oriented in {100} are formed. Therefore, the accumulation degree of the {200} planes increases also in the region. By this phenomenon, the high accumulation degree of the {200} planes can be obtained even in the unalloyed region.

When at the stage of the preceding state shown in FIG. 3D, the temperature of the A3 point or higher is held until the whole metal sheet is alloyed, the structure having the high accumulation degree of the {200} planes is already formed in the whole metal sheet, and thus the cooling is performed while the state when the cooling is started is maintained.

In the above, the basic principle of this embodiment was explained, and there will be further explained a limiting reason of each condition that defines the manufacturing method of this embodiment and preferable conditions of this embodiment.

[Fe-Based Metal to be the Base Material] (C Content)

In this embodiment, first, crystal grains oriented in {100} to serve as seeds for increasing the accumulation degree of the {200} planes in the sheet are formed in the surface layer portion of the base metal sheet made of the Fe-based metal. Then, the γ-α transformation is made to progress in the metal sheet while taking over a crystal orientation of the crystal grains in the α phase to serve as the seeds finally, to thereby increase the accumulation degree of the {200} planes of the whole metal sheet. For this reason, the Fe-based metal used for the base metal sheet has a composition of the α-γ transforming component. When the Fe-based metal used for the base metal sheet has the α-γ transforming component, the ferrite-forming element is made to diffuse into the metal sheet to make the metal sheet alloyed therewith, thereby making it possible to form the region having the α single phase based component.

In this embodiment, the C content of the base metal sheet is set to less than 0.02 mass %. Further, in terms of a magnetic property of a product metal sheet, the C content is preferably 0.01 mass % or less. Under the condition of the C content being less than 0.02 mass %, the ferrite-forming element is made to diffuse into the metal sheet to make the metal sheet alloyed therewith, thereby making it possible to form the region having the α single phase based component. Incidentally, C is a component to remain in a process of manufacturing the slab and the less C is, the more preferred it is in terms of the magnetic property, and thus its lower limit is not necessary needed, but it is preferably set to 0.0001 mass % or more in terms of the cost of a refining process.

(Other Containing Elements)

In principle, being applicable to the Fe-based metal having the α-γ transforming component, this embodiment is not limited to the Fe-based metal in a specific composition range. Typical examples of the α-γ transforming component are pure iron, steel such as ordinary steel, and the like. For example, it is a component containing pure iron or steel containing C of 1 ppm to less than 0.02 mass % as described above and a balance being composed of Fe and inevitable impurities as its base and containing an additive element as required. Instead, it may be silicon steel of the α-γ transforming component having C: less than 0.02 mass % and Si: 0.1 mass % to 2.5 mass % as its basic component. Further, as other impurities, a trace amount of Ni, Cr, Al, Mo, W, V, Ti, Nb, B, Cu, Zr, Y, Hf, La, Ce, N, O, P, S, and/or the like are/is contained. Further, Al and Mn are added to increase electric resistance, to thereby decrease a core loss, and Co is added to increase the saturation magnetic flux density Bs, to thereby increase a magnetic flux density, which are also included in the present invention range.

(Thickness of the Base Metal Sheet)

The thickness of the base metal sheet is set to not less than 10 μm nor more than 6 mm. When the thickness is less than 10 μm, when the base metal sheets are stacked to be used as a magnetic core, the number of the sheets to be staked is increased to increase gaps, resulting in that a high magnetic flux density cannot be obtained. Further, when the thickness exceeds 6 mm, it is not possible to make the {100} texture grow sufficiently even though a reduction ratio of the α-region rolling is adjusted, resulting in that a high magnetic flux density cannot be obtained.

[Rolling Conditions]

In this embodiment, as described previously, the Fe-based metal having, in at least the surface layer portion, the crystal grains oriented in {100} to serve as the seeds for increasing the accumulation degree of the {200} planes in the metal sheet is used as a starting material. As a method of achieving high accumulation of the {100} planes of the base metal sheet, a method of performing α-region rolling in a process in which a cast slab is rolled to a sheet shape is used.

First, a cast slab containing C: less than 0.02 mass % and made of the Fe-based metal of the α-γ transforming component such as a continuous cast slab or an ingot is prepared. Then, in a process in which the cast slab is decreased in thickness by rolling to obtain the base metal sheet, first the hot rolling is performed at a temperature of the A3 point or higher. Next, the α-region rolling is performed at a temperature of lower than the A3 point and higher than 300° C., and further the metal sheet is subjected to cold rolling to a predetermined thickness, and thereby the base metal sheet having the {100} texture formed in the surface layer portion is obtained.

As for a reduction ratio in each of rolling processes to be performed until the base metal sheet is obtained from the cast slab, the total reduction ratio in the α-region rolling is preferably set to −1.0 or less in terms of true strain and the sum of the total reduction ratio in the α-region rolling and the total reduction ratio in the cold rolling is preferably set to −2.5 or less in terms of true strain. Conditions other than these may create a possibility that the {100} texture cannot be sufficiently formed in the surface layer portion. A method of expressing the reduction ratio by true strain E is expressed by the following expression (1), where in each of the rolling processes, the thickness before the rolling is set to h0 and the thickness after the rolling is set to h.

$$\epsilon = \ln(h/h0) \quad (1)$$

When the sum of the total reduction ratio in the α-region rolling and the total reduction ratio in the cold rolling is in the previously described preferred range, a deformed structure in which the {100} texture is formed by recrystallization can be provided to at least the vicinity of the surface layer portion of the base metal sheet. Particular crystal slip and crystal rotation to occur at these reduction ratios are thought to occur. Thus, they are preferably in these ranges.

Further, as for the reduction ratio in each of the rolling processes to be performed until the base metal sheet is obtained from the cast slab, the reduction ratio in the hot rolling is preferably −0.5 or less in terms of true strain, thereby making it easier to obtain the higher accumulation degree of the {200} planes. This results from the fact found by the present inventors that in order that desirable deformation should be performed in the α-region rolling and the cold rolling, deformation in the hot rolling in a γ region is also closely affected. Thus, these ranges are preferred.

The region of the surface layer portion in which the {100} texture is formed preferably has 1 μm or more of a distance in a sheet thickness direction from the surface. Thereby, it is possible to bring the accumulation degree of the {200} planes to 30% or more in the following diffusion treatment. The upper limit of the distance is not limited in particular, but it is difficult to form the {100} texture in a region of 500 am or more by rolling.

Incidentally, the measurement of the accumulation degree of the {200} planes can be performed by X-ray diffraction using a MoKα ray. To be in more detail, in the α-Fe crystal, integrated intensities of 11 orientation planes ({110}, {200}, {211}, {310}, {222}, {321}, {411}, {420}, {332}, {521}, and {442}) parallel to a sample surface are measured for each sample, each measured value is divided by a theoretical integrated intensity of the sample having a random orientation, and thereafter, a ratio of the intensity of {200} or {222} is obtained in percentage.

At this time, for example, the accumulation degree of the {200} planes is expressed by Expression (2) below.

$$\text{accumulation degree of } \{200\} \text{ planes} = [\{i(200)/I(200)\}/\Sigma\{i(hkl)/I(hkl)\}] \times 100 \quad (2)$$

Here, i(hkl) is an actually measured integrated intensity of {hkl} planes in the measured sample, and I(hkl) is a theoretical integrated intensity of the {hkl} planes in the sample having the random orientation. Further, Σ is the sum of the 11 orientation planes in the α-Fe crystal. Here, instead of the theoretical integrated intensity of the sample having the random orientation, actually measured values using the sample may be used.

[Different Metal]

Next, a different metal except Fe is made to diffuse into the base metal sheet manufactured by the above-described rolling processes to increase the region of the {100} texture in the thickness direction of the steel sheet. As the different metal, the ferrite-forming element is used. As a procedure, first, the different metal is bonded in a layered form as the second layer to one surface or both surfaces of the base metal sheet made of the Fe-based metal of the α-γ transforming component. Then, a region alloyed by having had elements of the different metal diffuse thereinto is turned to have the α single phase based component and to be able to be maintained as not only the region transformed to the α phase, but also a seed oriented in {100} for increasing the accumulation degree of the {200} planes in the metal sheet. As such a ferrite-forming element, at least one type of Al, Cr, Ga, Ge, Mo, Sb, Si, Sn, Ta, Ti, V, W, and Zn can be used alone or in a combined manner.

As a method of bonding the different metal in a layered form to the surface of the base metal sheet, there can be employed various methods such as a plating method of hot dipping, electrolytic plating, or the like, a rolling clad method, a dry process of PVD, CVD, or the like, and further powder coating. As a method of efficiently bonding the different metal for industrially implementing the method, the plating method or the rolling clad method is suitable.

The thickness of the different metal before the heating when the different metal is bonded is preferably not less than 0.05 μm nor more than 1000 μm. When the thickness is less than 0.05 μm, it is not possible to obtain the sufficient accumulation degree of the {200} planes. Further, when the thickness exceeds 1000 μm, even when the different metal layer is made to remain, its thickness becomes larger than necessary.

[Heating and Diffusion Treatment]

The base metal sheet having had the ferrite-forming element as the different metal bonded thereto is heated up to the A3 point of the base metal sheet, to thereby make the ferrite-forming element diffuse into the partial or whole region of the {100} texture formed in the surface layer portion of the base metal sheet to make the base metal sheet alloyed therewith. The region alloyed with the ferrite-forming element is turned to have the α single phase component and the region is transformed to the α phase from the γ phase. At this time, the region is transformed while taking over the orientation of the {100} texture formed in the surface layer portion, and thus the structure oriented in {100} is formed also in the alloyed region. As a result, in the alloyed region, a structure in which the accumulation degree of the {200} planes in the α-Fe phase becomes not less than 25% nor more than 50% and in accordance with it, the accumulation degree of the {222} planes in the α-Fe phase becomes not less than 1% nor more than 40% is formed.

Then, the base metal sheet is further heated to a temperature of not lower than the A3 point nor higher than 1300° C. and the temperature is held. The region alloyed already is turned into an α single phase structure that is not transformed to the γ phase, so that the crystal grains in the {100} texture are maintained as they are, and in the region, the crystal grains in the {100} texture preferentially grow and the accumulation degree of the {200} planes increases. Further, the region not having the α single phase component is transformed to the γ phase.

Figure 4A:
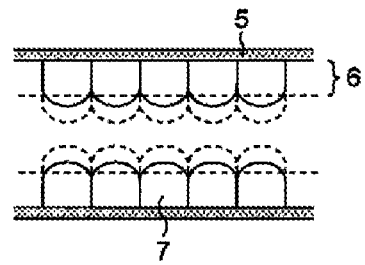
FIG. 4A is a view schematically showing the structure of the cross section of the base metal sheet in a state of being held at a temperature of an A3 point or higher.

Further, when the holding time is prolonged, the crystal grains in the {100} texture are united to one another to preferentially grow. As a result, the accumulation degree of the {200} planes further increases. Further, with the further diffusion of the ferrite-forming element, the region alloyed with the ferrite-forming element is transformed to the α phase from the γ phase. At this time, as shown in FIG. 4A, in the regions adjacent to the regions to be transformed, crystal grains 7 in the α phase oriented in {100} are already formed, and at the time of the transformation to the α phase from the γ phase, the regions alloyed with the ferrite-forming element are transformed while taking over a crystal orientation of the adjacent crystal grains 7 in the α phase. By these phenomena, the holding time is prolonged and the accumulation degree of the {200} planes increases. Further, as a result, the accumulation degree of the {200} planes decreases.

Incidentally, in order to finally obtain the high accumulation degree of the {200} planes of 50% or more, it is preferred that the holding time should be adjusted to, at this stage, bring the accumulation degree of the {200} planes in the α-Fe phase to 30% or more and bring the accumulation degree of the {200} planes in the α-Fe phase to 30% or less. Further, when the A3 point or higher is held until the whole metal sheet is alloyed, as shown in FIG. 4C, the α single phase structures are formed up to the center portion of the metal sheet and grain structures oriented in {100} reach the center of the metal sheet.

A holding temperature after the temperature is increased is set to not lower than the A3 point nor higher than 1300° C.

Even when the metal sheet is heated at a temperature higher than 1300° C., an effect with respect to the magnetic property is saturated. Further, cooling may be started immediately after the temperature reaches the holding temperature (in the case, the temperature is held for 0.01 second or longer substantially), or cooling may also be started after the temperature is held for 600 minutes or shorter. Even when the temperature is held for longer than 600 minutes, the effect is saturated. When this condition is satisfied, the achievement of high accumulation of the seeds oriented in the {200} plane further progresses to make it possible to more securely bring the accumulation degree of the {200} planes in the α-Fe phase to 30% or more after the cooling.

[Cooling after the Heating and Diffusion Treatment]

Figure 4B:
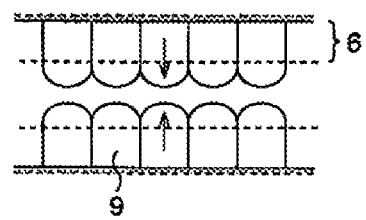
FIG. 4B is a view schematically showing the structure of the cross section of the base metal sheet after cooling in the case when the different metal layers are made to remain.
Figure 4C:
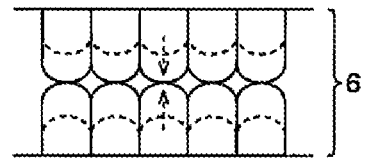
FIG. 4C is a view schematically showing the structure of the cross section of the base metal sheet in the case when the base metal sheet is alloyed up to its center portion in a state of being held at the temperature of the A3 point or higher.

After the diffusion treatment, when the cooling is performed while the region that is not alloyed with the ferrite-forming element is remaining, as shown in FIG. 4B, at the time of the transformation to the α phase from the γ phase, the unalloyed region is transformed while taking over the crystal orientation of the regions in which the crystal grains 9 in the α phase oriented in {100} are already formed. Thereby, the accumulation degree of the {200} planes increases, and the metal sheet having the texture in which the accumulation degree of the {200} planes in the α-Fe phase is not less than 30% nor more than 99% and the accumulation degree of the {200} planes in the α-Fe phase is not less than 0.01% nor more than 30% is obtained, the crystal satisfying the condition of the Z value grows, and a high magnetic flux density can be obtained in an arbitrary direction in the metal sheet plane.

Figure 4D:
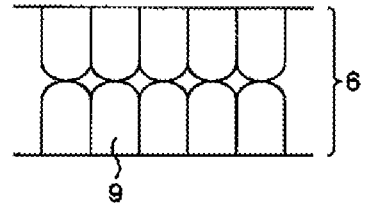
FIG. 4D is a view schematically showing the structure of the cross section of the base metal sheet after cooling in the case when the base metal sheet is alloyed up to the center portion.

Further, as shown in FIG. 4C, when the A3 point or higher is held until the whole metal sheet is alloyed, and the grain structures oriented in {100} reach the center of the metal sheet, as shown in FIG. 4D, the metal sheet is cooled as it is, and the texture in which the crystal grains 9 oriented in {100} reach up to the center of the metal sheet can be obtained. Thereby, the whole metal sheet is alloyed with the different metal, and the metal sheet having the texture in which the accumulation degree of the {200} planes in the α-Fe phase is not less than 30% nor more than 99% and the accumulation degree of the {222} planes in the α-Fe phase is not less than 0.01% nor more than 30% is obtained.

As above, the value of the accumulation degree of the {200} planes and the remaining state of the different metal on the surface of the base metal sheet change depending on the holding time of the temperature of the A3 point or higher and the holding temperature. The example shown in FIG. 4B is in a state where the grain structures oriented in {100} do not reach up to the center of the metal sheet, the different metal also remain on the surfaces, and an α single phase front surface side region and an α single phase rear surface side region being the second layer are formed, but it is also possible to obtain the grain structures oriented in {100} up to the center of the metal sheet and to alloy all the second layers on the surfaces.

Incidentally, at the time of the cooling after the diffusion treatment, a cooling rate is preferably not less than 0.1° C./sec nor more than 500° C./sec. When the cooling is performed in this temperature range, the growth of the seeds oriented in the {200} plane further progresses.

Further, when the second layers are made to remain on the obtainable Fe-based metal sheet having a thickness of not less than 10 μm nor more than 6 mm, the thickness of the second layer is preferably set to not less than 0.01 μm nor more than 500 μm. Further, a ratio of the α single phase region alloyed at this stage is preferably 1% or more in a cross section of the Fe-based metal sheet.

Figure 5:
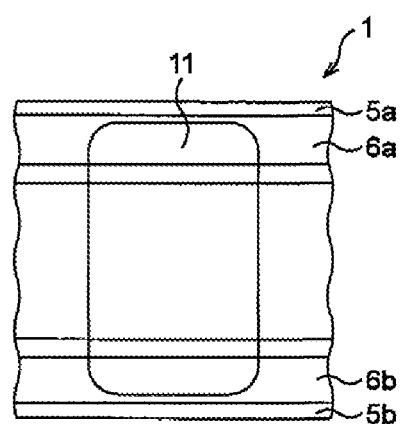
FIG. 5 is a view schematically showing the structure of the cross section of the base metal sheet in which a crystal grain becomes coarse.

Further, at the time of cooling to a temperature of lower than the A3 point in the state shown in FIG. 4A, an average cooling rate at the time of cooling to the A3 point—50° C. from the A3 point may be set to 50° C./minute or less. When the cooling is performed at the cooling rate in this range, the adjacent crystal grains oriented in {100} are united to one another to grow, and as shown in FIG. 5, a coarse crystal grain 11 straddling part of an α single phase front surface side region 6a adjacent to a front surface side second layer 5a and straddling part of an α single phase rear surface side region 6b adjacent to a rear surface side second layer 5b is formed. When the average cooling rate from the A3 point to the A3 point—50° C. becomes greater than 50° C./minute, there is no sufficient time for growth of the crystal grain 11, resulting in that an excellent core loss property cannot be obtained. On the other hand, the lower limit of the average cooling rate from the A3 point to the A3 point—50° C. is not limited, but the lower limit is preferably set to 1° C./minute in terms of the productivity.

Further, in order to obtain a more excellent core loss property, an average cooling rate at the time of cooling to the A3 point—10° C. from the A3 point is preferably set to 20° C./minute or less. On the other hand, the lower limit of the average cooling rate from the A3 point to the A3 point—10° C. is not limited, but the lower limit is preferably set to 1° C./minute in terms of the productivity.

(Second Embodiment)

In the previously described first embodiment, there was explained the manufacturing method of the previously described Fe-based metal sheet by using the cast slab containing C: less than 0.02 mass % and made of the Fe-based metal of the α-γ transforming component. In contrast to this, in this embodiment, there will be explained a manufacturing method of the previously described Fe-based metal sheet by using a cast slab containing C: 0.02 mass % or more.

When the C content is large, a good magnetic property cannot be obtained, so that it is necessary to remove C by performing decarburization annealing. Thus, the decarburization annealing is performed under conditions to be explained below, thereby making it possible to increase the accumulation degree of the {200} planes.

In the method of this embodiment, a {100} texture is formed in a surface layer portion of an Fe-based metal sheet by using γ-α transformation accompanying decarburization (and further demanganization), and thereafter a ferrite-forming element is made to diffuse into a partial or whole decarburized region and further over the region from its surface, and at the time of cooling, the whole Fe-based metal sheet is made to be oriented in {100}.

This embodiment as above is based on the fact found by the present inventors that {100} crystal grains in the texture formed in the surface preferentially grow at an A3 point or higher in a heating process to be performed for the diffusion of the ferrite-forming element and further when the ferrite-forming element is made to diffuse into the inner portion to make the Fe-based metal sheet alloyed therewith and then cooling is performed, an accumulation degree of {200} planes in a sheet plane of the Fe-based metal sheet increases.

[Explanation of the Basic Principle of the Second Embodiment of the Present Invention]

First, the basic principle of this embodiment capable of obtaining a high accumulation degree of {200} planes will be explained based on FIG. 3A to FIG. 3D, by taking the case of decarburization as an example.

(a) Seeding of a Texture

When being decarburized until C becomes less than 0.02 mass %, the Fe-based metal sheet containing C: 0.02 mass % or more and having a composition of the α-γ transforming component is heated to a temperature at which a structure is turned into an α single phase and to a temperature of a γ single phase or a two-phase region of a γ phase and an α phase (namely, a temperature of an A1 point or higher) to decarburize the surface layer portion of the Fe-based metal sheet until C becomes less than 0.02 mass %. Thereby, the γ-α transformation is made to occur in a process of the decarburization to turn the decarburized surface layer portion into the α phase.

At this time, the decarburization progresses the most in the <110> direction in the γ phase having large gaps between lattices, and in this portion, the C concentration becomes less than 0.02% and the transformation to the α phase occurs. A {110} plane in the γ phase becomes the {100} plane when the γphase is turned into the α phase in a BCC structure, and thus in the α phase after the decarburization, the {100} plane is preferentially formed. Further, the growth, of the crystal grains in the α phase formed in the surface, in the sheet thickness direction is slow because its rate is controlled by a decarburization rate, and thus the crystal grains in the α phase formed in the surface grow in a direction parallel to the sheet plane. Further, in the surface of the metal sheet, the {100} plane preferentially grows by taking surface energy as driving force. As a result, the whole surface of the metal sheet becomes a structure oriented in {100} finally. By this process, as shown in FIG. 3A, a base metal sheet 1 having an inner region 4 made of Fe in the α phase and having the accumulation degree of the {200} planes in the decarburized region brought to 20% or more can be obtained. Further, a seed of crystal that satisfies the condition of the Z value is formed in the structure formed at the time of the decarburization by taking the surface energy as driving force.

(b) (Formation of a Second Layer)

Next, as shown in FIG. 3B, the ferrite-forming element such as Al is bonded to one surface or both surfaces of the base metal sheet 1 after the decarburization by using a vapor deposition method or the like to form a second layer 5.

(c) Saving of the Texture

Next, the base metal sheet 1 having had the ferrite-forming element bonded thereto is heated to the A3 point of the base metal sheet 1 to make the ferrite-forming element diffuse into the partial or whole decarburized region in the base metal sheet 1 to make the base metal sheet 1 alloyed therewith. Thereby, as shown in FIG. 3C, the α phase is formed in an alloyed region 6. Alternately, the ferrite-forming element is made to diffuse into the inner portion over the decarburized region to make the base metal sheet 1 alloyed therewith, and the alloyed region is turned to have the α single phase component partially, and thereby the region is turned into the α phase. At this time, the region is transformed while taking over orientation of the region formed by the decarburization, so that the structure oriented in {100} is formed also in the alloyed region 6. Further, the orientation in {100} is further increased even in crystal grains turned into the α phase previously. Further, when the ferrite-forming element is made to diffuse and the crystal is oriented, the seed of the crystal satisfying the condition of the Z value preferentially grows.

(d) Achievement of High Accumulation of the Texture

Next, the partially alloyed base metal sheet 1 is further heated to a temperature of not lower than the A3 point nor higher than 1300° C. and the temperature is held. The region of the α single phase component is an α-Fe phase not undergoing γ transformation, and thus the {100} crystal grains are maintained as they are, the {100} crystal grains preferentially grow in the region, and the accumulation degree of the {200} planes increases. Further, as shown in FIG. 3D, the region not having the α single phase component is transformed to the γ phase from the α phase.

Further, when a holding time of the temperature after the heating is prolonged, the {100} crystal grains are united to preferentially grow to large {100} crystal grains 7. As a result, the accumulation degree of the {200} planes further increases. Further, with the diffusion of Al, the region alloyed with Al is transformed to the α phase from the γ phase. At that time, in the region adjacent to the region to be transformed, crystal grains in the α phase oriented in {100} are already formed, and at the time of the transformation to the α phase from the γ phase, the region is transformed while taking over a crystal orientation of the adjacent crystal grains in the α phase. Thereby, the holding time is prolonged and the accumulation degree of the {200} planes increases.

(e) Growth of the texture

Next, the base metal sheet is cooled to a temperature of lower than the A 3point. At this time, as shown in FIG. 3E, a γ-Fe phase in an unalloyed inner region 10 is transformed to the α-Fe phase. This inner region 10 is adjacent to the region in which the crystal grains in the α phase oriented in {100} are already formed in a temperature region of the A3point or higher, and at the time of the transformation to the α phase from the γ phase, the inner region 10 is transformed while taking over the crystal orientation of the adjacent crystal grains in the α phase and larger crystal grains 9 in the α phase oriented in {100} are formed. Therefore, the accumulation degree of the {200} planes increases also in the region (see the state shown in FIG. 3E). By this phenomenon, the high accumulation degree of the {200} planes can be obtained even in the unalloyed region 10.

When at the stage of the preceding state shown in FIG. 3D, the temperature of the A3 point or higher is held until the whole metal sheet is alloyed, the structure having the high accumulation degree of the {200} planes is already formed in the whole metal sheet, and thus the cooling is performed while the state when the cooling is started is maintained.

Further, in the above explained example, the Fe-based metal sheet containing C: 0.02 mass % or more is used, but when an Fe-based metal sheet containing C: less than 0.02 mass % is used, carburization is performed before the decarburization to bring the C content in the region to be decarburized to 0.02 mass % or more.

In the above, the basic constitution of this embodiment was explained, and there will be further explained a limiting reason of each condition that defines a manufacturing method of this embodiment and preferable conditions of this embodiment.

[Fe-Based Metal to be the Base Material] (C Content)

In this embodiment, first, crystal grains oriented in {100} to serve as seeds for increasing the accumulation degree of the {200} planes are formed in the surface of the base metal sheet made of the Fe-based metal. Then, the γ-α transformation is made to progress in the metal sheet while taking over a crystal orientation of the crystal grains in the α phase to serve as the seeds finally, to thereby increase the accumulation degree of the {200} planes of the whole metal sheet.

In this embodiment, the seeds of the crystal grains oriented in {100} are formed in the surface of the base metal sheet by structure control using the γ-α transformation accompanying decarburization or demanganization. The Fe-based metal used for the base metal sheet has a composition of the α-γtransforming component, and the C content in the region to be decarburized is brought to 0.02 mass % or more.

Further, the Fe-based metal used for the base metal sheet has the α-γ transforming component, and the ferrite-forming element is made to diffuse into the metal sheet to make the metal sheet alloyed therewith, thereby making it possible to form a region having the α single phase based component. Further, the C content in the region to be decarburized is brought to 0.02 mass % or more, thereby making it possible to use the γ-α transformation accompanying the decarburization.

For bringing the C content in the base metal sheet to 0.02 mass % or more, there is a method of using a base metal sheet manufactured from a molten material adjusted to contain C: 0.02 mass % or more by undergoing casting and rolling processes (a melting method). As another method, there is a method in which a base metal sheet having the C content of less than 0.02 mass % is used and in a surface layer portion of the base metal sheet, a region containing C: 0.02 mass % or more is formed by carburization.

In the case of the melting method, the range of the C content is set to not less than 0.02 mass % nor more than 1.0 mass %. When the C content is less than 0.02 mass %, it is not possible to use the formation of a {200} texture using the γ-α transformation accompanying the decarburization. Further, when the C content is more than 1.0% mass, a long time is required for the decarburization. The preferred range of the C content is not less than 0.05 mass % nor more than 0.5 mass %.

In the case of the carburization method, the range of the C content of the Fe-based metal of which the base metal sheet is made is set to 1 ppm or more and less than 0.02 mass %. Then, the surface layer of this Fe-based metal is subjected to the carburization so that the C concentration may become not less than 0.02 mass % nor more than 1.0 mass % in the same manner as that in the melting case.

Further, a carburizing range is set to a region down to a distance y from the surface, where the distance in a depth direction from the surface is set to y. This distance y is not less than 5 μm nor more than 50 μm. When the distance y is less than 5 μm, it is difficult to bring the accumulation degree of the {200} planes to 30% or more in the diffusion treatment after the decarburization, so that the distance y is set to 5 μm or more. Further, when the distance becomes greater than 50 μm, a long time is required for the carburization, and further a long time is required also for the decarburization of the whole carburized region. Further, an obtainable effect is also saturated, so that the preferred distance y is set to 50 μm or less. The carburizing method is not limited in particular, and a well-known gas carburizing method or the like may be performed.

Incidentally, the C content is preferably 0.005 mass % or less in terms of a magnetic property of a product metal sheet, so that in order to manufacture a steel sheet excellent in a magnetic property, silicon steel having the C content of 0.005 mass % or less is used to be subjected to carburization in a manner to have the above-described C concentration, which is advantageous for cost.

(Mn Content)

When Mn being an austenite stabilizing element is contained in the Fe-based metal, it is possible to form seeds of crystal grains oriented in {100} by structure control using the γ-α transformation accompanying demanganization. The demanganization is performed together with the decarburization, and thereby the surface layer portion is turned into the α phase more efficiently and the accumulation degree of the {200} planes in a decarburized and demanganized region is more increased. In order to exhibit such a function, the Mn content before performing the demanganization treatment is preferably set to 0.2 mass % or more.

The above-described structure control using the γ-α transformation can be performed even by the decarburization alone, so that Mn does not have to be contained. However, when Mn is contained, an effect of increasing electric resistance to decrease a core loss is also obtained, and thus Mn in a range of 2.0 mass % or less may also be contained according to need even when no demanganization is performed. From the above point, the range of the Mn content when Mn is contained is preferably set to 0.2 mass % to 2.0 mass %.

(Other Containing Elements)

In principle, being applicable to the Fe-based metal having the α-γ transforming component, this embodiment is not limited to the Fe-based metal in a specific composition range. Typical examples of the α-γ transforming component are pure iron, steel such as ordinary steel, and the like. For example, it is a component containing pure iron or steel containing C of 1 ppm to 0.10 mass % as described above or further containing Mn of 0.2 mass % to 2.0 mass % and a balance being composed of Fe and inevitable impurities as its base and containing an additive element as required. Instead, it may be silicon steel of the α-γ transforming component having C: 1.0 mass % or less and Si: 0.1 mass % to 2.5 mass % as its basic component. Further, as other impurities, a trace amount of Ni, Cr, Al, Mo, W, V, Ti, Nb, B, Cu, Co, Zr, Y, Hf, La, Ce, N, O, P, S, and/or the like are/is contained. Incidentally, Al and Mn are added to increase electric resistance, to thereby decrease a core loss and Co is added to increase the saturation magnetic flux density Bs, to thereby increase a magnetic flux density, which are also included in the present invention range.

(Thickness of the Base Metal Sheet)

The thickness of the base metal sheet is set to not less than 10 μm nor more than 6 mm. When the thickness is less than 10 μm, when the base metal sheets are stacked to be used as a magnetic core, the number of the sheets to be staked is increased to increase gaps, resulting in that a high magnetic flux density cannot be obtained. Further, when the thickness is greater than 6 mm, it is not possible to make the {100} texture grow sufficiently after cooling after the diffusion treatment, resulting in that a high magnetic flux density cannot be obtained.

[Decarburization Treatment]

In the decarburization treatment for turning the surface layer portion of the base metal sheet into the α phase, the base metal sheet is desirably heated in a decarburizing atmosphere to be decarburized in the following manner.

(Temperature of the Decarburization Treatment)

The temperature of the decarburization treatment is set to a temperature of the A1 point or higher and a temperature at which a structure is turned into an α single phase when the decarburization is performed until C becomes less than 0.02 mass %. The base metal sheet containing C: 0.02 mass % or more is heated to a temperature of a γ single phase or a two-phase region of a γ phase and an α phase (namely a temperature of the A1 point or higher) in order to make the γ-α transformation occur by the decarburization.

(Atmosphere of the Decarburization Treatment)

With regard to the decarburizing atmosphere, a conventionally known method in manufacture of a grain-oriented electrical steel sheet can be employed. For example, there is a method in which decarburization is first performed in a weak decarburizing atmosphere, in a vacuum of 1 Torr or less, for example, or in a gas atmosphere of one type or two or more types of $H_2$, He, Ne, Nr, Kr, Xe, Rn, and $N_2$ at a temperature of lower than (a dew point—20)° C., and next decarburization is performed in a strong decarburizing atmosphere, or in a gas atmosphere in which an inert gas, or CO and $CO_2$ is/are added to $H_2$ at a temperature of (a dew point—20)° C. or higher, for example. In this case, if the decarburization is continued to the end in the weak decarburizing atmosphere, a long time is required.

(Period of Performing the Decarburization Treatment)

The period of performing the decarburization treatment is preferably not shorter than 0.1 minute nor longer than 600 minutes. When the period is shorter than 0.1 minute, it is difficult to bring the accumulation degree of the {200} planes to 20% or more after the decarburization, and when the period is long so as to exceed 600 minutes, too much cost is needed.

(Range of Performing the Decarburization Treatment)

The range of performing the decarburization treatment is a range down to a distance x, where the distance in the depth direction from the surface is set to x, and the distance x is not less than 5 μm nor more than 50 μm. When the distance x is less than 5 μm, it is difficult to bring the accumulation degree of the {200} planes to 30% or more in the diffusion treatment after the decarburization. For this reason, the distance x in the depth direction from the surface is set to 5 μm or more. Further, when the distance is greater than 50 μm, a long time is required for the decarburization, and further the accumulation degree of the {200} planes is saturated, and thus it is not advantageous industrially. Thus, the distance x is set to 50 μm or less.

(Other Decarburizing Methods)

Further, as described in Patent Literature 6, it is also possible that a material promoting decarburization is applied to a surface of a steel sheet as an annealing separating agent and this is wound around a coil and is subjected to coil annealing, to thereby form a decarburized region. Further, it is also possible that the above-described annealing separating agent is applied to a surface of a steel sheet in α single sheet form and the steel sheets are stacked to be subjected to annealing at the above-described temperature for a similar time, to thereby form a decarburized region.

(C Content after the Decarburization)

The C content after the decarburization is set to less than 0.02 mass % in order to obtain an α-phase single phase structure as described above. It is preferably 0.005 mass % or less in terms of the magnetic property of a product.

(Accumulation Degree of the {200} Planes after the Decarburization)

It is preferred that the accumulation degree of the {200} planes in the decarburized region after the decarburization should become 20% or more by performing the decarburization annealing under the above conditions. When the accumulation degree of the {200} planes is less than 20%, it is difficult to bring the accumulation degree of the {200} planes to 30% or more in the diffusion treatment to be performed subsequently. Further, the upper limit of the accumulation degree of the {200} planes is preferably set to 99%. When it is greater than 99%, the magnetic property deteriorates. The accumulation degree of the {200} planes is adjusted to fall within the above-described range by selecting the conditions of the decarburizing temperature, the decarburizing time, the decarburizing atmosphere, and the like. Incidentally, the measurement of the accumulation degree of the plane in the above-described orientation plane can be performed by X-ray diffraction using a MoKα ray similarly to the first embodiment.

[Demanganization Treatment]

In this embodiment, the decarburization treatment and the demanganization treatment may also be used in combination by containing Mn in the base metal sheet. The demanganization treatment is performed simultaneously with the decarburization or subsequently to the decarburization under the following conditions. Incidentally, as described in Patent Literature 6, it is also possible to perform the decarburization treatment and the demanganization treatment simultaneously in a state where steel sheets each have an annealing separating agent containing a material promoting decarburization and a material promoting demanganization applied thereto to be staked.

(Temperature and Range of the Demanganization Treatment)

The temperature at which the demanganization treatment is performed is set to a temperature of the A1 point or higher similarly to the decarburization. With regard to a demanganizing atmosphere, the demanganization treatment may be performed under a reduced pressure atmosphere. Further, the period of performing the demanganization treatment is preferably set to fall within a range of not shorter than 0.1 minute nor longer than 600 minutes similarly to the decarburization.

(Range of Performing the Demanganization Treatment)

The range of performing the demanganization treatment is a range down to a distance x, where the distance in the depth direction from the surface is set to x, and the distance x is preferably not less than 5 μm nor more than 50 μm. When the distance x is less than 5 μm, it is difficult to bring the accumulation degree of the {200} planes to 30% or more in the diffusion treatment after the demanganization. For this reason, the preferred distance x in the depth direction from the surface is set to 5 μm or more. Further, when the distance is greater than 50 μm, a long time is required for the demanganization, and further the accumulation degree of the {200} planes is saturated, and thus it is not advantageous industrially. Thus, the preferred distance x is set to 50 μm or less.

(Accumulation Degree of the {200} Planes after the Demanganization)

It is preferred that the accumulation degree of the {200} planes in the region having been subjected to the demanganization treatment should become 20% or more after the demanganization by performing the decarburization annealing under the above conditions. When the accumulation degree of the {200} planes is less than 20%, it is difficult to bring the accumulation degree of the {200} planes to 30% or more in the diffusion treatment to be performed subsequently. The upper limit of the accumulation degree of the {200} planes is preferably set to 99%. When it is greater than 99%, the magnetic property deteriorates.

[Different Metal]

Next, a different metal except Fe is made to diffuse into the base metal sheet having had the surface layer portion turned into the α phase by the decarburization to increase the region of the {100} texture in the thickness direction of the metal sheet. As the different metal, the ferrite-forming element is used. As a procedure, first, the different metal is bonded in a layered form as the second layer to one surface or both surfaces of the base metal sheet made of the Fe-based metal of the α-γ transforming component. Then, a region alloyed by having had elements of the different metal diffuse thereinto is turned to have the α single phase based component and to be able to be maintained as not only the region having been subjected to the decarburization (or further the demanganization) to be transformed to the α phase, but also a seed oriented in {100} for increasing the accumulation degree of the {200} planes in the metal sheet. As such a ferrite-forming element, at least one type of Al, Cr, Ga, Ge, Mo, Sb, Si, Sn, Ta, Ti, V, W, and Zn can be used alone or in a combined manner.

As a method of bonding the different metal in a layered form to the surface of the base metal sheet, there can be employed various methods such as a plating method of hot dipping, electrolytic plating, or the like, a rolling clad method, a dry process of PVD, CVD, or the like, and further powder coating. As a method of efficiently bonding the different metal for industrially implementing the method, the plating method or the rolling clad method is suitable.

The thickness of the different metal before the heating when the different metal is bonded is preferably not less than 0.05 μm nor more than 1000 μm. When the thickness is less than 0.05 μm, it is not possible to obtain the sufficient accumulation degree of the {200} planes. Further, when the thickness exceeds 1000 μm, even when the different metal layer is made to remain, its thickness becomes larger than necessary.

[Heating and Diffusion Treatment]

The base metal sheet having had the ferrite-forming element bonded thereto is heated up to the A3 point of the base metal sheet, to thereby make the ferrite-forming element diffuse into the partial or whole region in the base metal sheet to make the base metal sheet alloyed therewith. The α phase is maintained in the region alloyed with the ferrite-forming element. Alternately, the ferrite-forming element is made to diffuse into the inner portion over the decarburized region to make the base metal sheet alloyed therewith, and the alloyed region is turned to have the α single phase component partially, and thereby the region is turned into the α phase. At this time, the region is transformed while taking over the orientation of the region formed by the decarburization, so that the accumulation degree of the {200} planes further increases. As a result, in the alloyed region, a structure in which the accumulation degree of the {200} planes in the α-Fe phase becomes not less than 25% nor more than 50% and in accordance with it, the accumulation degree of the {200} planes in the α-Fe phase becomes not less than 1% nor more than 40% is formed.

Then, the base metal sheet is further heated to a temperature of not lower than the A3 point nor higher than 1300° C. and the temperature is held. The region alloyed already is turned into an α single phase structure that is not transformed to the γ phase, so that the {100} crystal grains are maintained as they are, and in the region, the crystal grains in the {100} texture preferentially grow and the accumulation degree of the {200} planes increases. Further, the region not having the α single phase component is transformed to the γ phase.

Further, when the holding time is prolonged, the crystal grains in the {100} texture are united to one another to preferentially grow. As a result, the accumulation degree of the {200} planes further increases. Further, with the further diffusion of the ferrite-forming element, the region alloyed with the ferrite-forming element is transformed to the α phase from the γ phase. At this time, as shown in FIG. 4A, in the regions adjacent to the regions to be transformed, crystal grains 7 in the α phase oriented in {100} are already formed, and at the time of the transformation to the α phase from the γ phase, the regions alloyed with the ferrite-forming element are transformed while taking over a crystal orientation of the adjacent crystal grains 7 in the α phase. Thereby, the holding time is prolonged and the accumulation degree of the {200} planes increases. Further, as a result, the accumulation degree of the {200} planes decreases.

Incidentally, in order to finally obtain the high accumulation degree of the {200} planes of 50% or more, it is preferred that the holding time should be adjusted to, at this stage, bring the accumulation degree of the {200} planes in the α-Fe phase to 30% or more and bring the accumulation degree of the {200} planes in the α-Fe phase to 30% or less. Further, when the A3 point or higher is held until the whole metal sheet is alloyed, as shown in FIG. 4C, the α single phase structures are formed up to the center portion of the metal sheet and grain structures oriented in {100} reach the center of the metal sheet.

A holding temperature after the temperature is increased is set to not lower than A3 point nor higher than 1300° C. Even when the metal sheet is heated at a temperature higher than 1300° C., an effect with respect to the magnetic property is saturated. Further, cooling may be started immediately after the temperature reaches the holding temperature, or cooling may also be started after the temperature is held for 6000 minutes or shorter. When this condition is satisfied, the achievement of high accumulation of the seeds oriented in the {200} plane further progresses to make it possible to more securely bring the accumulation degree of the {200} planes in the α-Fe phase to 30% or more after the cooling.

[Cooling after the Heating and Diffusion Treatment]

After the diffusion treatment, when the cooling is performed while the region that is not alloyed with the ferrite-forming element is remaining, as shown in FIG. 4B, at the time of the transformation to the α phase from the γ phase, the unalloyed region is transformed while taking over the crystal orientation of the regions in which the crystal grains 9 in the α phase oriented in {100} are already formed. Thereby, the accumulation degree of the {200} planes increases, and the metal sheet having the texture in which the accumulation degree of the {200} planes in the α-Fe phase is not less than 30% nor more than 99% and the accumulation degree of the {200} planes in the α-Fe phase is not less than 0.01% nor more than 30% is obtained, the crystal satisfying the condition of the Z value grows, and a high magnetic flux density can be obtained in an arbitrary direction in the metal sheet plane.

Further, as shown in FIG. 4C, when the A3 point or higher is held until the whole metal sheet is alloyed and the grain structures oriented in {100} reach the center of the metal sheet, as shown in FIG. 4D, the metal sheet is cooled as it is, and the texture in which the grain structures oriented in {100} reach the center of the metal sheet can be obtained. Thereby, the whole metal sheet is alloyed with the different metal, and the metal sheet having the texture in which the accumulation degree of the {200} planes in the α-Fe phase is not less than 30% nor more than 99% and the accumulation degree of the {200} planes in the α-Fe phase is not less than 0.01% nor more than 30% is obtained.

As above, the value of the accumulation degree of the {200} planes and the remaining state of the different metal on the surface of the base metal sheet change depending on the holding time of the temperature of the A3 point or higher and the holding temperature. The example shown in FIG. 4B is in a state where the grain structures oriented in {100} do not reach up to the center of the metal sheet and the different metal also remains on the surfaces, but it is also possible to obtain the grain structures oriented in {100} up to the center of the metal sheet and to alloy all the second layers on the surfaces.

Incidentally, at the time of the cooling after the diffusion treatment, a cooling rate is preferably not less than 0.1° C./sec nor more than 500° C./sec. When the cooling rate is less than 0.1° C./sec, a long time is required for the cooling, which is not appropriate, and when the cooling rate is greater than 500° C./sec, the metal sheet is sometimes deformed, and thus the cooling rate is preferably 500° C./sec or less.

Incidentally, when the second layers are made to remain on the obtainable Fe-based metal sheet having a thickness of not less than 10 μm nor more than 6 mm, the thickness of the second layer is preferably set to not less than 0.01 μm nor more than 500 μm. Further, a ratio of the α single phase region alloyed at this stage is preferably 1% or more in a cross section of the Fe-based metal sheet.

Further, it is also possible to form a structure as shown in FIG. 5, and in this case, an average cooling rate is set to satisfy the condition similar to that of the first embodiment, and thereby the above can be achieved.

EXAMPLE

Next, there will be explained experiments conducted by the present inventors. Conditions and the like in these experiments are examples employed for confirming the applicability and effects of the present invention, and the present invention is not limited to these examples.

Example 1

In this example, base metal sheets of No. 1 to No. 17 each made of a component A or B shown in Table 1 below were manufactured under various rolling conditions, to then have various different metals applied thereto as a second layer, and then Fe-based metal sheets were fabricated, of which the previously described Z value (=(A +0.97B)/0.98C) and the magnetic flux density difference ΔB were examined. Further, the relationship between various manufacturing conditions and an accumulation degree of {200} planes was also examined. Further, effects obtained by changing a starting temperature in an a-region rolling process were also examined in detail.

TABLE 1

| COMPONENT SERIES | A3 POINT | ELEMENT MASS % | | | | | | | | |
|---|---|---|---|---|---|---|---|---|---|---|
| | | C | Si | Mn | Al | P | N | S | O | OTHER |
| A | 925 | 0.0008 | 0.3 | 0.3 | 0.5 | 0.0003 | 0.0002 | <0.0004 | 0.0002 | — |
| B | 1010 | 0.0012 | 1.1 | 0.8 | 0.1 | 0.0002 | 0.0003 | <0.0004 | 0.0001 | — |
| C | 915 | 0.0032 | 0.2 | 0.08 | 0.05 | 0.0001 | 0.0003 | <0.0004 | 0.0001 | — |
| D | 870 | 0.0041 | 0.1 | 1.5 | 0.2 | 0.0001 | 0.0002 | <0.0004 | 0.0001 | — |
| E | 942 | 0.0105 | 0.2 | 0.5 | 0.7 | 0.0001 | 0.0003 | <0.0004 | 0.0001 | Cr: 0.5 |

First, ingots each having the component A or B shown in Table 1 and a balance being composed of Fe and inevitable impurities were melted by vacuum melting. Then, these were used as rolling materials to be worked into cold-rolled sheets (the base metal sheets) each having a predetermined thickness under conditions of hot rolling, α-region rolling, and cold rolling shown in Table 2 below.

In the case of the component A, the ingots each having a thickness of 250 mm heated to 1150° C. were first subjected to hot rolling at a reduction ratio of −3.22 in terms of true strain, and hot-rolled sheets each having a thickness of 10 mm were obtained. Next, these hot-rolled sheets were each subjected to α-region rolling at a reduction ratio of −1.39 in terms of true strain at a temperature of 300 to 1000° C. These rolled

TABLE 2

| | | | HOT ROLLING | | | | | α-REGION ROLLING | | |
|---|---|---|---|---|---|---|---|---|---|---|
| | | | START | | FINISH | | | START | | FINISH |
| BASE MATERIAL No. | COMPONENT | A3 POINT | TEMPERATURE ° C. | THICKNESS mm | TEMPERATURE ° C. | THICKNESS mm | REDUCTION RATIO | TEMPERATURE ° C. | THICKNESS mm | TEMPERATURE ° C. |
| 1 | A | 925 | 1150 | 250 | 1000 | 10 | −3.22 | 950 | 10 | 920 |
| 2 | A | 925 | 1150 | 250 | 1000 | 10 | −3.22 | 920 | 10 | 830 |
| 3 | A | 925 | 1150 | 250 | 1000 | 10 | −3.22 | 850 | 10 | 830 |
| 4 | A | 925 | 1150 | 250 | 1000 | 10 | −3.22 | 750 | 10 | 730 |
| 5 | A | 925 | 1150 | 250 | 1000 | 10 | −3.22 | 650 | 10 | 640 |
| 6 | A | 925 | 1150 | 250 | 1000 | 10 | −3.22 | 550 | 10 | 540 |
| 7 | A | 925 | 1150 | 250 | 1000 | 10 | −3.22 | 450 | 10 | 450 |
| 8 | A | 925 | 1150 | 250 | 1000 | 10 | −3.22 | 300 | 10 | 350 |
| 9 | A | 925 | 1150 | 250 | 1000 | 10 | −3.22 | 250 | 10 | 250 |
| 10 | B | 1010 | 1200 | 280 | 1050 | 50 | −1.72 | 1050 | 50 | 980 |
| 11 | B | 1010 | 1200 | 280 | 1050 | 50 | −1.72 | 950 | 50 | 880 |
| 12 | B | 1010 | 1200 | 280 | 1050 | 50 | −1.72 | 850 | 50 | 770 |
| 13 | B | 1010 | 1200 | 280 | 1050 | 50 | −1.72 | 750 | 50 | 660 |
| 14 | B | 1010 | 1200 | 280 | 1050 | 50 | −1.72 | 600 | 50 | 580 |
| 15 | B | 1010 | 1200 | 280 | 1050 | 50 | −1.72 | 450 | 50 | 485 |
| 16 | B | 1010 | 1200 | 280 | 1050 | 50 | −1.72 | 300 | 50 | 390 |
| 17 | B | 1010 | 1200 | 280 | 1050 | 50 | −1.72 | 250 | 50 | 230 |

| BASE MATERIAL No. | α-REGION ROLLING FINISH | | COLD ROLLING | | | TOTAL REDUCTION RATIO | REDUCTION RATIO OF α REGION + COLD ROLLING |
|---|---|---|---|---|---|---|---|
| | | | START | FINISH | | | |
| | THICKNESS min | REDUCTION RATIO | THICKNESS mm | THICKNESS mm | REDUCTION RATIO | | |
| 1 | 2.5 | −1.39 | 2.5 | 0.2 | −2.53 | −7.13 | −3.91 |
| 2 | 2.5 | −1.39 | 2.5 | 0.2 | −2.53 | −7.13 | −3.91 |
| 3 | 2.5 | −1.39 | 2.5 | 0.2 | −2.53 | −7.13 | −3.91 |
| 4 | 2.5 | −1.39 | 2.5 | 0.2 | −2.53 | −7.13 | −3.91 |
| 5 | 2.5 | −1.39 | 2.5 | 0.2 | −2.53 | −7.13 | −3.91 |
| 6 | 2.5 | −1.39 | 2.5 | 0.2 | −2.53 | −7.13 | −3.91 |
| 7 | 2.5 | −1.39 | 2.5 | 0.2 | −2.53 | −7.13 | −3.91 |
| 8 | 2.5 | −1.39 | 2.5 | 0.2 | −2.53 | −7.13 | −3.91 |
| 9 | 2.5 | −1.39 | 2.5 | 0.2 | −2.53 | −7.13 | −3.91 |
| 10 | 3.0 | −2.81 | 3.0 | 0.5 | −1.79 | −6.33 | −4.61 |
| 11 | 3.0 | −2.81 | 3.0 | 0.5 | −1.79 | −6.33 | −4.61 |
| 12 | 3.0 | −2.81 | 3.0 | 0.5 | −1.79 | −6.33 | −4.61 |
| 13 | 3.0 | −2.81 | 3.0 | 0.5 | −1.79 | −6.33 | −4.61 |
| 14 | 3.0 | −2.81 | 3.0 | 0.5 | −1.79 | −6.33 | −4.61 |
| 15 | 3.0 | −2.81 | 3.0 | 0.5 | −1.79 | −6.33 | −4.61 |
| 16 | 3.0 | −2.81 | 3.0 | 0.5 | −1.79 | −6.33 | −4.61 |
| 17 | 3.0 | −2.81 | 3.0 | 0.5 | −1.79 | −6.33 | −4.61 | sheets obtained by the α-region rolling were pickled, and then the base metal sheets were obtained by cold rolling. At this time, the reduction ratio was −2.53 in terms of true strain, and as a result, the thickness of each of the obtained base metal sheets was 0.2 mm.

In the case of the component B, the ingots each having a thickness of 280 mm heated to 1200° C. were first subjected to hot rolling at a reduction ratio of −1.72 in terms of true strain, and hot-rolled sheets each having a thickness of 50 mm were obtained. Next, these hot-rolled sheets were each subjected to α-region rolling at a reduction ratio of −2.81 in terms of true strain at a temperature of 300 to 1050° C. These rolled sheets obtained by the α-region rolling were pickled, and then the base metal sheets were obtained by cold rolling. At this time, the reduction ratio was −1.79 in terms of true strain, and as a result, the thickness of each of the obtained base metal sheets was 0.5 mm.

With respect to the base metal sheets obtained by the above procedure, a texture of a surface layer portion of each of the base materials was measured by X-ray diffraction to obtain an accumulation degree of {200} planes and an accumulation degree of {222} planes by the previously described method. Further, thinning was performed so that a structure could be observed from a direction perpendicular to an L cross section, and a region up to ¼t (t represents a thickness) from the surface was observed. The main phase of each of the obtained base metal sheets at room temperature was an α-Fe phase. Further, as a result of measurement, the A3 point at which the α-γ transformation occurred was 925° C. in the component A and 1010° C. in the component B.

Next, both surfaces of each of the base metal sheets of No. 1 to No. 17 shown in Table 2 were coated with each of various different metal elements as the second layer by a vapor deposition method, a sputtering method, or an electroplating method. As shown in Table 3 and Table 4 below, as the different metal element, any one of Al, Si, Mo, Ga, Sn, Ti, Ge, Sb, V, and W was selected. The thickness of each of the coatings was as shown in Table 3 and Table 4.

Next, an experiment was performed in which a heat treatment was performed on the base metal sheets to each of which the second layers were bonded under various conditions. A gold image furnace was used for the heat treatment, and a holding time was controlled by program control. During which the temperature increased to be held, the heat treatment was performed in an atmosphere vacuumed to a pressure of $10^{-3}$ Pa level. At the time of cooling, in the case of a cooling rate of 1° C./sec or lower, temperature control was performed in a vacuum by furnace output control. Further, in the case of the cooling rate of 10° C./sec or more, an Ar gas was introduced and the cooling rate was controlled by adjustment of its flow rate.

Here, there was examined a change in the texture among a temperature increasing process of heating up to the A3 point, a holding process of heating to a temperature of not lower than the A3 point nor higher than 1300° C. and holding the temperature, and a cooling process of cooling to a temperature of lower than the A3 point. Specifically, three base metal sheets with the same combination of the base material-coating conditions were prepared, of which a change in the texture was examined by performing a heat treatment experiment in each of the processes.

A sample for the temperature increasing process was fabricated in such a manner that the base metal sheet was heated from room temperature to the A3 point at a predetermined temperature increasing rate and was cooled to room temperature without any holding time. The cooling rate was set to 100° C./sec. The texture was measured by the method using the previously described X-ray diffraction method, and the X-ray was emitted from its surface, and the accumulation degree of {200} planes in the α-Fe phase and the accumulation degree of {222} planes in the α-Fe phase were obtained in an inverse pole figure.

A sample for the holding process was fabricated in such a manner that the base metal sheet was heated from room temperature to a predetermined temperature over the A3 point at a predetermined temperature increasing rate and was cooled to room temperature after a predetermined holding time. Then, the texture of the fabricated sample was measured in the same manner, and the accumulation degrees of {200} and {222} planes in the α-Fe phase were obtained.

A sample for the cooling process was fabricated in such a manner that the base metal sheet was heated from room temperature to a predetermined temperature over the A3 point at a predetermined temperature increasing rate and was cooled to room temperature at a predetermined cooling rate after a predetermined holding time. Further, in order to evaluate the accumulation degrees of {200} and {222} planes at an unalloyed position, a test piece was fabricated by removing a layer from the surface of the fabricated sample to a predetermined distance so that the unalloyed position might become an evaluation surface. Incidentally, when the whole metal sheet was alloyed, the evaluation surface was set to a position of ½ of the sheet thickness. With regard to the measurement of the texture of the fabricated sample, the X-ray was emitted from the surface of the test piece and from a predetermined surface of the test piece from which the layer was removed, and the accumulation degrees of {200} and {200} planes in the α-Fe phase of the surfaces were obtained in the same manner.

Next, magnetometry was performed in order to evaluate obtained products. First, the average magnetic flux density B50 to a magnetizing force of 5000 A/m and the magnetic flux density difference ΔB were obtained by using a SST (Single Sheet Tester). At this time, a measurement frequency was set to 50 Hz. When the average magnetic flux density B50 was obtained, as shown in FIG. 1, the magnetic flux density B50 was obtained every 22.5° in a circumferential direction of the product and an average value of the magnetic flux densities B50 in these 16 directions was calculated. Further, of the magnetic flux densities B50 in these 16 directions, the difference between the maximum value and the minimum value was set to the magnetic flux density difference ΔB. Next, the saturation magnetic flux density Bs was obtained by using a VSM (Vibrating Sample Magnetometer). The magnetizing force applied at this time was $0.8 \times 10^6$ A/m. An evaluation value was set to the ratio B50/Bs of the average magnetic flux density B50 to the saturation magnetic flux density.

Further, by the previously described X-ray diffraction, intensity ratios of {001}<470>, {116}<6 12 1>, and {223}<692> were calculated, and thereby the previously described Z value was calculated.

Table 3 and Table 4 below show the accumulation degrees of the {200} planes and the accumulation degrees of the {222} planes measured in the respective processes during the manufacture and after the manufacture, the Z values of the obtained Fe-based metal sheets, and evaluation results of the magnetometry.

TABLE 3

| | | BASE MATERIAL | SECOND LAYER | | | SEEDING | | | |
|---|---|---|---|---|---|---|---|---|---|
| | | | | | | TEMPERATURE | | SEEDING ACCUMULATION | SEEDING ACCUMULATION |
| No. | No. | THICK-NESS mm | ELEMENT | THICK-NESS μm | BONDING METHOD | INCREASING RATE °C./sec | MEASURED TEMPERATURE | DEGREE OF {200} PLANES IN αFe | DEGREE OF {222} PLANES IN αFe |
| 1 | 1 | 0.2 | Al | 4 | VAPOR DEPOSITION | 20 | 925 | 14 | 13 |
| 2 | 2 | 0.2 | Al | 4 | VAPOR DEPOSITION | 20 | 925 | 19 | 12 |
| 3 | 3 | 0.2 | Al | 4 | VAPOR DEPOSITION | 20 | 925 | 25 | 10 |
| 4 | 4 | 0.2 | Al | 4 | VAPOR DEPOSITION | 20 | 925 | 27 | 9.6 |
| 5 | 5 | 0.2 | Al | 4 | VAPOR DEPOSITION | 20 | 925 | 33 | 9.1 |
| 6 | 6 | 0.2 | Al | 4 | VAPOR DEPOSITION | 20 | 925 | 34 | 8.8 |
| 7 | 7 | 0.2 | Al | 4 | VAPOR DEPOSITION | 20 | 925 | 35 | 8.7 |
| 8 | 8 | 0.2 | Al | 4 | VAPOR DEPOSITION | 20 | 925 | 28 | 9.5 |
| 9 | 9 | 0.2 | Al | 4 | VAPOR DEPOSITION | 20 | 925 | 27 | 9.8 |
| 10 | 1 | 0.2 | Si | 5 | SPUTTERING | 70 | 925 | 14 | 13 |
| 11 | 2 | 0.2 | Si | 5 | SPUTTERING | 70 | 925 | 18 | 12 |
| 12 | 3 | 0.2 | Si | 5 | SPUTTERING | 70 | 925 | 26 | 10 |
| 13 | 4 | 0.2 | Si | 5 | SPUTTERING | 70 | 925 | 27 | 9.4 |
| 14 | 5 | 0.2 | Si | 5 | SPUTTERING | 70 | 925 | 32 | 8.8 |
| 15 | 6 | 0.2 | Si | 5 | SPUTTERING | 70 | 925 | 35 | 8.2 |
| 16 | 7 | 0.2 | Si | 5 | SPUTTERING | 70 | 925 | 35 | 8.3 |
| 17 | 8 | 0.2 | Si | 5 | SPUTTERING | 70 | 925 | 29 | 9.7 |
| 18 | 9 | 0.2 | Si | 5 | SPUTTERING | 70 | 925 | 28 | 10 |
| 19 | 1 | 0.2 | Mo | 1.5 | SPUTTERING | 10 | 925 | 15 | 12 |
| 20 | 2 | 0.2 | Mo | 1.5 | SPUTTERING | 10 | 925 | 17 | 11 |
| 21 | 3 | 0.2 | Mo | 1.5 | SPUTTERING | 10 | 925 | 26 | 9.8 |
| 22 | 4 | 0.2 | Mo | 1.5 | SPUTTERING | 10 | 925 | 28 | 9.2 |
| 23 | 5 | 0.2 | Mo | 1.5 | SPUTTERING | 10 | 925 | 33 | 8.6 |
| 24 | 6 | 0.2 | Mo | 1.5 | SPUTTERING | 10 | 925 | 35 | 8.3 |
| 25 | 7 | 0.2 | Mo | 1.5 | SPUTTERING | 10 | 925 | 36 | 8.1 |
| 26 | 8 | 0.2 | Mo | 1.5 | SPUTTERING | 10 | 925 | 27 | 10 |
| 27 | 9 | 0.2 | Mo | 1.5 | SPUTTERING | 10 | 925 | 26 | 11 |
| 28 | 1 | 0.2 | Ga | 3 | VAPOR DEPOSITION | 0.5 | 925 | 15 | 13 |
| 29 | 2 | 0.2 | Ga | 3 | VAPOR DEPOSITION | 0.5 | 925 | 17 | 12 |
| 30 | 3 | 0.2 | Ga | 3 | VAPOR DEPOSITION | 0.5 | 925 | 26 | 10 |
| 31 | 4 | 0.2 | Ga | 3 | VAPOR DEPOSITION | 0.5 | 925 | 28 | 9.3 |
| 32 | 5 | 0.2 | Ga | 3 | VAPOR DEPOSITION | 0.5 | 925 | 34 | 8.7 |
| 33 | 6 | 0.2 | Ga | 3 | VAPOR DEPOSITION | 0.5 | 925 | 35 | 8.1 |
| 34 | 7 | 0.2 | Ga | 3 | VAPOR DEPOSITION | 0.5 | 925 | 35 | 7.8 |
| 35 | 8 | 0.2 | Ga | 3 | VAPOR DEPOSITION | 0.5 | 925 | 27 | 10 |
| 36 | 9 | 0.2 | Ga | 3 | VAPOR DEPOSITION | 0.5 | 925 | 25 | 11 |
| 37 | 1 | 0.2 | Sn | 6 | ELECTROLYTIC PLATING | 5 | 925 | 16 | 13 |
| 38 | 2 | 0.2 | Sn | 6 | ELECTROLYTIC PLATING | 5 | 925 | 19 | 11 |
| 39 | 3 | 0.2 | Sn | 6 | ELECTROLYTIC PLATING | 5 | 925 | 27 | 9.5 |
| 40 | 4 | 0.2 | Sn | 6 | ELECTROLYTIC PLATING | 5 | 925 | 28 | 9.1 |
| 41 | 5 | 0.2 | Sn | 6 | ELECTROLYTIC PLATING | 5 | 925 | 32 | 8.7 |
| 42 | 6 | 0.2 | Sn | 6 | ELECTROLYTIC PLATING | 5 | 925 | 33 | 8.3 |

TABLE 3-continued

| | | | | | | | | | |
|---|---|---|---|---|---|---|---|---|---|
| 43 | 7 | 0.2 | Sn | 6 | ELECTROLYTIC PLATING | 5 | 925 | 34 | 8.2 |
| 44 | 8 | 0.2 | Sn | 6 | ELECTROLYTIC PLATING | 5 | 925 | 27 | 9.7 |
| 45 | 9 | 0.2 | Sn | 6 | ELECTROLYTIC PLATING | 5 | 925 | 26 | 11 |

| | MANUFACTURE ||||||
|---|---|---|---|---|---|---|
| | SAVING AND ACHIEVEMENT OF HIGH ACCUMULATION |||| | | |
| | | ACHIEVEMENT OF HIGH ACCUMULATION | ACHIEVEMENT OF HIGH ACCUMULATION | GROWTH ||| 
| No. | HOLDING TEMPERATURE ° C. | HOLDING TIME sec | ACCUMULATION DEGREE OF {200} PLANES IN αFe | ACCUMULATION DEGREE OF {222} PLANES IN αFe | COOLING RATE ° C./sec | ½t ACCUMULATION DEGREE OF {200} PLANES | ½t ACCUMULATION DEGREE OF {222} PLANES |
| 1 | 1000 | 20 | 16 | 13 | 150 | 16 | 13 |
| 2 | 1000 | 20 | 25 | 10.4 | 150 | 25 | 10.4 |
| 3 | 1000 | 20 | 30 | 9.1 | 150 | 30 | 9.1 |
| 4 | 1000 | 20 | 41 | 3.4 | 150 | 41 | 3.4 |
| 5 | 1000 | 20 | 53 | 1.8 | 150 | 53 | 1.8 |
| 6 | 1000 | 20 | 52 | 2.1 | 150 | 52 | 2.1 |
| 7 | 1000 | 20 | 50 | 2.3 | 150 | 50 | 2.3 |
| 8 | 1000 | 20 | 38 | 3.8 | 150 | 38 | 3.8 |
| 9 | 1000 | 20 | 37 | 4.2 | 150 | 37 | 4.2 |
| 10 | 1050 | 10 | 17 | 12 | 250 | 17 | 12 |
| 11 | 1050 | 10 | 24 | 12 | 250 | 24 | 12 |
| 12 | 1050 | 10 | 31 | 8.7 | 250 | 31 | 8.7 |
| 13 | 1050 | 10 | 42 | 3.2 | 250 | 42 | 3.2 |
| 14 | 1050 | 10 | 55 | 1.7 | 250 | 55 | 1.7 |
| 15 | 1050 | 10 | 54 | 1.9 | 250 | 54 | 1.9 |
| 16 | 1050 | 10 | 51 | 2.2 | 250 | 51 | 2.2 |
| 17 | 1050 | 10 | 39 | 4.1 | 250 | 39 | 4.1 |
| 18 | 1050 | 10 | 37 | 4.5 | 250 | 37 | 4.5 |
| 19 | 1250 | 10 | 15 | 13 | 10 | 15 | 13 |
| 20 | 1250 | 10 | 23 | 13 | 10 | 23 | 13 |
| 21 | 1250 | 10 | 30 | 9.3 | 10 | 30 | 9.3 |
| 22 | 1250 | 10 | 41 | 4.1 | 10 | 41 | 4.1 |
| 23 | 1250 | 10 | 52 | 2.4 | 10 | 52 | 2.4 |
| 24 | 1250 | 10 | 52 | 2.6 | 10 | 52 | 2.6 |
| 25 | 1250 | 10 | 51 | 2.9 | 10 | 51 | 2.9 |
| 26 | 1250 | 10 | 38 | 4.8 | 10 | 38 | 4.8 |
| 27 | 1250 | 10 | 37 | 5.5 | 10 | 37 | 5.5 |
| 28 | 980 | 100 | 17 | 11 | 50 | 17 | 11 |
| 29 | 980 | 100 | 27 | 9.8 | 50 | 27 | 9.8 |
| 30 | 980 | 100 | 33 | 8.5 | 50 | 33 | 8.5 |
| 31 | 980 | 100 | 43 | 3.5 | 50 | 43 | 3.5 |
| 32 | 980 | 100 | 57 | 1.8 | 50 | 57 | 1.8 |
| 33 | 980 | 100 | 56 | 2.1 | 50 | 56 | 2.1 |
| 34 | 980 | 100 | 55 | 2.3 | 50 | 55 | 2.3 |
| 35 | 980 | 100 | 40 | 3.9 | 50 | 40 | 3.9 |
| 36 | 980 | 100 | 37 | 4.5 | 50 | 37 | 4.5 |
| 37 | 1100 | 20 | 16 | 13 | 350 | 16 | 13 |
| 38 | 1100 | 20 | 27 | 11 | 350 | 27 | 11 |
| 39 | 1100 | 20 | 32 | 9.4 | 350 | 32 | 9.4 |
| 40 | 1100 | 20 | 45 | 3.1 | 350 | 45 | 3.1 |
| 41 | 1100 | 20 | 58 | 1.4 | 350 | 58 | 1.4 |
| 42 | 1100 | 20 | 57 | 1.9 | 350 | 57 | 1.9 |
| 43 | 1100 | 20 | 56 | 2.1 | 350 | 56 | 2.1 |
| 44 | 1100 | 20 | 43 | 3.8 | 350 | 43 | 3.8 |
| 45 | 1100 | 20 | 41 | 5.1 | 350 | 41 | 5.1 |

| | PRODUCT |||||||||
|---|---|---|---|---|---|---|---|---|---|
| | TEXTURE EVALUATION || | MAGNETIC FLUX DENSITY ||| | | |
| No. | ACCUMULATION DEGREE OF {200} PLANES IN αFe | ACCUMULATION DEGREE OF {222} PLANES IN αFe | Z | B50 T | Bs T | B50/Bs | ΔB T | NOTE | α-REGION TEMPERATURE |
| 1 | <u>16</u> | 13 | 1.2 | 1.60 | 2.05 | 0.78 | 0.070 | COMPARATIVE EXAMPLE 1 | 950 |

TABLE 3-continued

| | | | | | | | | | |
|---|---|---|---|---|---|---|---|---|---|
| 2 | 25 | 10.4 | 2.1 | 1.66 | 2.05 | 0.81 | 0.065 | PRESENT INVENTION EXAMPLE 1 | 920 |
| 3 | 30 | 9.1 | 5.8 | 1.71 | 2.05 | 0.83 | 0.060 | PRESENT INVENTION EXAMPLE 2 | 850 |
| 4 | 41 | 3.4 | 23 | 1.77 | 2.05 | 0.86 | 0.056 | PRESENT INVENTION EXAMPLE 3 | 750 |
| 5 | 53 | 1.8 | 160 | 1.84 | 2.05 | 0.90 | 0.018 | PRESENT INVENTION EXAMPLE 4 | 650 |
| 6 | 52 | 2.1 | 120 | 1.87 | 2.05 | 0.91 | 0.021 | PRESENT INVENTION EXAMPLE 5 | 550 |
| 7 | 50 | 2.3 | 42 | 1.86 | 2.05 | 0.91 | 0.070 | PRESENT INVENTION EXAMPLE 6 | 450 |
| 8 | 38 | 3.8 | 3.5 | 1.80 | 2.05 | 0.88 | 0.145 | PRESENT INVENTION EXAMPLE 7 | 300 |
| 9 | 37 | 4.2 | 1.1 | 1.78 | 2.05 | 0.87 | 0.220 | COMPARATIVE EXAMPLE 2 | 250 |
| 10 | <u>17</u> | 12 | 1.4 | 1.60 | 2.05 | 0.78 | 0.080 | COMPARATIVE EXAMPLE 3 | 950 |
| 11 | 24 | 12 | 2.5 | 1.65 | 2.05 | 0.80 | 0.074 | PRESENT INVENTION EXAMPLE 8 | 920 |
| 12 | 31 | 8.7 | 3.8 | 1.66 | 2.05 | 0.81 | 0.070 | PRESENT INVENTION EXAMPLE 9 | 850 |
| 13 | 42 | 3.2 | 27 | 1.79 | 2.05 | 0.87 | 0.054 | PRESENT INVENTION EXAMPLE 10 | 750 |
| 14 | 55 | 1.7 | 156 | 1.88 | 2.05 | 0.92 | 0.015 | PRESENT INVENTION EXAMPLE 11 | 650 |
| 15 | 54 | 1.9 | 134 | 1.87 | 2.05 | 0.91 | 0.025 | PRESENT INVENTION EXAMPLE 12 | 550 |
| 16 | 51 | 2.2 | 51 | 1.86 | 2.05 | 0.91 | 0.036 | PRESENT INVENTION EXAMPLE 13 | 450 |
| 17 | 39 | 4.1 | 5.8 | 1.81 | 2.05 | 0.88 | 0.145 | PRESENT INVENTION EXAMPLE 14 | 300 |
| 18 | 37 | 4.5 | 1.7 | 1.74 | 2.05 | 0.85 | 0.210 | COMPARATIVE EXAMPLE 4 | 250 |
| 19 | <u>15</u> | 13 | 1.3 | 1.59 | 2.05 | 0.78 | 0.087 | COMPARATIVE EXAMPLE 5 | 950 |
| 20 | 23 | 13 | 2.4 | 1.66 | 2.05 | 0.81 | 0.081 | PRESENT INVENTION EXAMPLE 15 | 920 |
| 21 | 30 | 9.3 | 5.8 | 1.72 | 2.05 | 0.84 | 0.080 | PRESENT INVENTION EXAMPLE 16 | 850 |
| 22 | 41 | 4.1 | 19 | 1.78 | 2.05 | 0.87 | 0.074 | PRESENT INVENTION EXAMPLE 17 | 750 |
| 23 | 52 | 2.4 | 149 | 1.86 | 2.05 | 0.91 | 0.021 | PRESENT INVENTION EXAMPLE 18 | 650 |
| 24 | 52 | 2.6 | 174 | 1.86 | 2.05 | 0.91 | 0.018 | PRESENT INVENTION EXAMPLE 19 | 550 |
| 25 | 51 | 2.9 | 39 | 1.86 | 2.05 | 0.91 | 0.093 | PRESENT INVENTION EXAMPLE 20 | 450 |
| 26 | 38 | 4.8 | 3.1 | 1.77 | 2.05 | 0.86 | 0.138 | PRESENT INVENTION EXAMPLE 21 | 300 |
| 27 | 37 | 5.5 | 1.1 | 1.76 | 2.05 | 0.86 | 0.190 | COMPARATIVE EXAMPLE 6 | 250 |
| 28 | <u>17</u> | 11 | 1.2 | 1.61 | 2.05 | 0.79 | 0.082 | COMPARATIVE EXAMPLE 7 | 950 |
| 29 | 27 | 9.8 | 2.5 | 1.65 | 2.05 | 0.80 | 0.073 | PRESENT INVENTION EXAMPLE 22 | 920 |

TABLE 3-continued

| | | | | | | | | | |
|---|---|---|---|---|---|---|---|---|---|
| 30 | 33 | 8.5 | 8.5 | 1.73 | 2.05 | 0.84 | 0.073 | PRESENT INVENTION EXAMPLE 23 | 850 |
| 31 | 43 | 3.5 | 34 | 1.78 | 2.05 | 0.87 | 0.064 | PRESENT INVENTION EXAMPLE 24 | 750 |
| 32 | 57 | 1.8 | 112 | 1.87 | 2.05 | 0.91 | 0.017 | PRESENT INVENTION EXAMPLE 25 | 650 |
| 33 | 56 | 2.1 | 110 | 1.88 | 2.05 | 0.92 | 0.013 | PRESENT INVENTION EXAMPLE 26 | 550 |
| 34 | 55 | 2.3 | 74 | 1.87 | 2.05 | 0.91 | 0.087 | PRESENT INVENTION EXAMPLE 27 | 450 |
| 35 | 40 | 3.9 | 2.1 | 1.76 | 2.05 | 0.86 | 0.139 | PRESENT INVENTION EXAMPLE 28 | 300 |
| 36 | 37 | 4.5 | 0.6 | 1.74 | 2.05 | 0.85 | 0.210 | COMPARATIVE EXAMPLE 8 | 250 |
| 37 | <u>16</u> | 13 | 0.8 | 1.60 | 2.05 | 0.78 | 0.086 | COMPARATIVE EXAMPLE 9 | 950 |
| 38 | 27 | 11 | 2.2 | 1.65 | 2.05 | 0.80 | 0.079 | PRESENT INVENTION EXAMPLE 29 | 920 |
| 39 | 32 | 9.4 | 8.2 | 1.73 | 2.05 | 0.84 | 0.079 | PRESENT INVENTION EXAMPLE 30 | 850 |
| 40 | 45 | 3.1 | 34 | 1.81 | 2.05 | 0.88 | 0.065 | PRESENT INVENTION EXAMPLE 31 | 750 |
| 41 | 58 | 1.4 | 158 | 1.87 | 2.05 | 0.91 | 0.013 | PRESENT INVENTION EXAMPLE 32 | 650 |
| 42 | 57 | 1.9 | 189 | 1.89 | 2.05 | 0.92 | 0.009 | PRESENT INVENTION EXAMPLE 33 | 550 |
| 43 | 56 | 2.1 | 48 | 1.88 | 2.05 | 0.92 | 0.091 | PRESENT INVENTION EXAMPLE 34 | 450 |
| 44 | 43 | 3.8 | 2.7 | 1.77 | 2.05 | 0.86 | 0.136 | PRESENT INVENTION EXAMPLE 35 | 300 |
| 45 | 41 | 5.1 | 1.4 | 1.76 | 2.05 | 0.86 | 0.192 | COMPARATIVE EXAMPLE 10 | 250 |

TABLE 4

| | | | | | | | MANUFACTURE | | | |
|---|---|---|---|---|---|---|---|---|---|---|
| | | | | | | | | SEEDING | | |
| | | BASE MATERIAL | | SECOND LAYER | | | TEMPERATURE | | SEEDING ACCUMULATION | SEEDING ACCUMULATION |
| No. | No. | THICK-NESS mm | ELEMENT | THICK-NESS μm | BONDING METHOD | | INCREASING RATE °C./sec | MEASURED TEMPERATURE | DEGREE OF {200} PLANES IN αFe | DEGREE OF {222} PLANES IN αFe |
| 46 | 10 | 0.5 | Ti | 10 | SPUTTERING | | 50 | 1010 | 14 | 13 |
| 47 | 11 | 0.5 | Ti | 10 | SPUTTERING | | 50 | 1010 | 25 | 11 |
| 48 | 12 | 0.5 | Ti | 10 | SPUTTERING | | 50 | 1010 | 30 | 9.3 |
| 49 | 13 | 0.5 | Ti | 10 | SPUTTERING | | 50 | 1010 | 36 | 7.3 |
| 50 | 14 | 0.5 | Ti | 10 | SPUTTERING | | 50 | 1010 | 38 | 6.7 |
| 51 | 15 | 0.5 | Ti | 10 | SPUTTERING | | 50 | 1010 | 38 | 6.4 |
| 52 | 16 | 0.5 | Ti | 10 | SPUTTERING | | 50 | 1010 | 27 | 9.5 |
| 53 | 17 | 0.5 | Ti | 10 | SPUTTERING | | 50 | 1010 | 26 | 10 |
| 54 | 10 | 0.5 | Ge | 12 | SPUTTERING | | 100 | 1010 | 13 | 14 |
| 55 | 11 | 0.5 | Ge | 12 | SPUTTERING | | 100 | 1010 | 26 | 11 |
| 56 | 12 | 0.5 | Ge | 12 | SPUTTERING | | 100 | 1010 | 30 | 9.1 |
| 57 | 13 | 0.5 | Ge | 12 | SPUTTERING | | 100 | 1010 | 34 | 8.1 |
| 58 | 14 | 0.5 | Ge | 12 | SPUTTERING | | 100 | 1010 | 37 | 6.9 |
| 59 | 15 | 0.5 | Ge | 12 | SPUTTERING | | 100 | 1010 | 37 | 6.7 |
| 60 | 16 | 0.5 | Ge | 12 | SPUTTERING | | 100 | 1010 | 26 | 10 |
| 61 | 17 | 0.5 | Ge | 12 | SPUTTERING | | 100 | 1010 | 25 | 12 |
| 62 | 10 | 0.5 | Sb | 15 | SPUTTERING | | 1 | 1010 | 12 | 15 |
| 63 | 11 | 0.5 | Sb | 15 | SPUTTERING | | 1 | 1010 | 26 | 10 |

TABLE 4-continued

| | | | | | | | | | |
|---|---|---|---|---|---|---|---|---|---|
| 64 | 12 | 0.5 | Sb | 15 | SPUTTERING | 1 | 1010 | 30 | 9.1 |
| 65 | 13 | 0.5 | Sb | 15 | SPUTTERING | 1 | 1010 | 35 | 8 |
| 66 | 14 | 0.5 | Sb | 15 | SPUTTERING | 1 | 1010 | 37 | 7.2 |
| 67 | 15 | 0.5 | Sb | 15 | SPUTTERING | 1 | 1010 | 37 | 7.4 |
| 68 | 16 | 0.5 | Sb | 15 | SPUTTERING | 1 | 1010 | 26 | 10 |
| 69 | 17 | 0.5 | Sb | 15 | SPUTTERING | 1 | 1010 | 25 | 11 |
| 70 | 10 | 0.5 | V | 18 | SPUTTERING | 300 | 1010 | 13 | 13 |
| 71 | 11 | 0.5 | V | 18 | SPUTTERING | 300 | 1010 | 26 | 10 |
| 72 | 12 | 0.5 | V | 18 | SPUTTERING | 300 | 1010 | 31 | 8.5 |
| 73 | 13 | 0.5 | V | 18 | SPUTTERING | 300 | 1010 | 36 | 7.7 |
| 74 | 14 | 0.5 | V | 18 | SPUTTERING | 300 | 1010 | 38 | 6.3 |
| 75 | 15 | 0.5 | V | 18 | SPUTTERING | 300 | 1010 | 37 | 6.7 |
| 76 | 16 | 0.5 | V | 18 | SPUTTERING | 300 | 1010 | 27 | 10 |
| 77 | 17 | 0.5 | V | 18 | SPUTTERING | 300 | 1010 | 26 | 11 |
| 78 | 10 | 0.5 | W | 10 | SPUTTERING | 50 | 1010 | 13 | 14 |
| 79 | 11 | 0.5 | W | 10 | SPUTTERING | 50 | 1010 | 26 | 11 |
| 80 | 12 | 0.5 | W | 10 | SPUTTERING | 50 | 1010 | 31 | 9.1 |
| 81 | 13 | 0.5 | W | 10 | SPUTTERING | 50 | 1010 | 35 | 7.9 |
| 82 | 14 | 0.5 | W | 10 | SPUTTERING | 50 | 1010 | 37 | 6.4 |
| 83 | 15 | 0.5 | W | 10 | SPUTTERING | 50 | 1010 | 38 | 6.4 |
| 84 | 16 | 0.5 | W | 10 | SPUTTERING | 50 | 1010 | 26 | 10 |
| 85 | 17 | 0.5 | W | 10 | SPUTTERING | 50 | 1010 | 25 | 11 |

| | MANUFACTURE | | | | | | |
|---|---|---|---|---|---|---|---|
| | SAVING AND ACHIEVEMENT OF HIGH ACCUMULATION | | | | GROWTH | | |
| | | | ACHIEVEMENT OF HIGH ACCUMULATION | ACHIEVEMENT OF HIGH ACCUMULATION | | | |
| No. | HOLDING TEMPERATURE ° C. | HOLDING TIME sec | ACCUMULATION DEGREE OF {200} PLANES IN αFe | ACCUMULATION DEGREE OF {222} PLANES IN αFe | COOLING RATE ° C./sec | ½t ACCUMULATION DEGREE OF {200} PLANES | ½t ACCUMULATION DEGREE OF {222} PLANES |
| 46 | 1100 | 10 | 15 | 14 | 50 | 15 | 14 |
| 47 | 1100 | 10 | 32 | 8.6 | 50 | 32 | 8.6 |
| 48 | 1100 | 10 | 52 | 1.9 | 50 | 52 | 1.9 |
| 49 | 1100 | 10 | 67 | 0.7 | 50 | 67 | 0.7 |
| 50 | 1100 | 10 | 71 | 0.3 | 50 | 71 | 0.3 |
| 51 | 1100 | 10 | 68 | 0.8 | 50 | 68 | 0.8 |
| 52 | 1100 | 10 | 44 | 3.8 | 50 | 44 | 3.8 |
| 53 | 1100 | 10 | 40 | 4.9 | 50 | 40 | 4.9 |
| 54 | 1250 | 30 | 16 | 13 | 150 | 16 | 13 |
| 55 | 1250 | 30 | 33 | 8.3 | 150 | 33 | 8.3 |
| 56 | 1250 | 30 | 51 | 1.9 | 150 | 51 | 1.9 |
| 57 | 1250 | 30 | 65 | 0.8 | 150 | 65 | 0.8 |
| 58 | 1250 | 30 | 70 | 0.3 | 150 | 70 | 0.3 |
| 59 | 1250 | 30 | 67 | 0.7 | 150 | 67 | 0.7 |
| 60 | 1250 | 30 | 43 | 3.9 | 150 | 43 | 3.9 |
| 61 | 1250 | 30 | 41 | 4.5 | 150 | 41 | 4.5 |
| 62 | 1050 | 100 | 16 | 12 | 20 | 16 | 12 |
| 63 | 1050 | 100 | 31 | 9.2 | 20 | 31 | 9.2 |
| 64 | 1050 | 100 | 50 | 2.4 | 20 | 50 | 2.4 |
| 65 | 1050 | 100 | 66 | 0.9 | 20 | 66 | 0.9 |
| 66 | 1050 | 100 | 69 | 0.4 | 20 | 69 | 0.4 |
| 67 | 1050 | 100 | 64 | 1.1 | 20 | 64 | 1.1 |
| 68 | 1050 | 100 | 42 | 4.1 | 20 | 42 | 4.1 |
| 69 | 1050 | 100 | 39 | 5.2 | 20 | 39 | 5.2 |
| 70 | 1150 | 200 | 14 | 14 | 5 | 14 | 14 |
| 71 | 1150 | 200 | 33 | 8.4 | 5 | 33 | 8.4 |
| 72 | 1150 | 200 | 53 | 1.5 | 5 | 53 | 1.5 |
| 73 | 1150 | 200 | 66 | 0.8 | 5 | 66 | 0.8 |
| 74 | 1150 | 200 | 70 | 0.4 | 5 | 70 | 0.4 |
| 75 | 1150 | 200 | 67 | 0.8 | 5 | 67 | 0.8 |
| 76 | 1150 | 200 | 44 | 3.4 | 5 | 44 | 3.4 |
| 77 | 1150 | 200 | 41 | 4.8 | 5 | 41 | 4.8 |
| 78 | 1300 | 500 | 17 | 12 | 250 | 17 | 12 |
| 79 | 1300 | 500 | 34 | 8.7 | 250 | 34 | 8.7 |
| 80 | 1300 | 500 | 54 | 1.4 | 250 | 54 | 1.4 |
| 81 | 1300 | 500 | 65 | 0.9 | 250 | 65 | 0.9 |
| 82 | 1300 | 500 | 68 | 0.6 | 250 | 68 | 0.6 |
| 83 | 1300 | 500 | 65 | 1 | 250 | 65 | 1 |
| 84 | 1300 | 500 | 43 | 3..5 | 250 | 43 | 3..5 |
| 85 | 1300 | 500 | 40 | 4.8 | 250 | 40 | 4.8 |

TABLE 4-continued

| | PRODUCT | | | | | | | | |
|---|---|---|---|---|---|---|---|---|---|
| | TEXTURE EVALUATION | | | | | | | | |
| | ACCUMULATION DEGREE OF {200} PLANES | ACCUMULATION DEGREE OF {222} PLANES | | MAGNETIC FLUX DENSITY EVALUATION | | | | | α-REGION |
| No. | IN αFe | IN αFe | Z | B50 T | Bs T | B50/Bs | ΔB T | NOTE | TEMPERATURE |
| 46 | 15 | 14 | 0.5 | 1.59 | 2.02 | 0.79 | 0.090 | COMPARATIVE EXAMPLE 11 | 1050 |
| 47 | 32 | 8.6 | 2.5 | 1.73 | 2.02 | 0.86 | 0.080 | PRESENT INVENTION EXAMPLE 36 | 950 |
| 48 | 52 | 1.9 | 12 | 1.78 | 2.02 | 0.88 | 0.080 | PRESENT INVENTION EXAMPLE 37 | 850 |
| 49 | 67 | 0.7 | 75 | 1.89 | 2.02 | 0.94 | 0.030 | PRESENT INVENTION EXAMPLE 38 | 750 |
| 50 | 71 | 0.3 | 143 | 1.93 | 2.02 | 0.96 | 0.015 | PRESENT INVENTION EXAMPLE 39 | 600 |
| 51 | 68 | 0.8 | 116 | 1.92 | 2.02 | 0.95 | 0.019 | PRESENT INVENTION EXAMPLE 40 | 450 |
| 52 | 44 | 3.8 | 2.9 | 1.76 | 2.02 | 0.87 | 0.115 | PRESENT INVENTION EXAMPLE 41 | 300 |
| 53 | 40 | 4.9 | 0.9 | 1.75 | 2.02 | 0.87 | 0.200 | COMPARATIVE EXAMPLE 12 | 250 |
| 54 | 16 | 13 | 0.7 | 1.58 | 2.02 | 0.78 | 0.091 | COMPARATIVE EXAMPLE 13 | 1050 |
| 55 | 33 | 8.3 | 2.9 | 1.72 | 2.02 | 0.85 | 0.083 | PRESENT INVENTION EXAMPLE 42 | 950 |
| 56 | 51 | 1.9 | 18 | 1.79 | 2.02 | 0.89 | 0.070 | PRESENT INVENTION EXAMPLE 43 | 850 |
| 57 | 65 | 0.8 | 83 | 1.87 | 2.02 | 0.93 | 0.070 | PRESENT INVENTION EXAMPLE 44 | 750 |
| 58 | 70 | 0.3 | 183 | 1.93 | 2.02 | 0.96 | 0.045 | PRESENT INVENTION EXAMPLE 45 | 600 |
| 59 | 67 | 0.7 | 127 | 1.93 | 2.02 | 0.96 | 0.031 | PRESENT INVENTION EXAMPLE 46 | 450 |
| 60 | 43 | 3.9 | 4.7 | 1.77 | 2.02 | 0.88 | 0.138 | PRESENT INVENTION EXAMPLE 47 | 300 |
| 61 | 41 | 4.5 | 1.2 | 1.75 | 2.02 | 0.87 | 0.190 | COMPARATIVE EXAMPLE 14 | 250 |
| 62 | 16 | 12 | 1.1 | 1.59 | 2.02 | 0.79 | 0.090 | COMPARATIVE EXAMPLE 15 | 1050 |
| 63 | 31 | 9.2 | 2.4 | 1.73 | 2.02 | 0.86 | 0.080 | PRESENT INVENTION EXAMPLE 48 | 950 |
| 64 | 50 | 2.4 | 15 | 1.78 | 2.02 | 0.88 | 0.080 | PRESENT INVENTION EXAMPLE 49 | 850 |
| 65 | 66 | 0.9 | 77 | 1.87 | 2.02 | 0.93 | 0.076 | PRESENT INVENTION EXAMPLE 50 | 750 |
| 66 | 69 | 0.4 | 125 | 1.92 | 2.02 | 0.95 | 0.050 | PRESENT INVENTION EXAMPLE 51 | 600 |
| 67 | 64 | 1.1 | 108 | 1.92 | 2.02 | 0.95 | 0.042 | PRESENT INVENTION EXAMPLE 52 | 450 |
| 68 | 42 | 4.1 | 2.6 | 1.77 | 2.02 | 0.88 | 0.138 | PRESENT INVENTION EXAMPLE 53 | 300 |
| 69 | 39 | 5.2 | 1.4 | 1.76 | 2.02 | 0.87 | 0.220 | COMPARATIVE EXAMPLE 16 | 250 |

TABLE 4-continued

| | | | | | | | | | |
|---|---|---|---|---|---|---|---|---|---|
| 70 | <u>14</u> | 14 | <u>0.4</u> | 1.58 | 2.02 | 0.78 | 0.230 | COMPARATIVE EXAMPLE 17 | 1050 |
| 71 | 33 | 8.4 | 2.9 | 1.72 | 2.02 | 0.85 | 0.135 | PRESENT INVENTION EXAMPLE 54 | 950 |
| 72 | 53 | 1.5 | 36 | 1.77 | 2.02 | 0.88 | 0.094 | PRESENT INVENTION EXAMPLE 55 | 850 |
| 73 | 66 | 0.8 | 98 | 1.87 | 2.02 | 0.93 | 0.075 | PRESENT INVENTION EXAMPLE 56 | 750 |
| 74 | 70 | 0.4 | 178 | 1.94 | 2.02 | 0.96 | 0.061 | PRESENT INVENTION EXAMPLE 57 | 600 |
| 75 | 67 | 0.8 | 47 | 1.94 | 2.02 | 0.96 | 0.042 | PRESENT INVENTION EXAMPLE 58 | 450 |
| 76 | 44 | 3.4 | 10.4 | 1.76 | 2.02 | 0.87 | 0.137 | PRESENT INVENTION EXAMPLE 59 | 300 |
| 77 | 41 | 4.8 | <u>1.2</u> | 1.75 | 2.02 | 0.87 | 0.230 | COMPARATIVE EXAMPLE 18 | 250 |
| 78 | <u>17</u> | 12 | <u>0.9</u> | 1.59 | 2.02 | 0.79 | 0.210 | COMPARATIVE EXAMPLE 19 | 1050 |
| 79 | 34 | 8.7 | 4.7 | 1.73 | 2.02 | 0.86 | 0.143 | PRESENT INVENTION EXAMPLE 60 | 950 |
| 80 | 54 | 1.4 | 45 | 1.78 | 2.02 | 0.88 | 0.090 | PRESENT INVENTION EXAMPLE 61 | 850 |
| 81 | 65 | 0.9 | 118 | 1.87 | 2.02 | 0.93 | 0.064 | PRESENT INVENTION EXAMPLE 62 | 750 |
| 82 | 68 | 0.6 | 159 | 1.92 | 2.02 | 0.95 | 0.020 | PRESENT INVENTION EXAMPLE 63 | 600 |
| 83 | 65 | 1 | 69 | 1.92 | 2.02 | 0.95 | 0.031 | PRESENT INVENTION EXAMPLE 64 | 450 |
| 84 | 43 | 3..5 | 3.7 | 1.76 | 2.02 | 0.87 | 0.120 | PRESENT INVENTION EXAMPLE 65 | 300 |
| 85 | 40 | 4.8 | <u>1.7</u> | 1.75 | 2.02 | 0.87 | 0.230 | COMPARATIVE EXAMPLE 20 | 250 |

In each of present invention examples, it was possible to confirm that Z is not less than 2.0 nor more than 200, the magnetic flux density difference ΔB becomes a small value as compared to comparative examples, and a high magnetic flux density can be obtained thoroughly in an in-plane circumferential direction. Further, in these Fe-based metal sheets, it was possible to confirm that an excellent magnetic property in which the value of B50/Bs is 0.80 or more is obtained.

Further, in the present invention examples, as shown in Table 2 to Table 4, it was possible to confirm that the (200) plane in the α-Fe phase is likely to be highly accumulated at each of the stages of the heat treatment.

Further, an L cross section of each of the present invention examples was observed, and thereby it was confirmed that the α single phase region made of the α single phase based component exists in at least a partial region including the surfaces and a ratio of the α single phase region to the L cross section is 1% or more.

When the Z value was not less than 2 nor more than 200 as defined in the present invention as above, it was possible to confirm that a high magnetic flux density is obtained thoroughly in the in-plane circumferential direction. Further, in order to obtain the Fe-based metal sheet as above, the α-region rolling was performed at a temperature of higher than 300° C. and lower than the A3 point between the hot rolling and the cold rolling, thereby making it possible to obtain an intended product.

In contrast to this, when the base metal sheets obtained by performing the rolling under the conditions not satisfying the requirements of the present invention were used, it was not possible to obtain a high magnetic flux density such as that in the present invention examples in the in-plane circumferential direction thoroughly.

Example 2

In this example, base metal sheets of No. 18 to No. 35 each made of a component C, D, or E shown in Table 1 were manufactured under various rolling conditions, to then have various different metals applied thereto as a second layer, and then Fe-based metal sheets were fabricated, of which the previously described Z value (=(A+0.97B)/0.98C) and the magnetic flux density difference ΔB were examined. Further, the relationship between various manufacturing conditions and an accumulation degree of {200} planes was also examined. Further, effects obtained by changing a starting temperature in an α-region rolling process were also examined in detail.

First, ingots each having the component C, D, or E shown in Table 1 and a balance being composed of Fe and inevitable impurities were melted by vacuum melting. Then, these were used as rolling materials to be worked into cold-rolled sheets (the base metal sheets) each having a predetermined thickness under conditions of hot rolling, α-region rolling, and cold rolling shown in Table 5 below.

TABLE 5

| BASE MATERIAL No. | COMPONENT | A3 POINT | HOT ROLLING | | | | | α-REGION ROLLING | | |
|---|---|---|---|---|---|---|---|---|---|---|
| | | | START | | FINISH | | | START | | FINISH |
| | | | TEMPERATURE °C. | THICKNESS mm | TEMPERATURE °C. | THICKNESS mm | REDUCTION RATIO | TEMPERATURE °C. | THICKNESS mm | TEMPERATURE °C. |
| 18 | C | 915 | 1050 | 200 | 930 | 60 | −1.20 | 700 | 60 | 610 |
| 19 | C | 915 | 1050 | 200 | 930 | 30 | −1.90 | 700 | 30 | 610 |
| 20 | C | 915 | 1050 | 200 | 930 | 20 | −2.30 | 700 | 20 | 610 |
| 21 | C | 915 | 1050 | 200 | 930 | 10 | −3.00 | 700 | 10 | 610 |
| 22 | C | 915 | 1050 | 200 | 930 | 8 | −3.22 | 700 | 8 | 610 |
| 23 | C | 915 | 1050 | 200 | 930 | 4 | −3.91 | 700 | 4 | 610 |
| 24 | D | 870 | 1050 | 300 | 930 | 15 | −3.00 | 650 | 15 | 570 |
| 25 | D | 870 | 1050 | 150 | 930 | 15 | −2.30 | 650 | 15 | 570 |
| 26 | D | 870 | 1050 | 75 | 930 | 15 | −1.61 | 650 | 15 | 570 |
| 27 | D | 870 | 1050 | 50 | 930 | 15 | −1.20 | 650 | 15 | 570 |
| 28 | D | 870 | 1050 | 20 | 930 | 15 | −0.29 | 650 | 15 | 570 |
| 29 | E | 942 | 1200 | 240 | 1050 | 50 | −1.67 | 750 | 30 | 670 |
| 30 | E | 942 | 1200 | 240 | 1050 | 50 | −1.57 | 750 | 30 | 670 |
| 31 | E | 942 | 1200 | 240 | 1050 | 50 | −1.57 | 750 | 30 | 670 |
| 32 | E | 942 | 1200 | 240 | 1050 | 50 | −1.57 | 750 | 30 | 670 |
| 33 | E | 942 | 1200 | 240 | 1050 | 50 | −1.57 | 750 | 30 | 670 |
| 34 | E | 942 | 1200 | 240 | 1050 | 50 | −1.57 | 750 | 30 | 670 |
| 35 | E | 942 | 1200 | 240 | 1050 | 50 | −1.57 | 750 | 30 | 670 |

| BASE MATERIAL No. | α-REGION ROLLING FINISH | | COLD ROLLING | | | TOTAL | |
|---|---|---|---|---|---|---|---|
| | THICKNESS mm | REDUCTION RATIO | START THICKNESS mm | FINISH THICKNESS mm | REDUCTION RATIO | REDUCTION RATIO | α REGION + COLD ROLLING |
| 18 | 2 | −3.40 | 2 | 0.35 | −1.74 | −6.35 | −5.14 |
| 19 | 2 | −2.71 | 2 | 0.35 | −1.74 | −6.35 | −4.45 |
| 20 | 2 | −2.30 | 2 | 0.35 | −1.74 | −6.35 | −4.05 |
| 21 | 2 | −1.61 | 2 | 0.35 | −1.74 | −6.35 | −3.35 |
| 22 | 2 | −1.39 | 2 | 0.35 | −1.74 | −6.35 | −3.13 |
| 23 | 2 | −0.69 | 2 | 0.35 | −1.74 | −6.35 | −2.44 |
| 24 | 3.5 | −1.46 | 3.5 | 0.5 | −1.95 | −6.40 | −3.40 |
| 25 | 3.5 | −1.46 | 3.5 | 0.6 | −1.95 | −5.70 | −3.40 |
| 26 | 3.5 | −1.46 | 3.5 | 0.5 | −1.95 | −5.01 | −3.40 |
| 21 | 3.5 | −1.46 | 3.5 | 0.5 | −1.95 | −4.61 | −3.40 |
| 28 | 3.5 | −1.46 | 3.5 | 0.5 | −1.95 | −3.69 | −3.40 |
| 29 | 6 | −1.61 | 6 | 3 | −0.69 | −3.87 | −2.30 |
| 30 | 6 | −1.61 | 6 | 2 | −1.10 | −4.28 | −2.71 |
| 31 | 6 | −1.61 | 6 | 1 | −1.79 | −4.97 | −3.40 |
| 32 | 6 | −1.61 | 6 | 0.2 | −3.40 | −6.58 | −5.01 |
| 33 | 6 | −1.61 | 6 | 0.1 | −4.09 | −7.27 | −5.70 |
| 34 | 6 | −1.61 | 6 | 0.05 | −4.79 | −7.97 | −6.40 |
| 35 | 6 | −1.61 | 6 | 0.01 | −6.40 | −9.57 | −8.01 |

In the case of the component C, first, the ingots each having a thickness of 200 mm heated to 1050° C. were each subjected to hot rolling at a reduction ratio of −1.20 to −3.91 in terms of true strain, and hot-rolled sheets each having a thickness of 4 mm to 60 mm were obtained. Next, α-region rolling was started at 700° C., and these hot-rolled sheets were each subjected to the α-region rolling at a reduction ratio of −0.69 to −3.40 in terms of true strain to a thickness of 2 mm. Then, these rolled sheets were pickled, and then the base metal sheets were obtained by cold rolling. At this time, the reduction ratio was −1.74 in terms of true strain, and as a result, the thickness of each of the obtained base metal sheets was 0.35 mm.

In the case of the component D, first, the ingots each having a thickness of 20 mm to 300 mm heated to 1050° C. were each subjected to hot rolling at a reduction ratio of −0.29 to −3.00 in terms of true strain, and hot-rolled sheets each having a thickness of 15 mm were obtained. Next, α-region rolling was started at 650° C., and these hot-rolled sheets were each subjected to the α-region rolling at a reduction ratio of −1.46 in terms of true strain to a thickness of 3.5 mm. Then, these rolled sheets were pickled, and then the base metal sheets were obtained by cold rolling. At this time, the reduction ratio was −1.95 in terms of true strain, and as a result, the thickness of each of the obtained base metal sheets was 0.50 mm.

In the case of the component E, first, the ingots each having a thickness of 240 mm heated to 1200° C. were each subjected to hot rolling at a reduction ratio of −1.57 in terms of true strain, and hot-rolled sheets each having a thickness of 50 mm were obtained. Next, α-region rolling was started at 750° C., and these hot-rolled sheets were each subjected to the α-region rolling at a reduction ratio of −1.61 in terms of true strain to a thickness of 6.0 mm. Then, these rolled sheets were pickled, and then the base metal sheets were obtained by cold rolling. At this time, each of the reduction ratios was −0.69 to −6.40 in terms of true strain, and as a result, the thickness of each of the obtained base metal sheets was 0.01 mm to 3.0 mm.

With respect to the base metal sheets obtained by the above procedure, a texture of a surface layer portion of each of the base materials was measured by X-ray diffraction to obtain an accumulation degree of {200} planes and an accumulation degree of {222} planes by the previously described method. Further, thinning was performed so that a structure could be observed from a direction perpendicular to an L cross-section, and a region up to ¼t from the surface was observed. The main phase of each of the obtained base metal sheets at room temperature was an α-Fe phase. Further, as a result of measurement, the A3 point at which the α-γ transformation occurred was 915° C. in the component C, 870° C. in the component D, and 942° C. in the component E.

Next, both surfaces of each of the base metal sheets of No. 18 to No. 35 shown in Table 5 were coated with each of various different metal elements as the second layer by a vapor deposition method, a sputtering method, an electroplating method, or a hot dipping method. As shown in Table 6 and Table 7 below, as the different metal element, any one of Al, Si, Ga, Sn, V, W, Mo, and Zn was selected. The thickness of each of the coatings was as shown in Table 6 and Table 7.

Next, an experiment was performed in which a heat treatment was performed on the base metal sheets to each of which the second layers were bonded under various conditions. As a method of the experiment, the experiment was performed by the same method described in Example 1. Further, the observation of a texture in this period was also performed by the same method described in Example 1.

Further, magnetometry was performed in the same manner as that in Example 1 in order to evaluate obtained products, and further the Z value was calculated by X-ray diffraction.

Table 6 and Table 7 below show the accumulation degrees of the {200} planes and the accumulation degrees of the {222} planes measured in the respective processes during the manufacture and after the manufacture, the Z values of the obtained Fe-based metal sheets, and evaluation results of the magnetometry.

TABLE 6

| | | | | | | MANUFACTURE | | |
| | | | | | | | SEEDING | |
| | | BASE MATERIAL | | SECOND LAYER | | TEMPERATURE | SEEDING ACCUMULATION | SEEDING ACCUMULATION |
| No. | No. | THICKNESS mm | ELEMENT | THICKNESS μm | BONDING METHOD | INCREASING RATE ° C./sec | MEASURED TEMPERATURE | DEGREE OF {200} PLANES IN αFe | DEGREE OF {222} PLANES IN αFe |
|---|---|---|---|---|---|---|---|---|---|
| 86 | 18 | 0.35 | Al | 7 | VAPOR DEPOSITION | 20 | 915 | 34 | 7.8 |
| 87 | 19 | 0.35 | Al | 7 | VAPOR DEPOSITION | 20 | 915 | 34 | 7.9 |
| 88 | 20 | 0.35 | Al | 7 | VAPOR DEPOSITION | 20 | 915 | 33 | 8.3 |
| 89 | 21 | 0.35 | Al | 7 | VAPOR DEPOSITION | 20 | 915 | 30 | 9.3 |
| 90 | 22 | 0.35 | Al | 7 | VAPOR DEPOSITION | 20 | 915 | 28 | 10 |
| 91 | 23 | 0.35 | Al | 7 | VAPOR DEPOSITION | 20 | 915 | 26 | 10 |
| 92 | 18 | 0.35 | Si | 8 | SPUTTERING | 10 | 915 | 35 | 7.1 |
| 93 | 19 | 0.35 | Si | 8 | SPUTTERING | 10 | 915 | 34 | 7.3 |
| 94 | 20 | 0.35 | Si | 8 | SPUTTERING | 10 | 915 | 32 | 7.8 |
| 95 | 21 | 0.35 | Si | 8 | SPUTTERING | 10 | 915 | 27 | 9.7 |
| 96 | 22 | 0.35 | Si | 8 | SPUTTERING | 10 | 915 | 26 | 10 |
| 97 | 23 | 0.35 | Si | 8 | SPUTTERING | 10 | 915 | 25 | 11 |
| 98 | 18 | 0.35 | Ga | 6 | VAPOR DEPOSITION | 0.5 | 915 | 32 | 8.5 |
| 99 | 19 | 0.35 | Ga | 6 | VAPOR DEPOSITION | 0.5 | 915 | 32 | 8.6 |
| 100 | 20 | 0.35 | Ga | 6 | VAPOR DEPOSITION | 0.5 | 915 | 31 | 8.9 |
| 101 | 21 | 0.35 | Ga | 6 | VAPOR DEPOSITION | 0.5 | 915 | 28 | 9.8 |
| 102 | 22 | 0.35 | Ga | 6 | VAPOR DEPOSITION | 0.5 | 915 | 26 | 10 |
| 103 | 23 | 0.35 | Ga | 6 | VAPOR DEPOSITION | 0.5 | 915 | 25 | 11 |
| 104 | 18 | 0.35 | Sn | 10 | ELECTROLYTIC PLATING | 5 | 915 | 36 | 6.5 |
| 105 | 19 | 0.35 | Sn | 10 | ELECTROLYTIC PLATING | 5 | 915 | 35 | 6.7 |
| 106 | 20 | 0.35 | Sn | 10 | ELECTROLYTIC PLATING | 5 | 915 | 36 | 7.2 |
| 107 | 21 | 0.35 | Sn | 10 | ELECTROLYTIC PLATING | 5 | 915 | 31 | 8.7 |
| 108 | 22 | 0.35 | Sn | 10 | ELECTROLYTIC PLATING | 5 | 915 | 27 | 9.3 |
| 109 | 23 | 0.35 | Sn | 10 | ELECTROLYTIC PLATING | 5 | 915 | 25 | 11 |
| 110 | 18 | 0.35 | V | 11 | SPUTTERING | 10 | 915 | 34 | 7.9 |
| 111 | 19 | 0.35 | V | 11 | SPUTTERING | 10 | 915 | 33 | 8.2 |
| 112 | 20 | 0.35 | V | 11 | SPUTTERING | 10 | 915 | 31 | 8.6 |
| 113 | 21 | 0.35 | V | 11 | SPUTTERING | 10 | 915 | 28 | 9.7 |
| 114 | 22 | 0.35 | V | 11 | SPUTTERING | 10 | 915 | 27 | 10 |

TABLE 6-continued

| No. | | | | | | | | |
|---|---|---|---|---|---|---|---|---|
| 115 | 23 | 0.35 | V | 11 | SPUTTERING | 10 | 915 | 25 | 10 |
| 116 | 18 | 0.35 | W | 6 | SPUTTERING | 0.5 | 915 | 34 | 7.6 |
| 117 | 19 | 0.35 | W | 6 | SPUTTERING | 0.5 | 915 | 33 | 8.2 |
| 118 | 20 | 0.35 | W | 6 | SPUTTERING | 0.5 | 915 | 31 | 9.2 |
| 119 | 21 | 0.35 | W | 6 | SPUTTERING | 0.5 | 915 | 28 | 10 |
| 120 | 22 | 0.35 | W | 6 | SPUTTERING | 0.5 | 915 | 27 | 10 |
| 121 | 23 | 0.35 | W | 6 | SPUTTERING | 0.5 | 915 | 25 | 11 |

| | MANUFACTURE | | | | | |
|---|---|---|---|---|---|---|
| | SAVING AND ACHIEVEMENT OF HIGH ACCUMULATION | | | GROWTH | | |
| | | ACHIEVEMENT OF HIGH ACCUMULATION | ACHIEVEMENT OF HIGH ACCUMULATION | | | |
| No. | HOLDING TEMPERATURE °C. | HOLDING TIME sec | ACCUMULATION DEGREE OF {200} PLANES IN αFe | ACCUMULATION DEGREE OF {222} PLANES IN αFe | COOLING RATE °C./sec | ½t ACCUMULATION DEGREE OF {200} PLANES | ½t ACCUMULATION DEGREE OF {222} PLANES |
| 86 | 1000 | 40 | 63 | 0.8 | 100 | 63 | 0.8 |
| 87 | 1000 | 40 | 62 | 0.8 | 100 | 62 | 0.8 |
| 88 | 1000 | 40 | 61 | 0.9 | 100 | 61 | 0.9 |
| 89 | 1000 | 40 | 50 | 3.9 | 100 | 50 | 3.9 |
| 90 | 1000 | 40 | 42 | 5.7 | 100 | 42 | 5.7 |
| 91 | 1000 | 40 | 32 | 8.5 | 100 | 32 | 8.5 |
| 92 | 1050 | 25 | 62 | 0.9 | 20 | 62 | 0.9 |
| 93 | 1050 | 25 | 61 | 0.9 | 20 | 61 | 0.9 |
| 94 | 1050 | 25 | 60 | 1.2 | 20 | 60 | 1.2 |
| 95 | 1050 | 25 | 45 | 3.5 | 20 | 45 | 3.5 |
| 96 | 1050 | 25 | 42 | 5.3 | 20 | 42 | 5.3 |
| 97 | 1050 | 25 | 31 | 9.1 | 20 | 31 | 9.1 |
| 98 | 950 | 120 | 60 | 1.1 | 50 | 60 | 1.1 |
| 99 | 950 | 120 | 60 | 1 | 50 | 60 | 1 |
| 100 | 950 | 120 | 59 | 1.2 | 50 | 59 | 1.2 |
| 101 | 950 | 120 | 43 | 4.5 | 50 | 43 | 4.5 |
| 102 | 950 | 120 | 41 | 6.2 | 50 | 41 | 6.2 |
| 103 | 950 | 120 | 30 | 9.7 | 50 | 30 | 9.7 |
| 104 | 1000 | 10 | 64 | 0.7 | 200 | 64 | 0.7 |
| 105 | 1000 | 10 | 64 | 0.7 | 200 | 64 | 0.7 |
| 106 | 1000 | 10 | 63 | 0.8 | 200 | 63 | 0.8 |
| 107 | 1000 | 10 | 50 | 2.8 | 200 | 50 | 2.8 |
| 108 | 1000 | 10 | 43 | 4.7 | 200 | 43 | 4.7 |
| 109 | 1000 | 10 | 33 | 7.9 | 200 | 33 | 7.9 |
| 110 | 1200 | 15 | 61 | 0.9 | 250 | 61 | 0.9 |
| 111 | 1200 | 15 | 61 | 0.9 | 250 | 61 | 0.9 |
| 112 | 1200 | 15 | 60 | 1.2 | 250 | 60 | 1.2 |
| 113 | 1200 | 15 | 45 | 4.3 | 250 | 45 | 4.3 |
| 114 | 1200 | 15 | 39 | 6.6 | 250 | 39 | 6.6 |
| 115 | 1200 | 15 | 30 | 8.2 | 250 | 30 | 8.2 |
| 116 | 1300 | 30 | 60 | 1.1 | 80 | 60 | 1.1 |
| 117 | 1300 | 30 | 59 | 1.3 | 80 | 59 | 1.3 |
| 118 | 1300 | 30 | 58 | 1.6 | 80 | 58 | 1.6 |
| 119 | 1300 | 30 | 46 | 3.5 | 80 | 46 | 3.5 |
| 120 | 1300 | 30 | 38 | 6.9 | 80 | 38 | 8.9 |
| 121 | 1300 | 30 | 31 | 9.1 | 80 | 31 | 9.1 |

| | PRODUCT | | | | | | | |
|---|---|---|---|---|---|---|---|---|
| | TEXTURE EVALUATION | | | MAGNETIC FLUX DENSITY EVALUATION | | | | |
| No. | ACCUMULATION DEGREE OF {200} PLANES IN αFe | ACCUMULATION DEGREE OF {222} PLANES IN αFe | Z | B50 T | Bs T | B50/Bs | ΔB T | NOTE | α-REGION TEMPERATURE |
| 86 | 63 | 0.8 | 135 | 1.87 | 2.04 | 0.92 | 0.038 | PRESENT INVENTION EXAMPLE 66 | 700 |
| 87 | 62 | 0.8 | 120 | 1.86 | 2.04 | 0.91 | 0.048 | PRESENT INVENTION EXAMPLE 67 | 700 |
| 88 | 61 | 0.9 | 52 | 1.86 | 2.04 | 0.91 | 0.053 | PRESENT INVENTION EXAMPLE 68 | 700 |

TABLE 6-continued

| | | | | | | | | | |
|---|---|---|---|---|---|---|---|---|---|
| 89 | 47 | 3.9 | 24 | 1.82 | 2.04 | 0.89 | 0.068 | PRESENT INVENTION EXAMPLE 69 | 700 |
| 90 | 40 | 5.7 | 8.6 | 1.76 | 2.04 | 0.86 | 0.076 | PRESENT INVENTION EXAMPLE 70 | 700 |
| 91 | 32 | 8.5 | 2.5 | 1.72 | 2.04 | 0.84 | 0.091 | PRESENT INVENTION EXAMPLE 71 | 700 |
| 92 | 62 | 0.9 | 157 | 1.86 | 2.04 | 0.91 | 0.035 | PRESENT INVENTION EXAMPLE 72 | 700 |
| 93 | 61 | 0.9 | 132 | 1.86 | 2.04 | 0.91 | 0.046 | PRESENT INVENTION EXAMPLE 73 | 700 |
| 94 | 60 | 1.2 | 62 | 1.85 | 2.04 | 0.91 | 0.057 | PRESENT INVENTION EXAMPLE 74 | 700 |
| 95 | 45 | 3.5 | 28 | 1.78 | 2.04 | 0.87 | 0.066 | PRESENT INVENTION EXAMPLE 75 | 700 |
| 96 | 42 | 5.3 | 9.4 | 1.76 | 2.04 | 0.86 | 0.084 | PRESENT INVENTION EXAMPLE 76 | 700 |
| 97 | 31 | 9.1 | 3.8 | 1.73 | 2.04 | 0.85 | 0.091 | PRESENT INVENTION EXAMPLE 77 | 700 |
| 98 | 60 | 1.1 | 167 | 1.86 | 2.04 | 0.91 | 0.031 | PRESENT INVENTION EXAMPLE 78 | 700 |
| 99 | 60 | 1 | 121 | 1.86 | 2.04 | 0.91 | 0.047 | PRESENT INVENTION EXAMPLE 79 | 700 |
| 100 | 59 | 1.2 | 71 | 1.85 | 2.04 | 0.91 | 0.054 | PRESENT INVENTION EXAMPLE 80 | 700 |
| 101 | 43 | 4.5 | 31 | 1.79 | 2.04 | 0.88 | 0.068 | PRESENT INVENTION EXAMPLE 81 | 700 |
| 102 | 41 | 6.2 | 10 | 1.76 | 2.04 | 0.86 | 0.079 | PRESENT INVENTION EXAMPLE 82 | 700 |
| 103 | 30 | 9.7 | 2.6 | 1.72 | 2.04 | 0.84 | 0.087 | PRESENT INVENTION EXAMPLE 83 | 700 |
| 104 | 64 | 0.7 | 184 | 1.88 | 2.04 | 0.92 | 0.027 | PRESENT INVENTION EXAMPLE 84 | 700 |
| 105 | 64 | 0.7 | 137 | 1.87 | 2.04 | 0.92 | 0.044 | PRESENT INVENTION EXAMPLE 85 | 700 |
| 106 | 63 | 0.8 | 68 | 1.88 | 2.04 | 0.92 | 0.057 | PRESENT INVENTION EXAMPLE 86 | 700 |
| 107 | 50 | 2.8 | 32 | 1.81 | 2.04 | 0.89 | 0.071 | PRESENT INVENTION EXAMPLE 87 | 700 |
| 108 | 43 | 4.7 | 9.4 | 1.75 | 2.04 | 0.86 | 0.082 | PRESENT INVENTION EXAMPLE 88 | 700 |
| 109 | 33 | 7.9 | 3.1 | 1.71 | 2.04 | 0.84 | 0.094 | PRESENT INVENTION EXAMPLE 89 | 700 |
| 110 | 61 | 0.9 | 154 | 1.87 | 2.04 | 0.92 | 0.022 | PRESENT INVENTION EXAMPLE 90 | 700 |
| 111 | 61 | 0.9 | 118 | 1.87 | 2.04 | 0.92 | 0.039 | PRESENT INVENTION EXAMPLE 91 | 700 |
| 112 | 60 | 1.2 | 66 | 1.86 | 2.04 | 0.91 | 0.053 | PRESENT INVENTION EXAMPLE 92 | 700 |
| 113 | 45 | 4.3 | 24 | 1.81 | 2.04 | 0.89 | 0.067 | PRESENT INVENTION EXAMPLE 93 | 700 |

TABLE 6-continued

| | | | | | | | | | | |
|---|---|---|---|---|---|---|---|---|---|---|
| | 114 | 39 | 6.6 | 8.9 | 1.76 | 2.04 | 0.86 | 0.075 | PRESENT INVENTION EXAMPLE 94 | 700 |
| | 115 | 30 | 8.2 | 4.2 | 1.72 | 2.04 | 0.84 | 0.088 | PRESENT INVENTION EXAMPLE 95 | 700 |
| | 116 | 60 | 1.1 | 186 | 1.86 | 2.04 | 0.91 | 0.019 | PRESENT INVENTION EXAMPLE 96 | 700 |
| | 117 | 59 | 1.3 | 136 | 1.85 | 2.04 | 0.91 | 0.032 | PRESENT INVENTION EXAMPLE 97 | 700 |
| | 118 | 58 | 1.6 | 74 | 1.85 | 2.04 | 0.91 | 0.050 | PRESENT INVENTION EXAMPLE 98 | 700 |
| | 119 | 46 | 3.5 | 28 | 1.79 | 2.04 | 0.88 | 0.062 | PRESENT INVENTION EXAMPLE 99 | 700 |
| | 120 | 38 | 6.9 | 12 | 1.76 | 2.04 | 0.86 | 0.072 | PRESENT INVENTION EXAMPLE 100 | 700 |
| | 121 | 31 | 9.1 | 3.9 | 1.71 | 2.04 | 0.84 | 0.093 | PRESENT INVENTION EXAMPLE 101 | 700 |

TABLE 7

| | | | | | | MANUFACTURE | | | |
|---|---|---|---|---|---|---|---|---|---|
| | | BASE MATERIAL | | SECOND LAYER | | | | SEEDING | |
| | | | | | | TEMPERATURE | | SEEDING ACCUMULATION | SEEDING ACCUMULATION |
| No. | No. | THICKNESS mm | ELEMENT | THICKNESS μm | BONDING METHOD | INCREASING RATE ° C./sec | MEASURED TEMPERATURE | DEGREE OF {200} PLANES IN αFe | DEGREE OF {222} PLANES IN αFe |
| 122 | 24 | 0.5 | Al | 10 | VAPOR DEPOSITION | 10 | 870 | 31 | 7.7 |
| 123 | 25 | 0.5 | Al | 10 | VAPOR DEPOSITION | 10 | 870 | 31 | 7.9 |
| 124 | 26 | 0.5 | Al | 10 | VAPOR DEPOSITION | 10 | 870 | 30 | 9.3 |
| 125 | 27 | 0.5 | Al | 10 | VAPOR DEPOSITION | 10 | 870 | 27 | 9.8 |
| 126 | 28 | 0.5 | Al | 10 | VAPOR DEPOSITION | 10 | 870 | 25 | 10 |
| 127 | 24 | 0.5 | Si | 12 | VAPOR DEPOSITION | 20 | 870 | 31 | 8.1 |
| 128 | 25 | 0.5 | Si | 12 | VAPOR DEPOSITION | 20 | 870 | 31 | 8.2 |
| 129 | 26 | 0.5 | Si | 12 | VAPOR DEPOSITION | 20 | 870 | 30 | 9.3 |
| 130 | 27 | 0.5 | Si | 12 | VAPOR DEPOSITION | 20 | 870 | 27 | 10 |
| 131 | 28 | 0.5 | Si | 12 | VAPOR DEPOSITION | 20 | 870 | 26 | 11 |
| 132 | 24 | 0.5 | Mo | 8 | SPUTTERING | 1 | 870 | 33 | 6.8 |
| 133 | 25 | 0.5 | Mo | 8 | SPUTTERING | 1 | 870 | 32 | 7.3 |
| 134 | 26 | 0.5 | Mo | 8 | SPUTTERING | 1 | 870 | 30 | 8.8 |
| 135 | 27 | 0.5 | Mo | 8 | SPUTTERING | 1 | 870 | 27 | 9.3 |
| 136 | 28 | 0.5 | Mo | 8 | SPUTTERING | 1 | 870 | 25 | 10 |
| 137 | 29 | 3 | Al | 120 | HOT DIPPING | 2 | 942 | 13 | 13 |
| 138 | 30 | 2 | Al | 80 | HOT DIPPING | 2 | 942 | 25 | 10 |
| 139 | 31 | 1 | Al | 40 | HOT DIPPING | 2 | 942 | 31 | 8.3 |
| 140 | 32 | 0.2 | Al | 8 | VAPOR DEPOSITION | 2 | 942 | 32 | 7.5 |
| 141 | 33 | 0.1 | Al | 4 | VAPOR DEPOSITION | 2 | 942 | 33 | 6.7 |
| 142 | 34 | 0.05 | Al | 2 | VAPOR DEPOSITION | 2 | 942 | 33 | 6.5 |
| 143 | 35 | 0.01 | Al | 0.4 | VAPOR DEPOSITION | 2 | 942 | 32 | 6.4 |
| 144 | 29 | 3 | Sn | 60 | HOT DIPPING | 5 | 942 | 12 | 12 |
| 145 | 30 | 2 | Sn | 40 | HOT DIPPING | 5 | 942 | 25 | 10 |
| 146 | 31 | 1 | Sn | 20 | HOT DIPPING | 5 | 942 | 32 | 8.1 |

TABLE 7-continued

| | | | | | | | | | |
|---|---|---|---|---|---|---|---|---|---|
| 147 | 32 | 0.2 | Sn | 4 | ELECTROLYTIC PLATING | 5 | 942 | 33 | 7.1 |
| 148 | 33 | 0.1 | Sn | 2 | ELECTROLYTIC PLATING | 5 | 942 | 34 | 6.3 |
| 149 | 34 | 0.05 | Sn | 1 | ELECTROLYTIC PLATING | 5 | 942 | 35 | 6.1 |
| 150 | 35 | 0.01 | Sn | 0.2 | ELECTROLYTIC PLATING | 5 | 942 | 34 | 6.6 |
| 151 | 29 | 3 | Zn | 60 | HOT DIPPING | 1 | 942 | 14 | 13 |
| 152 | 30 | 2 | Zn | 40 | HOT DIPPING | 1 | 942 | 25 | 11 |
| 153 | 31 | 1 | Zn | 20 | HOT DIPPING | 1 | 942 | 30 | 8.8 |
| 154 | 32 | 0.2 | Zn | 4 | ELECTROLYTIC PLATING | 1 | 942 | 31 | 7.8 |
| 155 | 33 | 0.1 | Zn | 2 | ELECTROLYTIC PLATING | 1 | 942 | 32 | 6.5 |
| 156 | 34 | 0.05 | Zn | 1 | ELECTROLYTIC PLATING | 1 | 942 | 32 | 6.3 |
| 157 | 35 | 0.01 | Zn | 0.2 | ELECTROLYTIC PLATING | 1 | 942 | 32 | 6.7 |

| | MANUFACTURE | | | | | |
|---|---|---|---|---|---|---|
| | SAVING AND ACHIEVEMENT OF HIGH ACCUMULATION | | | | GROWTH | |
| | | | ACHIEVEMENT OF HIGH ACCUMULATION | ACHIEVEMENT OF HIGH ACCUMULATION | | |
| No. | HOLDING TEMPERATURE ° C. | HOLDING TIME sec | ACCUMULATION DEGREE OF {200} PLANES IN αFe | ACCUMULATION DEGREE OF {222} PLANES IN αFe | COOLING RATE ° C./sec | ½t ACCUMULATION DEGREE OF {200} PLANES | ½t ACCUMULATION DEGREE OF {222} PLANES |
| 122 | 930 | 20 | 56 | 1.6 | 80 | 56 | 1.6 |
| 123 | 930 | 20 | 55 | 1.8 | 80 | 55 | 1.8 |
| 124 | 930 | 20 | 52 | 2.5 | 80 | 52 | 2.5 |
| 125 | 930 | 20 | 40 | 5.9 | 80 | 40 | 5.9 |
| 126 | 930 | 20 | 32 | 9.3 | 80 | 32 | 9.3 |
| 127 | 980 | 60 | 54 | 1.7 | 20 | 54 | 1.7 |
| 128 | 980 | 60 | 53 | 1.9 | 20 | 53 | 1.9 |
| 129 | 980 | 60 | 51 | 2.8 | 20 | 51 | 2.8 |
| 130 | 980 | 60 | 39 | 7.4 | 20 | 39 | 7.4 |
| 131 | 980 | 60 | 33 | 9.5 | 20 | 33 | 9.5 |
| 132 | 1000 | 15 | 56 | 1.7 | 50 | 56 | 1.7 |
| 133 | 1000 | 15 | 56 | 1.7 | 50 | 56 | 1.7 |
| 134 | 1000 | 15 | 53 | 2.1 | 50 | 53 | 2.1 |
| 135 | 1000 | 15 | 41 | 6.3 | 50 | 41 | 6.3 |
| 136 | 1000 | 15 | 31 | 9.3 | 50 | 31 | 9.3 |
| 137 | 1050 | 25 | 15 | 13 | 100 | 15 | 13 |
| 138 | 1050 | 25 | 32 | 9.5 | 100 | 32 | 9.5 |
| 139 | 1050 | 25 | 50 | 2.8 | 100 | 50 | 2.8 |
| 140 | 1050 | 25 | 54 | 2.1 | 100 | 54 | 2.1 |
| 141 | 1050 | 25 | 55 | 1.8 | 100 | 55 | 1.8 |
| 142 | 1050 | 25 | 56 | 1.7 | 100 | 56 | 1.7 |
| 143 | 1050 | 25 | 55 | 1.8 | 100 | 55 | 1.8 |
| 144 | 1100 | 60 | 14 | 14 | 200 | 14 | 14 |
| 145 | 1100 | 60 | 32 | 9.4 | 200 | 32 | 9.4 |
| 146 | 1100 | 60 | 51 | 2.5 | 200 | 51 | 2.5 |
| 147 | 1100 | 60 | 56 | 1.8 | 200 | 56 | 1.8 |
| 148 | 1100 | 60 | 57 | 1.3 | 200 | 57 | 1.3 |
| 149 | 1100 | 60 | 57 | 1.1 | 200 | 57 | 1.1 |
| 150 | 1100 | 60 | 56 | 1.4 | 200 | 56 | 1.4 |
| 151 | 980 | 200 | 16 | 12 | 50 | 16 | 12 |
| 152 | 980 | 200 | 30 | 9.8 | 50 | 30 | 9.8 |
| 153 | 980 | 200 | 50 | 3.1 | 50 | 50 | 3.1 |
| 154 | 980 | 200 | 52 | 2.5 | 50 | 52 | 2.5 |
| 155 | 980 | 200 | 54 | 2.1 | 50 | 54 | 2.1 |
| 156 | 980 | 200 | 55 | 1.9 | 50 | 55 | 1.9 |
| 157 | 980 | 200 | 54 | 2.1 | 50 | 54 | 2.1 |

TABLE 7-continued

| | PRODUCT | | | | | | | | |
|---|---|---|---|---|---|---|---|---|---|
| | TEXTURE EVALUATION | | | | | | | | |
| | ACCUMULATION DEGREE OF {200} PLANES | ACCUMULATION DEGREE OF {222} PLANES | | MAGNETIC FLUX DENSITY EVALUATION | | | | | α-REGION |
| No. | IN αFe | IN αFe | Z | B50 T | Bs T | B50/Bs | ΔB T | NOTE | TEMPERATURE |
| 122 | 56 | 1.6 | 98 | 1.85 | 1.98 | 0.93 | 0.024 | PRESENT INVENTION EXAMPLE 102 | 650 |
| 123 | 55 | 1.8 | 78 | 1.85 | 1.98 | 0.93 | 0.028 | PRESENT INVENTION EXAMPLE 103 | 650 |
| 124 | 52 | 2.5 | 57 | 1.83 | 1.98 | 0.92 | 0.041 | PRESENT INVENTION EXAMPLE 104 | 650 |
| 125 | 40 | 5.9 | 24 | 1.73 | 1.98 | 0.87 | 0.057 | PRESENT INVENTION EXAMPLE 105 | 650 |
| 126 | 32 | 9.3 | 3.8 | 1.69 | 1.98 | 0.85 | 0.087 | PRESENT INVENTION EXAMPLE 106 | 650 |
| 127 | 54 | 1.7 | 110 | 1.84 | 1.98 | 0.93 | 0.021 | PRESENT INVENTION EXAMPLE 107 | 650 |
| 128 | 53 | 1.9 | 76 | 1.84 | 1.98 | 0.93 | 0.025 | PRESENT INVENTION EXAMPLE 108 | 650 |
| 129 | 51 | 2.8 | 65 | 1.82 | 1.98 | 0.92 | 0.035 | PRESENT INVENTION EXAMPLE 109 | 650 |
| 130 | 39 | 7.4 | 29 | 1.76 | 1.98 | 0.89 | 0.053 | PRESENT INVENTION EXAMPLE 110 | 650 |
| 131 | 33 | 9.5 | 5.6 | 1.68 | 1.98 | 0.85 | 0.086 | PRESENT INVENTION EXAMPLE 111 | 650 |
| 132 | 56 | 1.7 | 105 | 1.86 | 1.98 | 0.94 | 0.023 | PRESENT INVENTION EXAMPLE 112 | 650 |
| 133 | 56 | 1.7 | 68 | 1.86 | 1.98 | 0.94 | 0.031 | PRESENT INVENTION EXAMPLE 113 | 650 |
| 134 | 53 | 2.1 | 59 | 1.84 | 1.98 | 0.93 | 0.045 | PRESENT INVENTION EXAMPLE 114 | 650 |
| 135 | 41 | 6.3 | 23 | 1.77 | 1.98 | 0.89 | 0.072 | PRESENT INVENTION EXAMPLE 115 | 650 |
| 136 | 31 | 9.3 | 4.2 | 1.68 | 1.98 | 0.85 | 0.092 | PRESENT INVENTION EXAMPLE 116 | 650 |
| 137 | 15 | 13 | 0.9 | 1.59 | 2.02 | 0.79 | 0.086 | COMPARATIVE EXAMPLE 21 | 750 |
| 138 | 32 | 9.5 | 2.5 | 1.73 | 2.02 | 0.86 | 0.062 | PRESENT INVENTION EXAMPLE 117 | 750 |
| 139 | 50 | 2.8 | 35 | 1.79 | 2.02 | 0.89 | 0.053 | PRESENT INVENTION EXAMPLE 118 | 750 |
| 140 | 54 | 2.1 | 65 | 1.83 | 2.02 | 0.91 | 0.041 | PRESENT INVENTION EXAMPLE 119 | 750 |
| 141 | 55 | 1.8 | 114 | 1.83 | 2.02 | 0.91 | 0.032 | PRESENT INVENTION EXAMPLE 120 | 750 |
| 142 | 56 | 1.7 | 126 | 1.83 | 2.02 | 0.91 | 0.018 | PRESENT INVENTION EXAMPLE 121 | 750 |
| 143 | 55 | 1.8 | 132 | 1.83 | 2.02 | 0.91 | 0.015 | PRESENT INVENTION EXAMPLE 122 | 750 |
| 144 | 14 | 14 | 0.4 | 1.60 | 2.02 | 0.79 | 0.092 | COMPARATIVE EXAMPLE 22 | 750 |
| 145 | 32 | 9.4 | 3.2 | 1.72 | 2.02 | 0.85 | 0.068 | PRESENT INVENTION EXAMPLE 123 | 750 |

TABLE 7-continued

| | | | | | | | | | |
|---|---|---|---|---|---|---|---|---|---|
| 146 | 51 | 2.5 | 29 | 1.76 | 2.02 | 0.87 | 0.052 | PRESENT INVENTION EXAMPLE 124 | 750 |
| 147 | 56 | 1.8 | 59 | 1.84 | 2.02 | 0.91 | 0.043 | PRESENT INVENTION EXAMPLE 125 | 750 |
| 148 | 57 | 1.3 | 94 | 1.84 | 2.02 | 0.91 | 0.029 | PRESENT INVENTION EXAMPLE 126 | 750 |
| 149 | 57 | 1.1 | 123 | 1.85 | 2.02 | 0.92 | 0.021 | PRESENT INVENTION EXAMPLE 127 | 750 |
| 150 | 56 | 1.4 | 135 | 1.84 | 2.02 | 0.91 | 0.018 | PRESENT INVENTION EXAMPLE 128 | 750 |
| 151 | 16 | 12 | <u>1.1</u> | 1.58 | 2.02 | 0.78 | 0.087 | COMPARATIVE EXAMPLE 23 | 750 |
| 152 | 30 | 9.8 | 4.5 | 1.71 | 2.02 | 0.85 | 0.058 | PRESENT INVENTION EXAMPLE 129 | 750 |
| 153 | 50 | 3.1 | 27 | 1.79 | 2.02 | 0.89 | 0.047 | PRESENT INVENTION EXAMPLE 130 | 750 |
| 154 | 52 | 2.5 | 49 | 1.83 | 2.02 | 0.91 | 0.039 | PRESENT INVENTION EXAMPLE 131 | 750 |
| 155 | 54 | 2.1 | 79 | 1.83 | 2.02 | 0.91 | 0.025 | PRESENT INVENTION EXAMPLE 132 | 750 |
| 156 | 55 | 1.9 | 132 | 1.83 | 2.02 | 0.91 | 0.018 | PRESENT INVENTION EXAMPLE 133 | 750 |
| 157 | 54 | 2.1 | 172 | 1.83 | 2.02 | 0.91 | 0.012 | PRESENT INVENTION EXAMPLE 134 | 750 |

In each of present invention examples, it was possible to confirm that the magnetic flux density difference ΔB becomes a small value as compared to comparative examples, and a high magnetic flux density is obtained thoroughly in an in-plane circumferential direction. Further, in these Fe-based metal sheets, it was possible to confirm that an excellent magnetic property in which the value of B50/Bs is 0.86 or more is obtained.

Further, in the present invention examples, as shown in Table 5 to Table 7, it was possible to confirm that the {200} plane in the α-Fe phase is likely to be highly accumulated at each of the stages of the heat treatment.

Further, an L cross section of each of the present invention examples was observed, and thereby it was confirmed that the α single phase region made of the α single phase based component exists in at least a partial region including the surfaces and a ratio of the α single phase region to the L cross section is 1% or more.

When the Z value was not less than 2 nor more than 200 as defined in the present invention as above, it was possible to confirm that a high magnetic flux density is obtained thoroughly in the in-plane circumferential direction. Further, in order to obtain the Fe-based metal sheet as above, the α-region rolling was performed at a temperature of 300° C. or higher and lower than the A3 point between the hot rolling and the cold rolling, thereby making it possible to obtain an intended product.

In contrast to this, when the base metal sheets obtained by performing the α-region rolling under the condition not satisfying the requirements of the present invention were used, it was not possible to obtain a high magnetic flux density such as that in the present invention examples in the in-plane circumferential direction thoroughly.

Example 3

In this example, as base metal sheets, Fe-based metal sheets were fabricated in a manner that pure irons each containing C: 0.050 mass %, Si: 0.0001 mass %, and Al: 0.0002 mass %, and having a balance being composed of Fe and inevitable impurities were subjected to decarburization to have Al applied thereto as a second layer, of which the previously described Z value (=(A+0.97B)/0.98C) and the magnetic flux density difference ΔB were examined. Further, the relationship between manufacturing conditions and an accumulation degree of {200} planes was also examined.

First, ingots were melted by vacuum melting, and then were subjected to hot rolling and cold rolling to be worked to a predetermined thickness, and the base metal sheets each composed of the previously described composition were obtained. Incidentally, the A1 point of the base metal sheets was 727° C.

In the hot rolling, the ingots each having a thickness of 230 mm heated to 1000° C. were thinned down to a thickness of 50 mm, and hot-rolled sheets were obtained. Sheet materials having various thicknesses were cut out from these hot-rolled sheets by machining and then were subjected to the cold rolling, and thereby cold-rolled sheets each having a thickness of 8 μm to 750 μm (the base metal sheets) were obtained.

Incidentally, the main phase of each of the base metal sheets at room temperature was an α-Fe phase and as a result of measurement, the A3 point at which the α-γ transformation occurred was 911° C. Further, a texture in the α-Fe phase of each of the base metal sheets was measured by X-ray diffraction, and by the previously described method, an accumulation degree of {200} planes and an accumulation degree of {222} planes were obtained. Further, as a result that up to the cold rolling was performed, it was confirmed that of each of the base metal sheets, the accumulation degree of the {200} planes is 20 to 26% and the accumulation degree of the {222} planes is 18 to 24%.

Next, these base metal sheets were subjected to decarburization annealing so that a decarburized depth (a distance x) might become 1 μm to 59 μm. A decarburization condition was set that the temperature is 800° C. and the decarburization time is 0.05 minutes to 550 minutes. With regard to the atmosphere during the decarburization annealing, a strong decarburizing atmosphere was applied in the case of the decarburization annealing being performed for one minute or shorter, and in the case of the decarburization annealing being performed for longer than one minute, a weak decarburizing atmosphere was applied in the first half of the decarburization annealing and a strong decarburizing atmosphere was applied in the second half of the decarburization annealing.

Then, after the decarburization annealing was performed, the decarburized depth and the C content of a decarburized region were measured and a structure and a crystal orientation of a surface layer were examined. The measurement of the crystal orientation was performed by the method using the previously described X-ray diffraction method, the X-ray was emitted from the surface, and the accumulation degree of the {200} planes in the α-Fe phase was obtained.

After the decarburization annealing, both surfaces of each of the base metal sheets were coated with Al as the second layer by an ion plating method (hereinafter, an IP method) to each have a thickness of 1 μm.

Next, an experiment was performed in which a heat treatment was performed on the base metal sheets to each of which the second layers was bonded under various conditions. A gold image furnace was used for the heat treatment, and a temperature increasing rate, a holding temperature, and a holding time were variously controlled by program control. During which the temperature increased to be held, the heat treatment was performed in an atmosphere vacuumed to a pressure of $10^{-3}$ Pa level. At the time of cooling, in the case of a cooling rate of 1° C./sec or lower, temperature control was performed in a vacuum by furnace output control. Further, in the case of the cooling rate of 10° C./sec or more, an Ar gas was introduced and the cooling rate was controlled by adjustment of its flow rate.

Further, the observation of the texture in this period was also performed by the same method described in Example 1. Further, magnetometry was performed in the same manner as that in Example 1 in order to evaluate obtained products, and further the Z value was calculated by the X-ray diffraction.

Further, an alloyed ratio in the second layer and a ratio of the α single phase region were defined and obtained as follows.

Plane distribution of the Fe content and plane distribution of the Al content were measured by using an EPMA (Electron Probe Micro-Analysis) method, with a field of view of an L direction 1 mm×the total thickness in an L cross section. First, as the alloyed ratio in the second layer, areas of a region satisfying Fe≤mass % and Al≥99.5 mass % before and after the heat treatment were obtained. Then, the alloyed ratio of the second layer was defined as $(S_0-S)/S_0 \times 100$, where an area when Al was applied and the heat treatment was not performed was set to $S_0$ and an area in the Fe-based metal sheet on which the whole heat treatment was completed was set to S.

Further, the ratio of the α single phase region was defined as $(T/T_0) \times 100$, where an area of a cross section of the Fe-based metal sheet after the heat treatment, observed in the L cross section was set to $T_0$ and an area of a diffused region of the different metal after the heat treatment was set to T. Incidentally, when the second layer was Al, an area of a region satisfying Al≥0.9 mass % was set to T.

Table 8 shows the base metal sheets and conditions of the decarburization and the heat treatment, and shows the accumulation degrees of the {200} planes and the accumulation degrees of the {200} planes measured during the manufacture (after the decarburization annealing) and after the manufacture (after the diffusion treatment), the Z values of the obtained Fe-based metal sheets, the alloyed ratios of the second layers, and evaluation results of the magnetometry.

TABLE 8

| No. | BASE MATERIAL C CONTENT mass % | SHEET THICKNESS μm | DECARBU- RIZING ATMOSPHERE | DECARBU- RIZATION TEMPERATURE °C. | DECARBU- RIZATION TIME MINUTE | DECARBU- RIZED REGION μm | C CONTENT AFTER DECARBU- RIZATION mass % |
|---|---|---|---|---|---|---|---|
| 201 | 0.050 | 10 | STRONG | 800 | 1 | 9 | 0.010 |
| 202 | 0.050 | 100 | WEAK + STRONG | 800 | 3 | 12 | 0.011 |
| 203 | 0.050 | 250 | WEAK + STRONG | 800 | 5 | 14 | 0.015 |
| 204 | 0.050 | 500 | WEAK + STRONG | 800 | 15 | 22 | 0.018 |
| 205 | 0.050 | 750 | WEAK + STRONG | 800 | 30 | 31 | 0.018 |
| 206 | 0.050 | 100 | STRONG | 800 | 0.1 | 6 | 0.008 |
| 207 | 0.050 | 100 | WEAK + STRONG | 800 | 250 | 36 | 0.017 |
| 208 | 0.050 | 500 | WEAK + STRONG | 800 | 550 | 49 | 0.017 |
| 209 | 0.050 | 200 | WEAK + STRONG | 800 | 10 | 18 | 0.008 |
| 210 | 0.050 | 200 | WEAK + STRONG | 800 | 10 | 18 | 0.009 |
| 211 | 0.050 | 200 | WEAK + STRONG | 800 | 10 | 19 | 0.008 |
| 212 | 0.050 | 200 | WEAK + STRONG | 800 | 10 | 18 | 0.010 |
| 213 | 0.050 | 200 | WEAK + STRONG | 800 | 10 | 17 | 0.008 |
| 214 | 0.050 | 200 | WEAK + STRONG | 800 | 10 | 18 | 0.009 |
| 215 | 0.050 | 200 | WEAK + STRONG | 800 | 10 | 18 | 0.009 |
| 216 | 0.050 | 200 | WEAK + STRONG | 800 | 10 | 16 | 0.010 |
| 217 | 0.050 | 150 | WEAK + STRONG | 800 | 8 | 15 | 0.007 |
| 218 | 0.050 | 150 | WEAK + STRONG | 800 | 8 | 14 | 0.006 |
| 219 | 0.050 | 150 | WEAK + STRONG | 800 | 8 | 16 | 0.007 |
| 220 | 0.050 | 150 | WEAK + STRONG | 800 | 8 | 14 | 0.007 |
| 221 | 0.050 | 150 | WEAK + STRONG | 800 | 8 | 14 | 0.007 |
| 222 | 0.050 | 150 | WEAK + STRONG | 800 | 8 | 15 | 0.007 |
| 223 | 0.050 | 150 | WEAK + STRONG | 800 | 8 | 16 | 0.006 |
| 224 | 0.050 | 300 | WEAK + STRONG | 800 | 15 | 21 | 0.011 |
| 225 | 0.050 | 300 | WEAK + STRONG | 800 | 15 | 22 | 0.009 |
| 226 | 0.050 | 300 | WEAK + STRONG | 800 | 15 | 22 | 0.009 |
| 227 | 0.050 | 8 | STRONG | 800 | 1 | 8 | 0.010 |
| 228 | 0.050 | 100 | STRONG | 800 | 0.05 | 1 | 0.050 |
| 229 | 0.050 | 100 | WEAK + STRONG | 800 | 60 | 59 | 0.003 |
| 230 | 0.050 | 100 | WEAK + STRONG | 800 | 18 | 23 | 0.010 |
| 231 | 0.050 | 100 | WEAK + STRONG | 800 | 18 | 25 | 0.011 |
| 232 | 0.050 | 100 | WEAK + STRONG | 800 | 18 | 26 | 0.009 |

TABLE 8-continued

| No. | | | | | | | |
|---|---|---|---|---|---|---|---|
| 233 | 0.050 | 100 | WEAK + STRONG | 800 | 18 | 25 | 0.009 |
| 234 | 0.050 | 100 | WEAK + STRONG | 800 | 18 | 24 | 0.010 |
| 235 | 0.050 | 100 | WEAK + STRONG | 800 | 18 | 26 | 0.009 |

| No. | ACCUMULATION DEGREE OF {200} PLANES AFTER DECARBURIZATION | FERRITE- FORMING ELEMENT | TEMPERATURE INCREASING RATE °C./sec | HOLDING TEMPERATURE T1 °C. | HOLDING TIME MINUTE | COOLING RATE °C./sec | $(S_0 - S)/S_0 \times 100$ |
|---|---|---|---|---|---|---|---|
| 201 | 26 | Al | 0.5 | 1000 | 5 | 100 | 79 |
| 202 | 24 | Al | 0.5 | 1000 | 5 | 100 | 65 |
| 203 | 25 | Al | 0.5 | 1000 | 5 | 100 | 52 |
| 204 | 21 | Al | 0.5 | 1000 | 5 | 100 | 39 |
| 205 | 29 | Al | 0.5 | 1000 | 5 | 100 | 37 |
| 206 | 23 | Al | 0.5 | 1000 | 5 | 100 | 66 |
| 207 | 26 | Al | 0.5 | 1000 | 5 | 100 | 64 |
| 208 | 38 | Al | 0.5 | 1000 | 5 | 100 | 31 |
| 209 | 26 | Al | 0.1 | 950 | 1 | 100 | 61 |
| 210 | 27 | Al | 1 | 1000 | 1 | 100 | 59 |
| 211 | 26 | Al | 5 | 1000 | 5 | 100 | 62 |
| 212 | 25 | Al | 10 | 1000 | 5 | 100 | 60 |
| 213 | 26 | Al | 20 | 1000 | 5 | 100 | 58 |
| 214 | 26 | Al | 0.5 | 950 | 5 | 100 | 59 |
| 215 | 27 | Al | 0.5 | 1050 | 5 | 100 | 60 |
| 216 | 25 | Al | 0.5 | 1200 | 5 | 100 | 57 |
| 217 | 28 | Al | 0.5 | 1000 | 0.5 | 100 | 29 |
| 218 | 29 | Al | 0.5 | 1000 | 10 | 100 | 61 |
| 219 | 30 | Al | 0.5 | 1000 | 30 | 100 | 76 |
| 220 | 29 | Al | 0.5 | 1000 | 60 | 100 | 81 |
| 221 | 29 | Al | 0.5 | 1000 | 120 | 100 | 96 |
| 222 | 28 | Al | 0.5 | 1000 | 550 | 100 | 100 |
| 223 | 30 | Al | 0.5 | 1000 | 4500 | 100 | 100 |
| 224 | 22 | Al | 0.5 | 1000 | 10 | 0.1 | 79 |
| 225 | 21 | Al | 0.5 | 1000 | 10 | 10 | 51 |
| 226 | 22 | Al | 0.5 | 1000 | 10 | 450 | 55 |
| 227 | 26 | Al | 0.5 | 950 | 1 | 100 | 100 |
| 228 | 17 | Al | 0.5 | 1000 | 10 | 100 | 65 |
| 229 | 28 | Al | 0.5 | 1000 | 10 | 100 | 62 |
| 230 | 26 | NONE | 0.5 | 1000 | 10 | 100 | 0 |
| 231 | 24 | Al | 0.5 | 900 | 10 | 100 | 46 |
| 232 | 27 | Al | 0.5 | 1350 | 10 | 100 | 78 |
| 233 | 23 | Al | 0.5 | 1000 | 6000 | 100 | 100 |
| 234 | 25 | Al | 0.5 | 1000 | 10 | 0.05 | 85 |
| 235 | 28 | Al | 0.5 | 1000 | 10 | 550 | 34 |

| No. | $T/T_0 \times 100$ | ACCUMULATION DEGREE OF {200} PLANES AFTER DIFFUSION | ACCUMULATION DEGREE OF {222} PLANES AFTER DIFFUSION | Z | B50/Bs OF PRODUCT | ΔBT | NOTE |
|---|---|---|---|---|---|---|---|
| 201 | 64 | 54 | 16 | 124 | 0.892 | 0.042 | INVENTION EXAMPLE 201 |
| 202 | 50 | 42 | 28 | 56 | 0.864 | 0.057 | INVENTION EXAMPLE 202 |
| 203 | 43 | 36 | 24 | 8.9 | 0.842 | 0.098 | INVENTION EXAMPLE 203 |
| 204 | 32 | 36 | 20 | 11 | 0.852 | 0.091 | INVENTION EXAMPLE 204 |
| 205 | 30 | 37 | 22 | 15 | 0.859 | 0.085 | INVENTION EXAMPLE 205 |
| 206 | 49 | 46 | 24 | 69 | 0.893 | 0.042 | INVENTION EXAMPLE 206 |
| 207 | 44 | 41 | 22 | 42 | 0.865 | 0.054 | INVENTION EXAMPLE 207 |
| 208 | 26 | 32 | 27 | 3.1 | 0.833 | 0.101 | INVENTION EXAMPLE 208 |
| 209 | 50 | 41 | 23 | 39 | 0.859 | 0.083 | INVENTION EXAMPLE 209 |
| 210 | 48 | 39 | 26 | 25 | 0.865 | 0.071 | INVENTION EXAMPLE 210 |
| 211 | 51 | 42 | 18 | 68 | 0.872 | 0.045 | INVENTION EXAMPLE 211 |

TABLE 8-continued

| | | | | | | | |
|---|---|---|---|---|---|---|---|
| 212 | 46 | 34 | 25 | 4.3 | 0.851 | 0.096 | INVENTION EXAMPLE 212 |
| 213 | 50 | 49 | 11 | 76 | 0.897 | 0.038 | INVENTION EXAMPLE 213 |
| 214 | 48 | 36 | 23 | 16 | 0.845 | 0.084 | INVENTION EXAMPLE 214 |
| 215 | 44 | 48 | 18 | 82 | 0.896 | 0.021 | INVENTION EXAMPLE 215 |
| 216 | 46 | 60 | 9 | 148 | 0.904 | 0.016 | INVENTION EXAMPLE 216 |
| 217 | 24 | 34 | 24 | 3.5 | 0.835 | 0.115 | INVENTION EXAMPLE 217 |
| 218 | 47 | 73 | 6 | 175 | 0.953 | 0.008 | INVENTION EXAMPLE 218 |
| 219 | 55 | 62 | 11 | 152 | 0.913 | 0.011 | INVENTION EXAMPLE 219 |
| 220 | 68 | 58 | 14 | 135 | 0.901 | 0.018 | INVENTION EXAMPLE 220 |
| 221 | 75 | 52 | 15 | 112 | 0.899 | 0.021 | INVENTION EXAMPLE 221 |
| 222 | 74 | 59 | 10 | 139 | 0.908 | 0.016 | INVENTION EXAMPLE 222 |
| 223 | 76 | 55 | 12 | 131 | 0.895 | 0.018 | INVENTION EXAMPLE 223 |
| 224 | 64 | 63 | 8 | 162 | 0.918 | 0.011 | INVENTION EXAMPLE 224 |
| 225 | 43 | 72 | 4 | 189 | 0.958 | 0.007 | INVENTION EXAMPLE 225 |
| 226 | 37 | 68 | 6 | 158 | 0.954 | 0.009 | INVENTION EXAMPLE 226 |
| 227 | 100 | 18 | 31 | 0.3 | 0.789 | 0.108 | COMPARATIVE EXAMPLE 201 |
| 228 | 41 | 24 | 37 | 1.2 | 0.785 | 0.110 | COMPARATIVE EXAMPLE 202 |
| 229 | 38 | 37 | 24 | 19 | 0.857 | 0.086 | INVENTION EXAMPLE 227 |
| 230 | 0 | 19 | 31 | 1.4 | 0.778 | 0.105 | COMPARATIVE EXAMPLE 203 |
| 231 | 37 | 22 | 27 | 0.9 | 0.768 | 0.104 | COMPARATIVE EXAMPLE 204 |
| 232 | 51 | 38 | 20 | 14 | 0.832 | 0.095 | INVENTION EXAMPLE 228 |
| 233 | 76 | 38 | 26 | 17 | 0.842 | 0.091 | INVENTION EXAMPLE 229 |
| 234 | 70 | 37 | 25 | 16 | 0.845 | 0.089 | INVENTION EXAMPLE 230 |
| 235 | 27 | 38 | 26 | 15 | 0.841 | 0.089 | INVENTION EXAMPLE 231 |

As shown in Table 8, in each of present invention examples, it was possible to confirm that the magnetic flux density difference ΔB becomes a small value as compared to comparative examples and a high magnetic flux density can be obtained thoroughly in the in-plane circumferential direction. Further, in these Fe-based metal sheets, it was possible to confirm that an excellent magnetic property in which the value of B50/Bs is 0.80 or more is obtained.

Further, in the present invention examples, it was possible to confirm that the alloyed ratio and the ratio of the α single phase region can be controlled by the combination of the decarburized depth of the base metal sheet, the temperature increasing rate, the holding temperature after the heating, and the holding time, and the Fe-based metal sheet having an excellent magnetic property can be obtained.

Further, an L cross section of each of the present invention examples was observed, and thereby it was confirmed that the α single phase region made of the α single phase based component exists in at least a partial region including the surfaces and the ratio of the α single phase region to the L cross section is 1% or more.

In contrast to this, for example, in the case of the insufficient decarburized region as in a comparative example 201, in the case of using no metal for the second layer as in a comparative example 203, and in the case of not heating to a temperature of the A3 point or higher as in a comparative example 204, it was not possible to obtain a high magnetic flux density in the in-plane circumferential direction thoroughly as in the present invention examples. Further, even when the temperature was increased to a higher temperature and the holding time was made longer as in present invention examples 228 and 229, the similar effect was able to be obtained, but the significant effect did not appear.

Example 4

In this example, as the ferrite-forming element, Sn, Al, Si, Ti, Ga, Ge, Mo, V, Cr, or As was applied to the second layer, and the relationship between the case where demanganization was performed in addition to decarburization and an accumulation degree of {200} planes was examined.

First, base metal sheets containing six types of components F to K shown in Table 9 below and having a balance being composed of Fe and inevitable impurities were prepared. Ingots were each melted by vacuum melting to then be worked to a predetermined thickness by hot rolling and cold rolling, and the above-described base metal sheets were obtained. Incidentally, the A1 point of each of these base metal sheets was 727° C.

TABLE 9

| STEEL TYPE | Ar3 POINT ° C. | C | Si | Mn | Al | P | N | S | O |
|---|---|---|---|---|---|---|---|---|---|
| | | | | | | | | | (MASS %) |
| F | 877 | 0.03 | 0.05 | 0.15 | 0.0005 | 0.0001 | 0.0002 | <0.0004 | 0.0002 |
| G | 880 | 0.03 | 0.10 | 0.25 | 0.0004 | 0.0002 | 0.0001 | <0.0005 | 0.0001 |
| H | 867 | 0.05 | 0.05 | 1.00 | 0.0003 | 0.0001 | 0.0002 | <0.0004 | 0.0002 |
| I | 771 | 0.50 | 0.1 | 0.30 | 0.0004 | 0.0002 | 0.0002 | <0.0004 | 0.0002 |
| J | 773 | 0.80 | 1.00 | 0.12 | 0.0030 | 0.0020 | 0.0001 | <0.003 | 0.0001 |
| K | 859 | 0.10 | 0.30 | 1.50 | 0.0030 | 0.0020 | 0.0001 | <0.003 | 0.0002 |

In the hot rolling, the ingots each having a thickness of 230 mm were heated to 1000° C. to be thinned down to a thickness of 50 mm, and hot-rolled sheets were obtained. Then, sheet materials having various thicknesses were cut out from these hot-rolled sheets by machining to then be subjected to the cold rolling, and the base metal sheets each having a thickness falling within a range of 10 μm to 750 μm were manufactured.

At this time, the main phase of each of the obtained base metal sheets at room temperature was an α-Fe phase. Further, as a result of measurement, the A3 point at which the α-γ transformation occurred was temperatures shown in Table 9. Further, by X-ray diffraction, a texture in the α-Fe phase of each of the base metal sheets was measured, and by the previously described method, an accumulation degree of {200} planes and an accumulation degree of {222} planes were obtained. As a result, it was confirmed that at the stage of completion of the cold rolling, of each of the base metal sheets, the accumulation degree of the {200} planes was 19 to 27% and the accumulation degree of the {222} planes was 18 to 25%.

Next, these base metal sheets after this cold rolling each had a material promoting decarburization, or a material promoting decarburization and a material promoting demanganization applied thereto as an annealing separating agent, and were subjected to tight coil annealing or stacked annealing. At this time, the annealing was performed so that depths of the decarburization and the demanganization might become not less than 1 μm nor more than 49 μm. As conditions of the annealing, the temperature was set to 700° C. to 900° C. and the annealing was performed in a reduced pressure atmosphere. Further, a structure and a crystal orientation of a surface layer after completion of the decarburization annealing or the decarburization and demanganization annealing were examined. The measurement of the crystal orientation was performed by the X-ray diffraction method, and the accumulation degree of the {200} planes in the α-Fe phase and the accumulation degree of the {222} planes in the α-Fe phase were obtained.

Next, with respect to each of the base metal sheets after the decarburization annealing or the decarburization and demanganization annealing, both surfaces of each of the base metal sheets were coated with the different metal by using an IP method, a hot dipping method, or a sputtering method to have a thickness of 10 μm in total.

Subsequently, a heat treatment was performed under various conditions by the same method as that used in Example 3, and an experiment was performed in which the state in each of the processes during the manufacture was evaluated. An alloyed ratio of the second layer was defined as $(S_0-S)/S_0 \times 100$ similarly to Example 3, and assuming that a metal element of the second layer was [M], an area of a region satisfying Fe≤0.5 mass % and [M]≥99.5 mass % was obtained, which was applied to any one of the elements.

On the other hand, a ratio of the α single phase region was also obtained by the same procedure as that in Example 3. However, when the second layer was Sn, T was obtained from an area of a region satisfying Sn≥3.0 mass %, and similarly, in the case of Al, it was obtained from an area of a region satisfying Al≥0.9 mass %. Further, in the case of Si, it was obtained from an area of a region satisfying Si≥1.9 mass %, and in the case of Ti, it was obtained from an area of a region satisfying Ti≥3.0 mass %. Similarly, in the case of Ga, it was obtained from an area of a region satisfying Ga≥4.1 mass %, in the case of Ge, it was obtained from a region satisfying Ge≥6.4 mass %, in the case of Mo, it was obtained from a region satisfying Mo≥3.8 mass %, in the case of V, it was obtained from a region satisfying V≥1.8 mass %, in the case of Cr, it was obtained from a region satisfying Cr≥14.3 mass %, and in the case of As, it was obtained from an area of a region satisfying As≥3.4 mass %.

Table 10 and Table 11 show the base metal sheets and conditions of the heat treatment such as the decarburization, and show the accumulation degrees of the {200} planes and the accumulation degrees of the {222} planes measured during the manufacture (after the decarburization•demanganization annealing) and after the manufacture (after the diffusion treatment), the Z values of the obtained Fe-based metal sheets, the alloyed ratios of the second layers, and evaluation results of the magnetometry.

TABLE 10

| No. | BASE MATERIAL STEEL TYPE | SHEET THICKNESS μm | DECARBURIZATION AND DEMANGANIZATION ANNEALING TEMPERATURE ° C. | DECARBURIZED AND DEMANGANIZED REGION μm | C CONTENT AFTER DECARBURIZATION mass % | FERRITE-FORMING ELEMENT | TEMPERATURE INCREASING RATE ° C./sec |
|---|---|---|---|---|---|---|---|
| 236 | F | 150 | 800 | 21 | 0.008 | Sn | 0.5 |
| 237 | G | 150 | 800 | 26 | 0.010 | Sn | 0.5 |
| 238 | H | 150 | 800 | 23 | 0.009 | Sn | 0.5 |
| 239 | I | 150 | 800 | 24 | 0.011 | Sn | 0.5 |
| 240 | J | 150 | 800 | 21 | 0.009 | Sn | 0.5 |
| 241 | K | 150 | 800 | 26 | 0.009 | Sn | 0.5 |
| 242 | F | 10 | 800 | 4 | 0.010 | Al | 0.5 |
| 243 | F | 100 | 800 | 12 | 0.011 | Al | 0.5 |
| 244 | F | 250 | 800 | 14 | 0.015 | Al | 0.5 |
| 245 | F | 500 | 800 | 22 | 0.018 | Al | 0.5 |
| 246 | F | 750 | 800 | 31 | 0.018 | Al | 0.5 |

TABLE 10-continued

| No. | | | | | | | |
|---|---|---|---|---|---|---|---|
| 247 | G | 150 | 700 | 10 | 0.008 | Al | 0.5 |
| 248 | C | 150 | 900 | 24 | 0.017 | Al | 0.5 |
| 249 | H | 200 | 800 | 49 | 0.017 | Al | 0.5 |
| 250 | H | 200 | 800 | 6 | 0.014 | Al | 0.5 |
| 251 | I | 100 | 800 | 14 | 0.006 | Al | 0.5 |
| 252 | I | 100 | 800 | 15 | 0.014 | Si | 0.5 |
| 253 | I | 100 | 800 | 15 | 0.014 | Zn | 0.5 |
| 254 | I | 200 | 800 | 18 | 0.008 | Ti | 0.5 |
| 255 | I | 200 | 800 | 18 | 0.009 | Ga | 0.5 |
| 256 | I | 200 | 800 | 19 | 0.008 | Ge | 0.5 |
| 257 | I | 200 | 800 | 18 | 0.010 | Ho | 0.5 |
| 258 | I | 200 | 800 | 17 | 0.008 | V | 0.5 |
| 259 | I | 200 | 800 | 18 | 0.009 | Cr | 0.5 |
| 260 | I | 200 | 800 | 18 | 0.009 | As | 0.5 |
| 261 | J | 200 | 800 | 16 | 0.010 | Al | 0.1 |
| 262 | J | 150 | 800 | 15 | 0.007 | Al | 1 |

| No. | HOLDING TEMPERATURE T1 °C. | HOLDING TIME MINUTE | COOLING RATE °C./sec | ACCUMULATION DEGREE OF {200} PLANES AFTER ANNEALING | ACCUMULATION DEGREE OF {222} PLANES AFTER ANNEALING} | ACCUMULATION DEGREE OF {200} PLANES AFTER DIFFUSION |
|---|---|---|---|---|---|---|
| 236 | 1000 | 5 | 100 | 36 | 21 | 61 |
| 237 | 1000 | 5 | 100 | 34 | 25 | 68 |
| 238 | 1000 | 5 | 100 | 33 | 21 | 65 |
| 239 | 1000 | 5 | 100 | 35 | 23 | 71 |
| 240 | 1000 | 5 | 100 | 37 | 21 | 59 |
| 241 | 1000 | 5 | 100 | 34 | 18 | 60 |
| 242 | 1000 | 5 | 100 | 35 | 21 | 47 |
| 243 | 1000 | 5 | 100 | 34 | 24 | 49 |
| 244 | 1000 | 5 | 100 | 35 | 18 | 51 |
| 245 | 1000 | 5 | 100 | 31 | 26 | 44 |
| 246 | 1000 | 5 | 100 | 39 | 22 | 40 |
| 247 | 1000 | 5 | 100 | 24 | 26 | 46 |
| 248 | 1000 | 5 | 100 | 36 | 18 | 68 |
| 249 | 1000 | 5 | 100 | 38 | 27 | 72 |
| 250 | 1000 | 5 | 100 | 23 | 20 | 39 |
| 251 | 1000 | 5 | 100 | 29 | 16 | 40 |
| 252 | 1000 | 5 | 100 | 34 | 24 | 46 |
| 253 | 1000 | 5 | 100 | 33 | 26 | 51 |
| 254 | 1000 | 5 | 100 | 36 | 22 | 49 |
| 255 | 1000 | 5 | 100 | 37 | 24 | 56 |
| 256 | 1000 | 5 | 100 | 36 | 23 | 55 |
| 257 | 1000 | 5 | 100 | 35 | 26 | 61 |
| 258 | 1000 | 5 | 100 | 36 | 19 | 48 |
| 259 | 1000 | 5 | 100 | 36 | 28 | 60 |
| 260 | 1000 | 5 | 100 | 37 | 15 | 53 |
| 261 | 1000 | 5 | 100 | 35 | 22 | 57 |
| 262 | 1000 | 5 | 100 | 38 | 17 | 61 |

| No. | ACCUMULATION DEGREE OF {222} PLANES AFTER DIFFUSION | (S0 − S)/S0 × 100 | T/T0 × 100 | Z | B50/Bs OF PRODUCT | ΔB T | NOTE |
|---|---|---|---|---|---|---|---|
| 236 | 14 | 66 | 38 | 126 | 0.921 | 0.021 | INVENTION EXAMPLE 232 |
| 237 | 12 | 64 | 33 | 135 | 0.942 | 0.034 | INVENTION EXAMPLE 233 |
| 238 | 13 | 59 | 36 | 129 | 0.937 | 0.037 | INVENTION EXAMPLE 234 |
| 239 | 8 | 61 | 37 | 187 | 0.963 | 0.007 | INVENTION EXAMPLE 235 |
| 240 | 17 | 65 | 34 | 113 | 0.921 | 0.048 | INVENTION EXAMPLE 236 |
| 241 | 12 | 63 | 35 | 123 | 0.917 | 0.042 | INVENTION EXAMPLE 237 |
| 242 | 17 | 79 | 64 | 64 | 0.884 | 0.069 | INVENTION EXAMPLE 238 |
| 243 | 13 | 65 | 50 | 56 | 0.879 | 0.072 | INVENTION EXAMPLE 239 |
| 244 | 11 | 52 | 43 | 63 | 0.892 | 0.062 | INVENTION EXAMPLE 240 |
| 245 | 19 | 39 | 32 | 52 | 0.876 | 0.075 | INVENTION EXAMPLE 241 |

TABLE 10-continued

| | | | | | | | |
|---|---|---|---|---|---|---|---|
| 246 | 18 | 37 | 30 | 23 | 0.857 | 0.086 | INVENTION EXAMPLE 242 |
| 247 | 14 | 66 | 49 | 35 | 0.872 | 0.082 | INVENTION EXAMPLE 243 |
| 248 | 9 | 64 | 44 | 142 | 0.924 | 0.027 | INVENTION EXAMPLE 244 |
| 249 | 4 | 31 | 26 | 167 | 0.947 | 0.011 | INVENTION EXAMPLE 245 |
| 250 | 15 | 68 | 57 | 5.4 | 0.853 | 0.101 | INVENTION EXAMPLE 246 |
| 251 | 17 | 69 | 59 | 28 | 0.867 | 0.087 | INVENTION EXAMPLE 247 |
| 252 | 16 | 66 | 54 | 37 | 0.879 | 0.083 | INVENTION EXAMPLE 248 |
| 253 | 13 | 67 | 56 | 67 | 0.896 | 0.067 | INVENTION EXAMPLE 249 |
| 254 | 19 | 61 | 50 | 29 | 0.887 | 0.076 | INVENTION EXAMPLE 250 |
| 255 | 8 | 59 | 48 | 121 | 0.897 | 0.031 | INVENTION EXAMPLE 251 |
| 256 | 8 | 62 | 51 | 116 | 0.916 | 0.036 | INVENTION EXAMPLE 252 |
| 257 | 6 | 60 | 46 | 129 | 0.916 | 0.026 | INVENTION EXAMPLE 253 |
| 258 | 17 | 58 | 50 | 59 | 0.897 | 0.068 | INVENTION EXAMPLE 254 |
| 259 | 9 | 59 | 48 | 129 | 0.906 | 0.039 | INVENTION EXAMPLE 255 |
| 260 | 11 | 60 | 44 | 119 | 0.899 | 0.042 | INVENTION EXAMPLE 256 |
| 261 | 10 | 57 | 46 | 125 | 0.914 | 0.029 | INVENTION EXAMPLE 257 |
| 262 | 9 | 29 | 24 | 131 | 0.916 | 0.013 | INVENTION EXAMPLE 258 |

TABLE 11

| | BASE MATERIAL STEEL TYPE | SHEET THICKNESS μm | DECARBURIZATION AND DEMANGANIZATION ANNEALING TEMPERATURE °C. | DECARBURIZED AND DEMANGANIZED REGION μm | C CONTENT AFTER DECARBURIZATION mass % | FERRITE-FORMING ELEMENT | TEMPERATURE INCREASING RATE °C./sec |
|---|---|---|---|---|---|---|---|
| 263 | J | 150 | 800 | 14 | 0.006 | Al | 5 |
| 264 | J | 150 | 800 | 16 | 0.007 | Al | 10 |
| 265 | J | 150 | 800 | 14 | 0.007 | Al | 20 |
| 266 | K | 150 | 800 | 14 | 0.007 | Al | 0.5 |
| 267 | K | 150 | 800 | 15 | 0.007 | Al | 0.5 |
| 268 | K | 150 | 800 | 16 | 0.006 | Al | 0.5 |
| 269 | K | 300 | 800 | 21 | 0.011 | Al | 0.5 |
| 270 | K | 300 | 800 | 22 | 0.009 | Al | 0.5 |
| 271 | K | 300 | 800 | 22 | 0.009 | Al | 0.5 |
| 272 | K | 300 | 800 | 21 | 0.008 | Al | 0.5 |
| 273 | K | 300 | 800 | 23 | 0.009 | Al | 0.5 |
| 274 | K | 300 | 800 | 21 | 0.008 | Al | 0.5 |
| 275 | G | 300 | 800 | 21 | 0.008 | Al | 0.5 |
| 276 | G | 300 | 800 | 21 | 0.008 | Al | 1.5 |
| 277 | G | 300 | 800 | 21 | 0.008 | Al | 2.5 |
| 278 | F | 8 | 800 | 8 | 0.010 | Al | 0.5 |
| 279 | G | 100 | 650 | 21 | 0.050 | Al | 0.5 |
| 280 | G | 100 | 950 | 41 | 0.003 | Al | 0.5 |
| 281 | H | 100 | 800 | 1 | 0.010 | Al | 0.5 |
| 282 | H | 200 | 900 | 69 | 0.011 | Al | 0.5 |
| 283 | K | 100 | 800 | 26 | 0.009 | NONE | 0.5 |
| 284 | I | 100 | 800 | 25 | 0.009 | Al | 0.5 |
| 285 | I | 100 | 800 | 24 | 0.010 | Al | 0.5 |
| 286 | J | 100 | 800 | 26 | 0.009 | Al | 0.5 |
| 287 | J | 100 | 800 | 24 | 0.008 | Al | 0.5 |
| 288 | J | 100 | 800 | 26 | 0.010 | Al | 0.5 |

TABLE 11-continued

| | HOLDING TEMPERATURE T1 °C. | HOLDING TIME MINUTE | COOLING RATE °C./sec | ACCUMULATION DEGREE OF {200} PLANES AFTER ANNEALING | ACCUMULATION DEGREE OF {222} PLANES AFTER ANNEALING | ACCUMULATION DEGREE OF {200} PLANES AFTER DIFFUSION |
|---|---|---|---|---|---|---|
| 263 | 1000 | 5 | 100 | 39 | 23 | 75 |
| 264 | 1000 | 5 | 100 | 30 | 19 | 42 |
| 265 | 1000 | 5 | 100 | 29 | 14 | 38 |
| 266 | 950 | 5 | 100 | 29 | 24 | 40 |
| 267 | 1250 | 5 | 100 | 28 | 23 | 36 |
| 268 | 1000 | 0.5 | 100 | 30 | 25 | 67 |
| 269 | 1000 | 10 | 100 | 22 | 29 | 43 |
| 270 | 1000 | 30 | 100 | 21 | 30 | 41 |
| 271 | 1000 | 60 | 100 | 22 | 28 | 38 |
| 272 | 1000 | 120 | 100 | 28 | 21 | 64 |
| 273 | 1000 | 550 | 100 | 27 | 19 | 73 |
| 274 | 1000 | 4500 | 100 | 22 | 31 | 79 |
| 275 | 1000 | 5 | 0.1 | 29 | 25 | 51 |
| 276 | 1000 | 5 | 10 | 26 | 24 | 52 |
| 277 | 1000 | 5 | 450 | 24 | 25 | 45 |
| 278 | 950 | 1 | 100 | 26 | 23 | 47 |
| 279 | 1000 | 10 | 100 | 17 | 19 | 21 |
| 280 | 1000 | 10 | 100 | 14 | 14 | 19 |
| 281 | 1000 | 10 | 100 | 11 | 24 | 23 |
| 282 | 1000 | 10 | 100 | 24 | 23 | 57 |
| 283 | 1000 | 10 | 100 | 27 | 25 | 12 |
| 284 | 765 | 10 | 100 | 23 | 29 | 25 |
| 285 | 1350 | 10 | 100 | 25 | 16 | 48 |
| 286 | 1000 | 6050 | 100 | 28 | 24 | 46 |
| 287 | 1000 | 10 | 0.05 | 22 | 26 | 38 |
| 288 | 1000 | 10 | 500 | 26 | 22 | 39 |

| | ACCUMULATION DEGREE OF {222} PLANES AFTER DIFFUSION) | (S0 − S)/S0 × 100 | T/T0 × 100 | Z | B50/Bs OF PRODUCT | ΔB T | NOTE |
|---|---|---|---|---|---|---|---|
| 263 | 7 | 61 | 47 | 189 | 0.975 | 0.006 | INVENTION EXAMPLE 259 |
| 264 | 16 | 76 | 55 | 43 | 0.864 | 0.064 | INVENTION EXAMPLE 260 |
| 265 | 16 | 81 | 68 | 16 | 0.846 | 0.098 | INVENTION EXAMPLE 261 |
| 266 | 11 | 96 | 75 | 21 | 0.853 | 0.092 | INVENTION EXAMPLE 262 |
| 267 | 17 | 100 | 74 | 8.3 | 0.839 | 0.103 | INVENTION EXAMPLE 263 |
| 268 | 7 | 100 | 76 | 164 | 0.943 | 0.010 | INVENTION EXAMPLE 264 |
| 269 | 15 | 79 | 64 | 53 | 0.872 | 0.059 | INVENTION EXAMPLE 265 |
| 270 | 18 | 51 | 43 | 43 | 0.867 | 0.063 | INVENTION EXAMPLE 266 |
| 271 | 16 | 55 | 37 | 12 | 0.843 | 0.096 | INVENTION EXAMPLE 267 |
| 272 | 5 | 56 | 34 | 158 | 0.929 | 0.009 | INVENTION EXAMPLE 268 |
| 273 | 3 | 53 | 38 | 168 | 0.968 | 0.007 | INVENTION EXAMPLE 269 |
| 274 | 7 | 55 | 42 | 198 | 0.978 | 0.005 | INVENTION EXAMPLE 270 |
| 275 | 4 | 54 | 38 | 123 | 0.895 | 0.036 | INVENTION EXAMPLE 271 |
| 276 | 6 | 51 | 44 | 128 | 0.896 | 0.034 | INVENTION EXAMPLE 272 |
| 277 | 12 | 53 | 31 | 73 | 0.879 | 0.053 | INVENTION EXAMPLE 273 |
| 278 | 19 | 100 | 100 | 86 | 0.876 | 0.049 | INVENTION EXAMPLE 274 |
| 279 | 28 | 65 | 41 | 1.3 | 0.778 | 0.123 | COMPARATIVE EXAMPLE 205 |
| 280 | 22 | 62 | 38 | 0.8 | 0.779 | 0.113 | COMPARATIVE EXAMPLE 206 |
| 281 | 14 | 66 | 31 | 0.9 | 0.782 | 0.109 | COMPARATIVE EXAMPLE 207 |
| 282 | 18 | 61 | 37 | 135 | 0.905 | 0.037 | INVENTION EXAMPLE 275 |

TABLE 11-continued

| | | | | | | | |
|---|---|---|---|---|---|---|---|
| 283 | 11 | 0 | 0 | 0.6 | 0.765 | 0.096 | COMPARATIVE EXAMPLE 208 |
| 284 | 31 | 57 | 21 | 1.2 | 0.786 | 0.109 | COMPARATIVE EXAMPLE 209 |
| 285 | 22 | 85 | 70 | 68 | 0.875 | 0.052 | INVENTION EXAMPLE 276 |
| 286 | 15 | 92 | 73 | 63 | 0.881 | 0.054 | INVENTION EXAMPLE 277 |
| 287 | 17 | 84 | 69 | 12 | 0.852 | 0.089 | INVENTION EXAMPLE 278 |
| 288 | 16 | 63 | 31 | 21 | 0.859 | 0.086 | INVENTION EXAMPLE 279 |

In each of present invention examples, it was possible to confirm that the magnetic flux density difference ΔB becomes a small value as compared to comparative examples and a high magnetic flux density is obtained thoroughly in the in-plane circumferential direction. Further, in these Fe-based metal sheets, it was possible to confirm that an excellent magnetic property in which the value of B50/Bs is 0.80 or more is obtained.

Further, in the present invention examples, as shown in Table 10 and Table 11, it was possible to confirm that the {200} plane in the α-Fe phase is likely to be highly accumulated at each of the stages of the heat treatment.

Further, an L cross section of each of the present invention examples was observed, and thereby it was confirmed that the α single phase region made of the α single phase based component exists in at least a partial region including the surfaces and the ratio of the α single phase region to the L cross section is 1% or more.

In contrast to this, for example, in the case of the insufficient decarburized and demanganized region as in a comparative example 207, in the case of using no metal for the second layer as in a comparative example 208, and in the case of not heating to a temperature of the A3 point or higher as in a comparative example 209, it was not possible to obtain a high magnetic flux density in the in-plane circumferential direction thoroughly as in the present invention examples, and consequently, an obtained magnetic property was also poor. Even when the temperature was increased to a higher temperature and the holding time was made longer as in present invention examples 276 and 277, the similar effect was able to be obtained, but the significant effect did not appear.

In the foregoing, the preferred embodiments of the present invention have been described in detail, but the present invention is not limited to such examples. It is apparent that a person having common knowledge in the technical field to which the present invention belongs is able to devise various variation or modification examples within the range of technical ideas of the present invention, and it should be understood that they also belong to the technical scope of the present invention as a matter of course.

Industrial Applicability

The Fe-based metal sheet of the present invention is suitable for magnetic cores and the like of transformers and the like using a silicon steel sheet, and can contribute to downsizing of these magnetic cores and reduction in energy loss.

The invention claimed:

1. An Fe-based metal sheet, comprising:
less than 0.2 mass % C and having a composition that is capable of causing an α-γ transformation, wherein
a ferrite-forming element, being one element or more selected from the group consisting of Al, Mo, Ga, Sn, Ti, Ge, Sb, V, W, Zn and As is alloyed on a partial or whole region of the Fe-based metal sheet, and
when intensity ratios of respective {001}<470>, {116}<6 12 1>, and {223}<692>directions in a sheet plane by X-ray diffraction are set to A, B, and C respectively and Z=(A +0.97B)/0.98C is satisfied, a Z value is not less than 2.0 nor more than 200;
wherein at least a partial region including surfaces of the Fe-based metal sheet is an α single phase region that is alloyed with said ferrite-forming element, and a ratio of the α single phase region to a cross section of the Fe-based metal sheet is 1% or more,
wherein an accumulation degree of {200} planes is not less than 30% nor more than 99%, and an accumulation degree of {222} planes is not less than 0.01% nor more than 30%, and
said accumulation degree of {200} planes is expressed by Expression (1) below and said accumulation degree of {222} planes is expressed by Expression (2) below, accumulation degree of {200} planes=
[{i(200)/I(200)}/Σ{i(hkl)/I(hkl)}]×100     (1)

accumulation degree of {222} planes=
[{i(222)/I(222)}/Σ{i(hkl)/I(hkl)}]×100     (2)

wherein i (hkl) is an actually measured integrated intensity of {hkl} planes in the surface of the Fe-based metal sheet, and I (hkl) is a theoretical intergrated intensity of the {hkl} planes in a sample having a random orientation, and 11 kinds of planes of {110}, {200}, {211}, {310}, {222}, {321}, {411}, {420}, {332}, {521}, and {442} are used as the {hkl} planes.

2. The Fe-based metal sheet according to claim 1, wherein a layer containing said ferrite-forming element is formed on at least one side of surfaces of the Fe-based metal sheet, and said ferrite-forming element that has diffused from part of the layer is alloyed with Fe.

3. The Fe-based metal sheet according to claim 2, wherein a thickness of the layer containing said ferrite-forming element is not less than 0.01 μm nor more than 500 μM.

4. The Fe-based metal sheet according to claim 1, wherein a thickness of the Fe-based metal sheet is not less than 10 μm nor more than 6 mm.

5. The Fe-based metal sheet according to claim 1, wherein the α single phase region is formed on a front surface side and a rear surface side of the Fe-based metal sheet, and a crystal grain straddling the a single phase region on the front surface side and the α single phase region on the rear surface side is formed.

* * * * *